(12) United States Patent
Kastoriano et al.

(10) Patent No.: US 7,054,994 B2
(45) Date of Patent: May 30, 2006

(54) MULTIPLE-RAM CAM DEVICE AND METHOD THEREFOR

(75) Inventors: Shay Kastoriano, Moshav Rinatia (IL); Moshe Hershkovich, Tel-Aviv (IL); Guy Itzkovsky, Ramat-Hasharon (IL); Mor Levi, Ramat-Gan (IL); Eyal Shachrai, Netanya (IL); Yoram Stern, Raanana (IL); Moshe Stark, Even Yehuda (IL)

(73) Assignee: Hy Wire Ltd., Netanya (IL)

( * ) Notice: Subject to any disclaimer, the term of this patent is extended or adjusted under 35 U.S.C. 154(b) by 451 days.

(21) Appl. No.: 10/206,189

(22) Filed: Jul. 29, 2002

(65) Prior Publication Data

US 2004/0019737 A1   Jan. 29, 2004

(51) Int. Cl.
*G06F 12/02* (2006.01)

(52) U.S. Cl. .......................... 711/108; 711/104; 365/49

(58) Field of Classification Search ................ 711/108; 365/49
See application file for complete search history.

(56) References Cited

U.S. PATENT DOCUMENTS

| | | | |
|---|---|---|---|
| 6,226,710 B1 * | 5/2001 | Melchior | 711/108 |
| 6,374,325 B1 * | 4/2002 | Simpson et al. | 711/108 |
| 6,553,453 B1 * | 4/2003 | Gibson et al. | 711/108 |
| 6,633,953 B1 | 10/2003 | Stark | |
| 6,718,433 B1 * | 4/2004 | Pereira | 711/108 |
| 6,757,780 B1 * | 6/2004 | Stark | 711/108 |
| 6,766,317 B1 * | 7/2004 | Sharma et al. | 707/3 |
| 2003/0182498 A1 * | 9/2003 | Villaret et al. | 711/108 |

FOREIGN PATENT DOCUMENTS

| WO | PCT/IL01/01025 | 11/2001 |
|---|---|---|
| WO | WO 01/91132 | 11/2001 |

* cited by examiner

*Primary Examiner*—Hong Chong Kim
*Assistant Examiner*—Shane M. Thomas
(74) *Attorney, Agent, or Firm*—Mark M. Friedman

(57) ABSTRACT

A method and system for storing arranged data in a memory, the system including: (a) a plurality of random access memories, each random access memory (RAM) of the plurality including: (i) a first array of cells, the first array having at least two dimensions and having rows and columns, the first array designed and configured to contain a plurality of key entries, each of the cells having a unique address including a row index and a column index, each of the key entries for matching with an input key, and (b) a processor designed and configured to search the plurality of key entries for a match, in response to the input key, the plurality of RAMs designed and configured such that: (i) at least one row in a second of the RAMs has a row index that is identical to a row index in a first of the RAMs, and (ii) the key entries are arranged within each of the plurality of RAMs in monotonic order.

73 Claims, 38 Drawing Sheets

Figure 3

REPLACEMENT PAGE

Figure 7

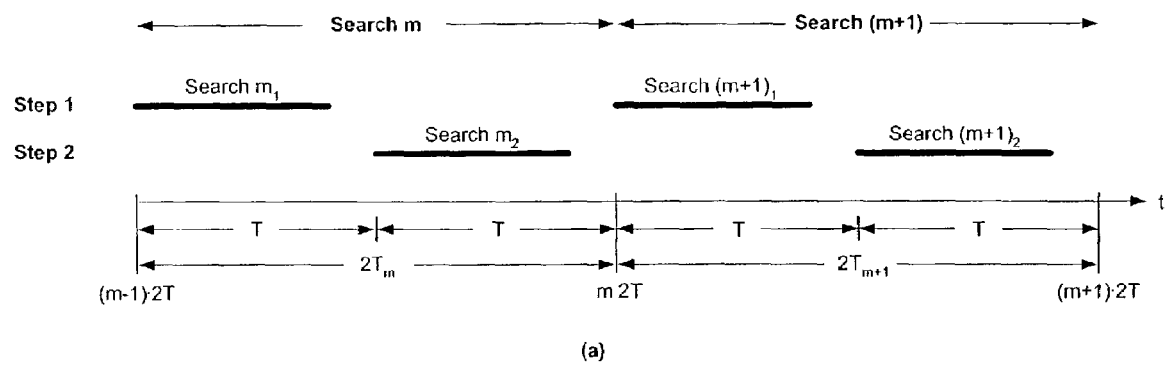
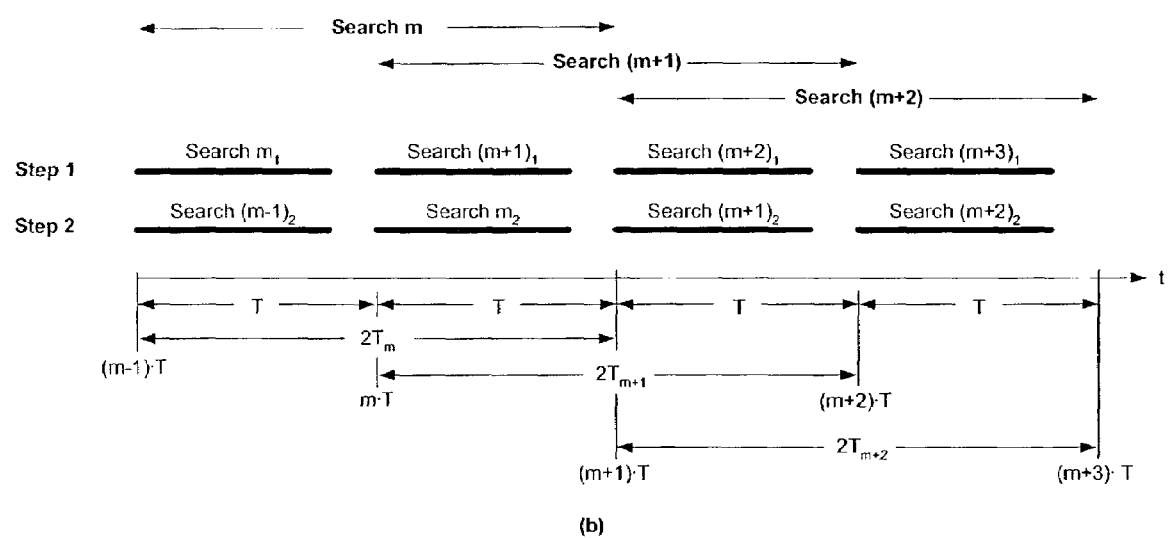
Figure 9

| Rows | Columns (RAM #) → Z | | | | | | | | | | | |
|---|---|---|---|---|---|---|---|---|---|---|---|---|
| ↓ Y | 0 | 1 | 2 | ••• | g | ••• | W-1 | W | W+1 | ••• | G-2 | G-1 |
| 0 | $K_{0,0}$ | $K_{M,0}$ | $K_{2M,0}$ | | $K_{gM,0}$ | | $K_{GW-1,0}$ | $K_{GW,0}$ | $K_{GW+1,0}$ | | $K_{GM-2,0}$ | $K_{GM-1,0}$ |
| 1 | $K_{0,1}$ | $K_{M,1}$ | $K_{2M,1}$ | | $K_{gM,1}$ | | $K_{GW-1,1}$ | $K_{GW,1}$ | $K_{GW+1,1}$ | | $K_{GM-2,1}$ | $K_{GM-1,1}$ |
| 2 | $K_{0,2}$ | $K_{M,2}$ | $K_{2M,2}$ | | $K_{gM,2}$ | | $K_{GW-1,2}$ | $K_{GW,2}$ | $K_{GW+1,2}$ | | $K_{GM-2,2}$ | $K_{GM-1,2}$ |
| ⋮ | | | | | | | | | | | | |
| J | $K_{0,J}$ | $K_{M,J}$ | $K_{2M,J}$ | | $K_{gM,J}$ | | $K_{GW-1,J}$ | $K_{GW,J}$ | $K_{GW+1,J}$ | | $K_{GM-2,J}$ | $K_{GM-1,J}$ |
| ⋮ | | | | | | | | | | | | |
| V-1 | $K_{0,V-1}$ | $K_{M,V-1}$ | $K_{2M,V-1}$ | | $K_{gM,V-1}$ | | $K_{GW-1,V-1}$ | $K_{GW,V-1}$ | $K_{GW+1,V-1}$ | | $K_{GM-2,V-1}$ | $K_{GM-1,V-1}$ |
| V | $K_{0,V}$ | $K_{M,V}$ | $K_{2M,V}$ | | $K_{gM,V}$ | | $K_{GW-1,V}$ | $K_{GW,V}$ | | | | |
| V+1 | | | | | | | | | | | | |
| ⋮ | | | | | | | | | | | | |
| N-2 | | | | | | | | | | | | |
| N-1 | | | | | | | | | | | | |

Columns ⟶ X

Rows ↓ Y

|   | 0 | 4 | 8 | 12 |
|---|---|---|---|---|
| 0 | $K_{0,0}$ | $K_{4,0}$ | $K_{8,0}$ | $K_{12,0}$ |
| 1 | $K_{0,1}$ | $K_{4,1}$ | $K_{8,1}$ | $K_{12,1}$ |
| 2 | $K_{0,2}$ | $K_{4,2}$ | $K_{8,2}$ | $K_{12,2}$ |
| 3 | $K_{0,3}$ | $K_{4,3}$ | $K_{8,3}$ | $K_{12,3}$ |

RAM # 0

|   | 1 | 5 | 9 | 13 |
|---|---|---|---|---|
| 0 | $K_{1,0}$ | $K_{5,0}$ | $K_{9,0}$ | $K_{13,0}$ |
| 1 | $K_{1,1}$ | $K_{5,1}$ | $K_{9,1}$ | $K_{13,1}$ |
| 2 | $K_{1,2}$ | $K_{5,2}$ | $K_{9,2}$ | $K_{13,2}$ |
| 3 | $K_{1,3}$ | $K_{5,3}$ | $K_{9,3}$ | $K_{13,3}$ |

RAM # 1

|   | 2 | 6 | 10 | 14 |
|---|---|---|---|---|
| 0 | $K_{2,0}$ | $K_{6,0}$ | $K_{10,0}$ | $K_{14,0}$ |
| 1 | $K_{2,1}$ | $K_{6,1}$ | $K_{10,1}$ | $K_{14,1}$ |
| 2 | $K_{2,2}$ | $K_{6,2}$ | $K_{10,2}$ | $K_{14,2}$ |
| 3 | $K_{2,3}$ | $K_{6,3}$ | $K_{10,3}$ | $K_{14,3}$ |

RAM # 2

|   | 3 | 7 | 11 | 15 |
|---|---|---|---|---|
| 0 | $K_{3,0}$ | $K_{7,0}$ | $K_{11,0}$ | $K_{15,0}$ |
| 1 | $K_{3,1}$ | $K_{7,1}$ | $K_{11,1}$ | $K_{15,1}$ |
| 2 | $K_{3,2}$ | $K_{7,2}$ | $K_{11,2}$ | $K_{15,2}$ |
| 3 | $K_{3,3}$ | $K_{7,3}$ | $K_{11,3}$ | $K_{15,3}$ |

RAM # 3

|   | 0 | 4 | 8 | 12 |
|---|---|---|---|---|
| 0 | 1 | 10 | 21 | 31 |
| 1 | 42 | 53 | 62 | 72 |
| 2 | 81 | 92 | 105 | 115 |
| 3 | 125 | 135 | 147 |  |

RAM # 0

|   | 1 | 5 | 9 | 13 |
|---|---|---|---|---|
| 0 | 4 | 13 | 24 | 33 |
| 1 | 45 | 55 | 65 | 73 |
| 2 | 84 | 96 | 107 | 117 |
| 3 | 127 | 138 | 150 |  |

RAM # 1

|   | 2 | 6 | 10 | 14 |
|---|---|---|---|---|
| 0 | 7 | 16 | 26 | 37 |
| 1 | 47 | 57 | 67 | 75 |
| 2 | 88 | 99 | 110 | 119 |
| 3 | 130 | 141 |  |  |

RAM # 2

|   | 3 | 7 | 11 | 15 |
|---|---|---|---|---|
| 0 | 9 | 18 | 29 | 40 |
| 1 | 50 | 60 | 69 | 78 |
| 2 | 91 | 102 | 113 | 123 |
| 3 | 133 | 145 |  |  |

RAM # 3

Figure 36

MULTIPLE-RAM CAM DEVICE AND METHOD THEREFOR

FIELD AND BACKGROUND OF THE INVENTION

The present invention relates to a device for, and method of, implementing a Multiple Random Access Memory (RAM)-Based Content Addressable Memory (CAM), and more particularly, a Multiple RAM-Based Binary CAM and a Multiple RAM-Based Range Content Addressable Memory (RCAM).

Conventional memory arrays such as Random Access Memories (RAMs) store and retrieve data units indexed by their respective addresses.

Content Addressable Memories (CAMs) are associative memories that contain key entries and associated data entries that uniquely correspond to the key entries. A CAM stores the key entries and the associated data entries at any available location and retrieves the associated data for any key that is submitted to be searched in the CAM.

A binary CAM stores an ordered list of single integer key entries and a corresponding list of their associated data. An RCAM stores instead a list of key entries that represent range boundaries and a list of associated data that correspond uniquely to these ranges. A key search in a binary CAM results in an exact match, whereas a key search in an RCAM matches an entire range. The RCAM also stores a list of associated boundary type entries that determine the validity of the corresponding ranges. This list can be stored in conjunction with the list of associated data or in a separate array.

A successful approach to utilizing RAM-based technology on a binary CAM is provided in a co-pending, unpublished (and as such, is not to be construed as prior art with regard to the present application) PCT Patent Application Serial No. IL01/00458, which is incorporated by reference for all purposes as if fully set forth herein. A method and apparatus are disclosed therein for the high-rate arrangement, storage and extraction of data in a two-dimensional memory array. The two-dimensional array, which consists of memory cells, is arranged in rows and columns. Each of the key entries in these cells has a unique pair of indices that indicate the key entry location in the array. The associated data entries corresponding to these key entries are stored in another two-dimensional array under the same pair of indices. When a submitted key is searched and found, the associated data is retrieved from the corresponding cell in the other two-dimensional associated-data memory array and a match signal, "True" or "False", is output along with the retrieved associated data entry to indicate whether the associated data is valid or not. The key entries in the two-dimensional array are arranged in monotonic order. The entries are arranged in the array so that at least a portion of the array is filled with valid entries, without blanks. The arrays of the key entries and their associated data are kept in perfect sequence by Insert and Remove algorithms.

The main innovations introduced by this technology include:

Surrounding the RAM structure with search logic in the RAM periphery: The number of comparator units is proportional to the RAM periphery length rather than to the RAM area. This results in significant savings in the amount of comparator logic, while keeping the memory cell extremely efficient in density and speed. The CAM implementation overhead is typically less than 15%. Therefore, the CAM density obtained with this method is asymptotically close to the comparable size in RAM technology.

Fast Search Algorithm: The surrounding logic in conjunction with the RAM structure performs searches with the same throughput as a comparable RAM, and twice the latency. Although, in theory, single clock latency may be accomplished, pipelining may yield a better throughput and a similar latency if measured on an absolute time scale (nano-seconds).

Continuous "Housekeeping" Procedure: Unlike CAMs of the prior art, these CAM devices keep the "house in order". That is, the deletion of keys does not leave "holes" in the list, which would otherwise require "housekeeping" operations on the managing processor section. Similarly, the addition of new keys keeps the list in a perfect sequence. This "housekeeping" procedure takes longer than the search, but is much faster than required by the system. The overhead associated with the Key List update is significantly shorter when compared with the time taken by the processor to do the housekeeping. This superior performance is due to the efficient RAM and Insert/Remove hardware architecture, which execute very time-efficient algorithms.

In U.S. Pat. No. 6,633,953, which is incorporated by reference for all purposes as if fully set forth herein, a method and apparatus are disclosed for arranging and storing a set of key entries and a corresponding set of associated data entries in storage areas within a memory device. Each location in the first storage area is assigned a unique index and is associated with the corresponding location to second storage area with the same index. Each key entry represents a range of consecutive values and is denoted herein as Range Key Entry. The range may be represented by its lower or upper boundary.

When a key is submitted for search and is found to belong to a range represented by a range key entry, the associated data entry with the same index is extracted from the memory as valid data and a Match signal is issued. If no range is found to contain the submitted key, no valid associated data is retrieved and a No-Match signal is issued.

In a co-pending, unpublished PCT Patent Application Serial No. IL01/01025, which is incorporated by reference for all purposes as if fully set forth herein, RAM-based technology is implemented on an RCAM in a somewhat analogous fashion to the above-described implementation of RAM-based technology on a binary CAM. A method and apparatus are disclosed therein for the high-rate arrangement, storage of ranges of integers, and extraction of data associated with these ranges in a two-dimensional memory array. The two-dimensional array, which consists of memory cells, is arranged in rows and columns, each of the key entries (representing range boundaries) in these cells having a unique pair of indices that indicate the key entry location in the array. The associated data entries that correspond uniquely to these ranges are stored in another two-dimensional array under the same pair of indices. When a submitted key is searched and found within an integer range, the associated data is retrieved from the corresponding cell in the other two-dimensional associated-data memory array.

The RCAM optionally includes a third two-dimensional array, consisting of associated boundary type entries that also correspond uniquely to these ranges and are stored under the same pair of indices. These entries determine the validity of the corresponding ranges. A match signal, "True" or "False", is output accordingly with the retrieved associated data entry to indicate whether the matched range and the associated data are valid or not. The array of associated boundary type entries can be stored in conjunction with that of associated data entries or separately.

The key entries in the two-dimensional array are arranged, each entry in a separate cell, in rows or columns, in a subsequent ascending or descending order. The entries are arranged in the array so that at least a portion of the array is filled without blanks with valid entries.

In U.S. Pat. No. 6,633,953, which is incorporated by reference for all purposes as if fully set forth herein, a method and device are disclosed for the interconnection of multiple Binary CAM or RCAM modules into a single Binary CAM or RCAM device. The invention allows the division of the Binary CAM or RCAM structure into partial modules, each containing a small number of rows. The use of the smaller partial modules significantly speeds up the Insert and Remove operations in these devices because the Insert and Remove throughputs are inversely proportional to the number of rows in the CAM or RCAM.

Each module of a Multiple-Module Binary CAM or RCAM operates internally like a single Binary CAM or RCAM, with a Key Module List, Associated Data List and Associated Boundary Type List (for the RCAM). Each of these lists is stored in a Two-Dimensional Array (TDA) using RAM-based technology. A search of the submitted key is performed concurrently in all the modules of the Binary CAM or RCAM. The Data and Match signals correspond to those of the individual module that contains the searched key; they are obtained by summing-up the results of the Search operation performed in all the modules.

However, since each module of a Multiple-Module Binary CAM or RCAM requires several registers, such as First Column Register, Inserter/Remover Register and others, plus additional components, the integrated device may become large if it includes many modules.

It would, therefore, be highly desirable and of distinct advantage to have a Multiple-RAM device for, and a method of significantly improving the efficiency in the storage and key search operations of devices utilizing multiple RAMs.

SUMMARY OF THE INVENTION

The present invention is a device for, and method of, implementing a Multiple Random Access Memory (RAM)-Based Binary Content Addressable Memory (CAM) and a Multiple RAM-Based Range Content Addressable Memory (RCAM).

The inventive Multiple RAM Binary CAM and RCAM, which is disclosed in greater detail hereinbelow, include an ordered group of RAMs. This group can be regarded as an "extended RAM" and is denoted as "G-RAM" because it includes a number G of RAMs. The entries of the multiple RAMs are arranged in an integrated manner, in ascending or descending order along "extended rows" or "extended columns". If arranged along extended rows, the entries of the first columns of the can be stored sequentially in the columns of a First Column RAM, denoted as FC-RAM.

To save further chip space, the first column of the FC-RAM can be partitioned in hierarchical blocks according to a numerical system of base B. In this hierarchical architecture, the FC-RAM first column entries are stored in three hierarchical blocks, denoted as $B^2$ Register, $B^1$ RAM and $B^0$ RAM. The highest-hierarchy block, $B^2$ Register, is a one-dimensional array that contains all the first column entries whose row indices are multiples of $B^2$. The next-hierarchy block, $B^1$ RAM, is a 2-dimensional array that stores all the entries whose row indices are multiples of B, and is implemented using a RAM. All the remaining entries of the FC-RAM (i.e., those that are not multiples of B) are stored in the lowest-hierarchy block, $B^0$ RAM, which is another 2-dimensional array, also implemented using a RAM.

In general, when the first column is larger, more hierarchies can be used. If the first column is partitioned in k hierarchical blocks, a $B^{k-1}$ Register and (k–1) RAMs, $B^{k-2}$ RAM to $B^0$ RAM, can be used. The increasing number of hierarchical blocks reduces the chip space to a minimum for a specific value, and then the chip space increases with the number of hierarchical blocks. The 3-hierarchy arrangement used in the G-RAM presented in this document is an excellent tradeoff for space optimization.

The hierarchical arrangement adds latency because it increases the number of steps in a serial Search procedure; however, it does not affect the throughput, because these steps are performed in a pipelined fashion. If the first column is partitioned in k hierarchical blocks, the serial Search procedure consists of k+2 steps, and a (k+2)-step pipelined procedure is used to maintain a high throughput.

A key search in the G-RAM starts with a search sequence in the hierarchical blocks, first in the highest-hierarchy block, the $B^2$ Register, and then in the next-hierarchy block, the $B^1$ RAM, down to the lowest-hierarchy block, the $B^0$ RAM. This search sequence points to a specific row in the FC-RAM. The search procedure performed in the FC-RAM leads to a specific row in one of the RAMs of the Multi-RAM Binary CAM or RCAM, in search for an Exact Match (in a Binary CAM) or a Range Match (in an RCAM).

As in a simple RAM-Based Binary CAM and RCAM, the key entries in the G-RAM are kept in perfect sequence by consistent Insert and Remove procedures. In the case of an RCAM, when an overlapping IPv4 CIDR address range is inserted in, or removed from, a Key TDA, a pre-processing algorithm determines whether it is necessary to insert or remove one or more keys within the boundaries of the inserted or removed address range, and also the consequent changes (if required) in the associated boundary type and associated data entries corresponding to this group of sequential keys. The Bit-Mapped Update Operation allows changing the Associated Data and Associated Boundary Type entries corresponding to a specified group of sequential keys in the Key TDA, without changing the number of keys in this TDA.

Insertion and removal of key entries are lengthy operations. Often, search (lookup), which is very fast, may be requested during the execution of an Insert or Remove operation. An improvement in the Insert or Remove procedure allows to disrupt it momentarily in order to perform a Search operation, and then resume the Insert or Remove operation after completing the search. This controlled disruption allows fast search operations in the midst of lengthy database maintenance.

Since keys are being inserted or removed, the G-RAM, the FC-RAM and the hierarchical blocks $B^2$ Register, $B^1$ RAM and $B^0$ RAM are constantly updated. The Search procedure that precedes the key insertion and removal is similar to the Search procedure used for lookups mentioned above.

The Multiple-RAM design also offers the advantage of using an FC-RAM and a single First Column Register instead of multiple First Column Registers, simpler multiple Inserter/Remover Registers, fewer components surrounding the RAMs and, consequently, simpler, more compact and cheaper devices.

Another novel aspect of the Multiple-RAM is the Non-Contiguous Multiple-RAM Binary CAM and RCAM. In this design, the key entries may also be located in ascending or descending order along extended rows or extended columns in the G-RAM. As in the contiguous Multiple-RAM Binary CAM and RCAM, the key entries fill up each extended row or column before starting a new one, but, in this case, in each extended row or column, the key entries are stored in repeated sequences, one per RAM in each sequence, in groups of G key entries in G corresponding cells of the G RAMs.

The non-contiguous design allows to start the performance of the Search procedure in the first RAM (RAM # 0) of the G-RAM, to identify the row and column (i.e., specific key entry) where the submitted key may be located, and only then search sequentially for the corresponding specific key entry in each particular RAM to find an exact match (for a Binary CAM) or a range match (for an RCAM). This results in fast lookups with no need for the FC-RAM used in the contiguous Multiple-RAM Binary CAM and RCAM. The first column entries of the first RAM (RAM # 0) can be stored in three hierarchical blocks, $B^2$ Register, $B^1$ RAM and $B^0$ RAM, as the FC-RAM in the contiguous Multiple-RAM Binary CAM and RCAM. As in the contiguous G-RAM, the Insert and Remove procedures can be disrupted momentarily in order to perform lookups and then resumed after completing the search.

Binary CAMs and RCAMs with large memories require large number of RAMs can result in a large single Multiple-RAM device and in an unconventionally large FC-RAM. This problem can be solved by splitting the Multiple-RAM device in separate modules, each composed of a conveniently specified number of Multiple-RAMs. This requires a method of interconnecting the multiple modules into one Binary CAM or RCAM device. Each Multiple-Module of Multiple-RAMs operates internally like a single Multiple-RAM device with its Key Multiple-RAM, Associated Data Multiple-RAM and Associated Boundary Type Multiple-RAM (for the RCAM).

Thus, according to one aspect of the present invention, there is provided a system for storing arranged data in a memory, the system including: (a) a plurality of random access memories, each random access memory (RAM) of the plurality including: (i) a first array of cells, the first array having at least two dimensions and having rows and columns, the first array designed and configured to contain a plurality of key entries, each of the cells having a unique address including a row index and a column index, each of the key entries for matching with an input key, and (b) processing means designed and configured to search the plurality of key entries for a match, in response to the input key, the plurality of RAMs designed and configured such that: (i) at least one row in a second of the RAMs has a row index that is identical to a row index in a first of the RAMs, and (ii) the key entries are arranged within each of the plurality of RAMs in monotonic order.

According to further features in the described preferred embodiments, each row in the second of the RAMs has a unique row index, each unique row index corresponding to a respective row index in a first of the RAMS.

According to further features in the described preferred embodiments, each of the RAMs having at least one row having a row index that is identical to the row index in the first of the RAMs.

According to further features in the described preferred embodiments, each of the RAMs further includes: (ii) a second array of cells, the second array having at least two dimensions and having rows and columns, the second array having a plurality of data entries, each of the data entries being associated with a particular one of the key entries.

According to further features in the described preferred embodiments, the processing means are designed and configured to search, in response to the input key, the plurality of key entries, so as to identify a match.

According to further features in the described preferred embodiments, the plurality of key entries includes at least one range type key entry, each range type key entry corresponding to a particular range and being associated with a particular one of the data entries.

According to further features in the described preferred embodiments, the plurality of key entries includes at least one exact type key entry, each exact type key entry being associated with a particular one of the data entries.

According to further features in the described preferred embodiments, the range type key entry contains a single range-boundary value.

According to further features in the described preferred embodiments, the key entries are arranged within the plurality of RAMs in a contiguous fashion.

According to further features in the described preferred embodiments, each of the RAMs include end-column key entries, and the system further includes: (c) an end-column RAM, operatively connected to the plurality of RAMs, the end-column RAM including an array of cells having at least two dimensions, the array designed and configured to contain the end-column key entries of the RAMs.

According to further features in the described preferred embodiments, the end-column RAM contains first-column key entries of the RAMs.

According to further features in the described preferred embodiments, the processing means are designed and configured to search the end-column RAM, in response to the input key, to identify a row of the plurality of RAMs containing a potential match.

According to further features in the described preferred embodiments, the processing means are further designed and configured to identify a RAM of the plurality of RAMs, containing a potential match.

According to further features in the described preferred embodiments, the processing means are further designed and configured to identify a matching key entry in the row of the RAM, the key entry matching the input key.

According to further features in the described preferred embodiments, the system further includes at least one array for storing key entries of an end column of the end-column RAM in k hierarchical levels, wherein $k \geq 2$.

According to further features in the described preferred embodiments, the key entries of the end column of the end-column RAM are stored within the hierarchical levels according to a base B, wherein one level of the levels contains particular key entries of the end column, the particular key entries taken from the end column at a key entry interval of $B^{k-1}$.

According to further features in the described preferred embodiments, a next-highest level of the levels contains particular key entries of the end column, the particular key entries taken from the end column at a key entry interval of $B^{k-2}$.

According to further features in the described preferred embodiments, a subsequent next-highest level of the levels contains particular key entries of the end column, the particular key entries taken from the end column at a key entry interval of $B^{k-3}$, wherein $k \geq 3$.

According to further features in the described preferred embodiments, each of the key entries of the end column is stored in a single one of the hierarchical levels, thereby saving space in the at least one array.

According to further features in the described preferred embodiments, the at least one row in a second of the RAMs is a plurality of rows.

According to further features in the described preferred embodiments, the RAM of the plurality of RAMs has a number of the columns for containing the plurality of key entries, wherein the number is identical for each RAM.

According to further features in the described preferred embodiments, the plurality of RAMs includes corresponding cells for containing the plurality of key entries, wherein corresponding cells within the second of the RAMs contain key entries that are greater than key entries in corresponding cells within the first of the RAMs.

According to further features in the described preferred embodiments, the plurality of RAMs includes corresponding cells for containing the plurality of key entries, wherein the system is configured such that all corresponding cells within the second of the RAMs contain key entries that are greater than key entries in corresponding cells within the first of the RAMs.

According to further features in the described preferred embodiments, a particular row of key entries in the second of the RAMs is in mixed order with respect to the particular row of key entries in the first of the RAMs.

According to further features in the described preferred embodiments, the system further includes: (c) a second plurality of RAMs, each RAM in the second plurality of RAMs including an associated array of cells, each associated array having at least two dimensions, rows and columns, and a plurality of data entries, each associated array for pairing with a particular one of the first array of the plurality of RAMs, such that each of the data entries is associated with a particular one of the key entries.

According to another aspect of the present invention, there is provided a method for storing arranged data in a memory, the method including the steps of: (a) providing a system including: (i) a plurality of random access memories, each random access memory (RAM) of the plurality including a first array of cells having a plurality of key entries, the first array having at least two dimensions and having rows and columns, and (ii) processing means for searching the plurality of key entries; (b) configuring the plurality of RAMs such that at least one row in a second of the RAMs has a row index that is identical to a row index in a first of the RAMs, and (c) arranging the key entries within each of the plurality of RAMs in monotonic order.

According to further features in the described preferred embodiments, each row in the second of the RAMs has a unique row index, each unique row index corresponding to a respective row index in the first of the RAMs.

According to further features in the described preferred embodiments, each of the RAMs further includes a second array of cells, the second array having at least two dimensions and having rows and columns, the second array having a plurality of data entries, each of the data entries being associated with a particular one of the key entries.

According to further features in the described preferred embodiments, the method further includes the step of: (d) searching, in response to the input key, the plurality of key entries, so as to identify a match.

According to further features in the described preferred embodiments, each of the RAMs include end-column key entries, and wherein the system provided in step (a) further includes: (iii) an end-column RAM, operatively connected to the plurality of RAMs, the end-column RAM including an array of cells for containing the end-column key entries of the RAMs.

According to further features in the described preferred embodiments, the method further includes the step of: (d) searching the end-column RAM, in response to the input key, to identify a row containing a potential match.

According to further features in the described preferred embodiments, the method further includes the step of identifying, in response to the input key, a RAM of the RAMs containing a potential match.

According to further features in the described preferred embodiments, the method further includes the step of storing key entries of an end column of the end-column RAM in k hierarchical levels, wherein k≧2.

According to further features in the described preferred embodiments, the storing within the hierarchical levels is according to a base B, wherein one level of the levels contains particular key entries of the end column, the particular key entries taken from the end column at a key entry interval of $B^{k-1}$.

According to further features in the described preferred embodiments, a next-highest level of the levels contains particular key entries of the end column, the particular key entries taken from the end column at a key entry interval of $B^{k-2}$.

According to further features in the described preferred embodiments, the arranging is performed such that the key entries form a single monotonic order within the plurality of RAMs.

According to further features in the described preferred embodiments, the arranging is performed such that the second of the RAMs is in mixed order with respect to the first of the RAMs.

According to further features in the described preferred embodiments, the arranging is performed such that the key entries are contained, within the plurality of RAMs, in a number of the columns, the number being identical for at least the first and the second of the RAMs.

According to further features in the described preferred embodiments, the arranging is performed such that a particular row of key entries in the second of the RAMs is in mixed order with respect to the particular row of key entries in the first of the RAMs.

According to further features in the described preferred embodiments, the plurality of RAMs includes corresponding cells for containing the plurality of key entries, and the arranging is performed such that the key entries contained in corresponding cells within the second of the RAMs are greater than the key entries in corresponding cells within the first of the RAMs.

According to further features in the described preferred embodiments, the plurality of RAMs includes corresponding cells for containing the plurality of key entries, and wherein the arranging is performed by: (i) inserting a lowest key entry of the key entries into a first cell within the first array of the first of the RAMs, and (ii) inserting a next lowest key entry of the key entries into a corresponding cell within the first array of the second of the RAMs.

According to further features in the described preferred embodiments, successive next lowest key entries of the key entries are inserted into corresponding cells of successive RAMs of the plurality of RAMs, until all cells corresponding to the first cell within the first of the RAMs are filled.

According to further features in the described preferred embodiments, the arranging further includes: (iii) inserting a successive next lowest key entry into a next cell within the first array of the first of the RAMs; (iv) inserting successive next lowest key entries into cells corresponding to the next cell, until all cells corresponding to the next cell are filled, and (v) repeating (iii) and (iv) until all the key entries are contained within the plurality of RAMs.

According to further features in the described preferred embodiments, the method further includes the step of partitioning, into hierarchical levels, a column of the columns in one of the RAMs.

According to further features in the described preferred embodiments, the method further includes the step of searching the plurality of RAMs for a potential match for the input key.

According to further features in the described preferred embodiments, the searching includes: (i) locating a relevant key entry of the key entries within one RAM of the RAMs, and (ii) comparing the relevant key entry with the input key.

According to further features in the described preferred embodiments, the searching further includes: (iii) comparing the input key with a relevant key entry in at least one corresponding cells within the RAMs, until a match is identified.

According to further features in the described preferred embodiments, the method further includes the step of retrieving a data entry associated with the relevant key entry.

According to further features in the described preferred embodiments, the RAMs include a plurality of data entries, each of the data entries being associated with a particular one of the key entries.

According to another aspect of the present invention, there is provided a method for storing arranged data in a memory, the method including the steps of: (a) providing a system including: (i) at least one random access memory (RAM), and (ii) processing means for searching a plurality of the key entries in response to an input key; (b) storing key entries within the RAM; (c) arranging the key entries in a hierarchical structure having k hierarchical levels, wherein $k \geq 2$, such that each level of the hierarchical levels is in monotonic order, and (d) searching the hierarchical structure, in response to the input key, to identify a potential match.

According to another aspect of the present invention, there is provided a method for storing arranged data in a memory, the method including the steps of: (a) providing a system including: (i) a random access memory (RAM) including a first array of cells, the first array having at least two dimensions and having rows and columns, the first array designed and configured to contain a plurality of key entries, each of the cells being accessible via an input key, and (ii) processing means for searching the plurality of the key entries in response to an input key; (b) storing the plurality of the key entries within the RAM in monotonic order; (c) arranging end-column key entries of the plurality in a hierarchical structure having k hierarchical levels, wherein $k \geq 2$, such that each level of the hierarchical levels is in monotonic order, and (d) searching the hierarchical structure, in response to the input key, to identify a key entry that potentially matches the input key.

According to further features in the described preferred embodiments, the arranging within the hierarchical levels is according to a base B, wherein a first level of the levels contains particular key entries of the end column key entries, the particular key entries taken from the end column key entries at a key entry interval of $B^{k-1}$.

According to further features in the described preferred embodiments, a next-highest level of the levels contains particular key entries of the end column key entries, the particular key entries taken from the end column key entries at a key entry interval of $B^{k-2}$.

According to further features in the described preferred embodiments, $k \geq 3$, and wherein a subsequent level succeeding the next-highest level contains particular key entries of the end column key entries, the particular key entries taken from the end column key entries at a key entry interval of $B^{k-3}$.

According to further features in the described preferred embodiments, the first level is a highest hierarchical level of the hierarchical levels.

According to further features in the described preferred embodiments, each of the key entries is stored in a single one of the hierarchical levels, thereby saving space in the at least one array.

According to further features in the described preferred embodiments, the searching of the hierarchical structure includes: (i) searching the particular key entries in the first level to locate a pointing key entry for the input key, the pointing key entry pointing to a row in a next-highest level of the levels.

According to further features in the described preferred embodiments, the next-highest level contains particular key entries of the end column key entries, the particular key entries taken from the end column key entries at a key entry interval of $B^{k-2}$, and wherein the searching of the hierarchical structure includes: (ii) searching the particular key entries in the next-highest level to locate a second pointing key entry for the input key, the second pointing key entry pointing to a row in a subsequent level succeeding the next-highest level.

According to further features in the described preferred embodiments, the next-highest level contains particular key entries of the end column key entries, the particular key entries taken from the end column key entries at a key entry interval of $B^{k-2}$, and wherein the searching of the hierarchical structure includes: (ii) searching the row in the next-highest level to locate a match for the input key.

According to further features in the described preferred embodiments, the subsequent level contains particular key entries of the end column key entries, the particular key entries taken from the end column key entries at a key entry interval of $B^{k-3}$, and wherein the searching of the hierarchical structure includes: (ii) searching the row in the subsequent level to locate a match for the input key.

According to another aspect of the present invention, there is provided a method for storing arranged data in a memory, the method including the steps of: (a) providing at least a first array having at least two dimensions, the first array consisting of rows and columns, the first array having a plurality of key entries representing range boundary information, each range boundary information corresponding to a particular range; (b) providing at least a second array having at least two dimensions, the second array consisting of rows and columns, the second array having a plurality of associated data entries, each of the data entries being associated with a particular one of the range boundary information; (c) performing a change in the plurality of key entries in the first array, and (d) updating the plurality of associated data entries in accordance with the change.

According to further features in the described preferred embodiments, the updating includes: (i) identifying at least one particular associated data entry of the plurality of associated data entries that requires updating.

According to further features in the described preferred embodiments, the updating further includes: (ii) reassigning the at least one particular associated data entry to a different one of the key entries.

According to further features in the described preferred embodiments, the updating includes: (i) identifying at least one particular associated data entry of the plurality of associated data entries that requires updating, and (ii) reassigning the at least one particular associated data entry to a different one of the key entries.

According to further features in the described preferred embodiments, the range boundary information is a single range-boundary value.

According to further features in the described preferred embodiments, the change in the plurality of key entries includes an Insert operation.

According to further features in the described preferred embodiments, the change in the plurality of key entries includes a Remove operation.

According to further features in the described preferred embodiments, the method further includes the step of providing range validity data for each of the plurality of key entries.

According to further features in the described preferred embodiments, the updating further includes: (ii) assigning a fixed-length bit-map to a group of the key entries whose associated data entries require updating.

According to further features in the described preferred embodiments, the updating includes: (ii) writing, in the second array, the associated data entries that require updating.

According to another aspect of the present invention, there is provided a method for storing arranged data in a memory, the method including the steps of: (a) providing a system including: (i) a random access memory (RAM) including a first array of cells, the first array having at least two dimensions and having rows and columns, the first array for containing a plurality of key entries, each of the cells being accessible via an input key, and (ii) processing means for searching the plurality of the key entries in response to an input key; (b) storing the plurality of the key entries within the first array in monotonic order; (c) performing a change operation in the plurality of key entries in the first array, and, in response to a particular input key, (d) pausing the change operation, and (e) searching the plurality of the key entries to identify a key entry that potentially matches the particular input key.

According to further features in the described preferred embodiments, the method further includes the step of resuming the change operation.

According to further features in the described preferred embodiments, the method further includes the step of storing any of the plurality of key entries in a second array of cells during the change operation.

According to further features in the described preferred embodiments, the pausing occurs in a paused row of the rows, and wherein if the particular input key is greater than the key entries in a row preceding the paused row, and less than the key entries in a row succeeding the paused row, and if the particular input key is greater than all key entries within the paused row, the method further includes the step of: (g) searching the second array of cells to identify a key entry that potentially matches the particular input key.

According to further features in the described preferred embodiments, the pausing occurs in a paused row of the rows, and wherein if the particular input key is greater than the key entries in a row preceding the paused row, and less than the key entries in a row succeeding the paused row, and if the particular input key is less than all key entries within the paused row, the method further includes the step of: (g) searching the second array of cells to identify a key entry that potentially matches the particular input key.

According to further features in the described preferred embodiments, the pausing occurs in a paused row of the rows, and wherein if a searched key entry of the key entries corresponding to the particular input key is outside of the paused row, the method further includes the step of: (g) solely searching the plurality of the key entries within the first array to identify a key entry that potentially matches the particular input key.

According to further features in the described preferred embodiments, the pausing occurs in a paused row of the rows, and wherein if a searched key entry of the key entries corresponding to the particular input key is within the paused row, and if the particular input key satisfies a condition $$K_0 \leq K \leq K_{M-1}$$

where:
$K_0$ is a lowest key entry in the paused row;
$K_{M-1}$ is a highest key entry in the paused row, and
K is the particular input key, then only key entries within the first array are searched to identify a key entry that potentially matches the particular input key.

According to further features in the described preferred embodiments, the change in the plurality of key entries includes an Insert operation.

According to further features in the described preferred embodiments, the change in the plurality of key entries includes a Remove operation.

As used herein in the specification and in the claims section that follows, the term "row" refers to a first line of cells in an array, and the term "column" refers to a second line of cells in an array, the second line of cells being disposed in perpendicular fashion to the first line of cells. For the sake of convenience, all rows are horizontal in the Figures provided hereinbelow, and all the columns are vertical.

As used herein in the specification and in the claims section that follows, the term "monotonic order" and the like refer to one or more rows in an array in which the key entries are arranged in ascending order or in descending order. The term "monotonic order" specifically includes rows having a cyclic monotonic order, e.g., 9,15,69,81,2,4,7, or 23,105, 222,611,8,14.

As used herein in the specification and in the claims section that follows, the term "single monotonic order" and the like refer to a plurality of RAMs that is operatively connected so as to produce extended rows having monotonic order, such that the plurality of RAMs, or at least an array including cells from each of the plurality of RAMs, operates as a single array in which the key entries are in ascending order or in descending order.

As used herein in the specification and in the claims section that follows, the term "corresponding key entries" and the like refer to key entries belonging to different RAMs and sharing a common row index and a common column index.

As used herein in the specification and in the claims section that follows, the term "mixed order" refers to a RAM containing key entries, at least one of which is larger than and at least one of which is smaller than a key entry contained within another RAM within a Multiple-RAM system. Preferably, the key entries stored in each of these RAMs are in monotonic order.

As used herein in the specification and in the claims section that follows, the term "relevant key entry" refers to an exact match in the case of a Binary CAM, and a match within a range, in the case of a Range CAM.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a schematic illustration of a two-dimensional, M-column by N-row, memory array;

FIG. 7 is a schematic illustration of Step 1—row location—of a sequential key search in a TDA;

FIG. 9 is a schematic timing diagram for (a) a two-step serial key search, and (b) for a corresponding pipelined key search;

FIG. 22 is a schematic illustration of a first column RAM (FC-RAM) for the G-RAM of the present invention;

Figure 35:
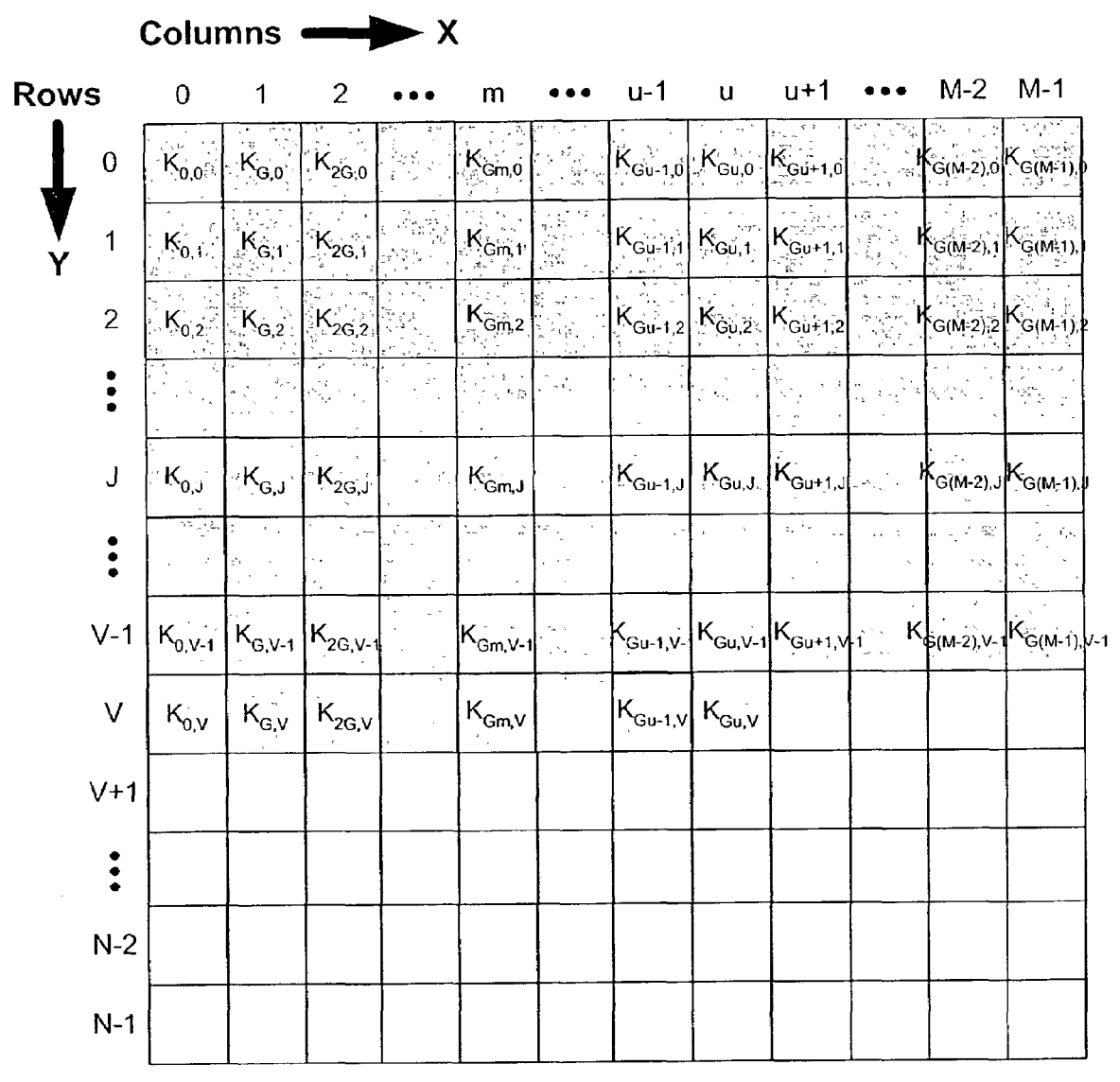

FIG. 35 is a schematic illustration of RAM # having key entries stored in ascending order in non-contiguous cells, FIG. 36 is a schematic illustration of a G-RAM having four 4×4 RAMs having key entries stored in ascending order in non-contiguous cells.

DESCRIPTION OF THE PREFERRED EMBODIMENTS

Figure 1:
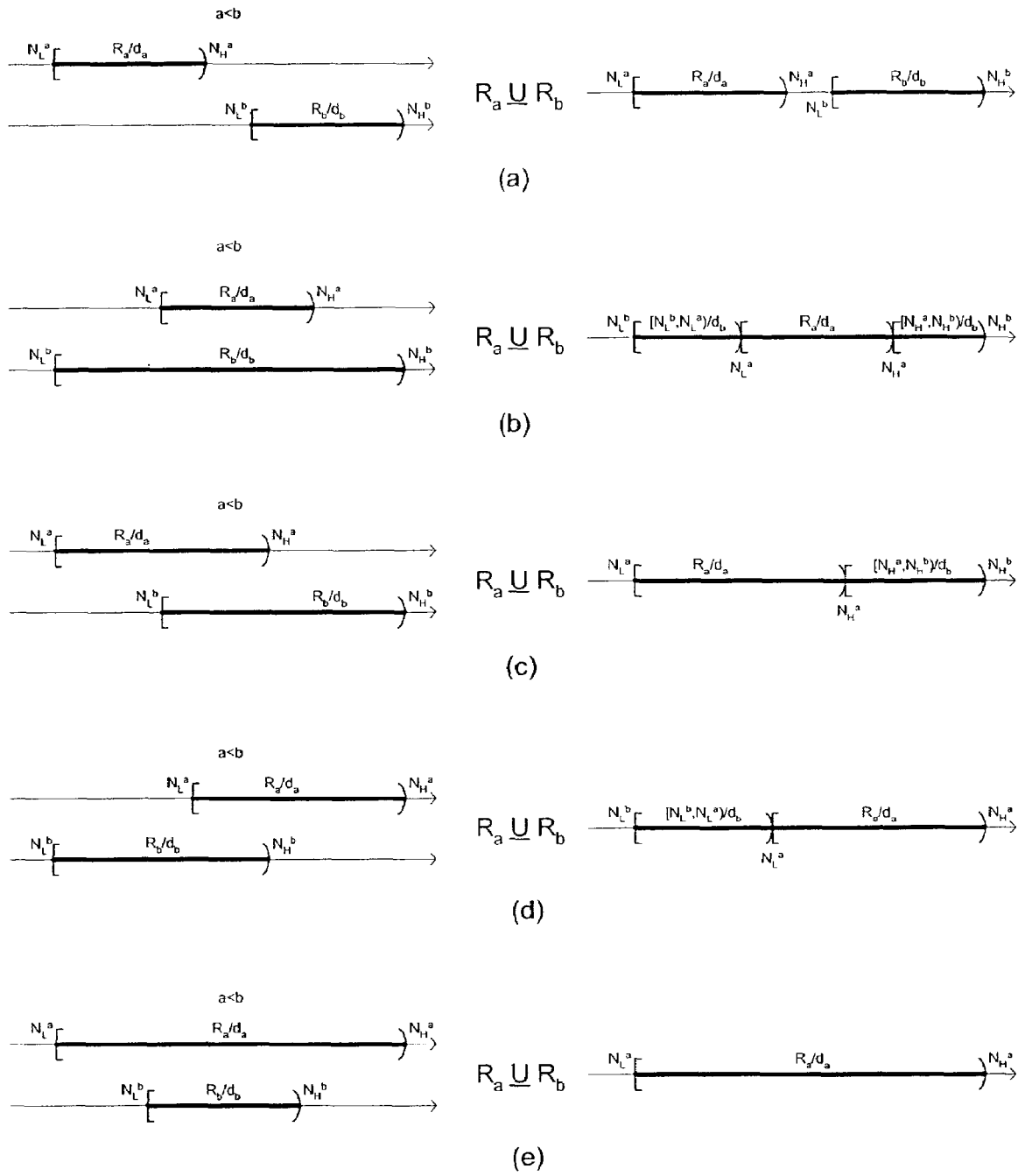
FIG. 1 is a graphical illustration of a combination of two overlapping ranges and the resulting set of non-overlapping ranges.

The principles of the Multiple Random Access Memory (RAM)-Based Binary Content Addressable Memory (CAM) and a Multiple RAM-Based Range Content Addressable Memory (RCAM), according to the present invention, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

1. RCAM

1.1 RCAM Definition

An RCAM combines the memory function with associative processing capabilities. It stores intervals of integers called Key Ranges and Associated Data (also integers) that correspond uniquely to these ranges. If a Key, an integer, is submitted, the RCAM searches for the associative range that may contain the submitted key. If such a range is found, the data associated with this range is retrieved. The associated data is accompanied by a Match signal. If the submitted key is not found in the set of stored ranges, a No-Match signal is issued.

1.2 Range Definition

A Range R is defined as a set of all the integers K that comply with the condition $N_L \leq K < N_H$, where $N_L$ and $N_H$ are two integers such that $0 \leq N_L < N_H$. This condition is denoted by $$R = [N_L, N_H)$$

where $N_L$ and $N_H$ are defined as the Range Lower and Upper Boundaries, respectively.

The Range definition implies that the Range Lower Boundary $N_L$ belongs to the Range, whereas the Range Upper Boundary $N_H$ does not belong to the Range. The Range Lower Boundary is a Closed Boundary in mathematical terms, whereas the Range Upper Boundary is an Open Boundary. Thus, the Range as defined is a Semi-Closed/Semi-Open interval of integers.

The Range as defined above provides a very efficient representation for address ranges in Classless Inter Domain Routing (CIDR) used in Internet Protocol Version 4 (IPv4), the currently used IP version.

1.3 Range-Associated Data and Match Value

The most common operation performed upon ranges is a search and identification of the range that contains a submitted key K (an integer), and, as a result, retrieval of associated data (another integer) that corresponds uniquely to the identified range.

Two ranges are called Overlapping Ranges if there is any integer K that is included in both ranges. In general, a Key Search over a set of overlapping ranges may yield inconsistent results, as the key may be found in several of these ranges, each one having its own unique associated data. To obtain associated data from overlapping ranges, each range is assigned a Priority. Then, if the Key Search results in several matches, the associated data of the highest-priority matching range is selected.

The submitted integer K is searched in the set $\Re$ of overlapping ranges and, if found, a single integer $d \geq 0$ is retrieved from the corresponding set D of Associated Data; this integer is called Associated Data. Besides, a Boolean variable m, called Match value, assumes the value "1", indicating a Match. If i is the highest-priority index (or lowest index value) of all the matching ranges in $\Re$, then $d = d_i$ and $d_i = $ "1". If the submitted integer K is not found in $\Re$, the Match value assumes the value "0", indicating that there is No-Match. Then, the value of d has no meaning, indicated by d=x, where x represents a Don't Care.

This process of Associated Data retrieval, in which the submitted Key is first searched in all the ranges, is called Post-Processing. It allows a simple but inefficient implementation in hardware, and results in high power consumption and search performance that varies with the number of priority rules.

1.4 Equivalent Non-Overlapping Range Set and Related Range Operations

An alternative and more efficient method to search for the submitted key K and retrieve the associated data, called Pre-Processing, is based on the combination of the overlapping ranges and their conversion to equivalent non-overlapping ranges prior to the search. In this method, the original overlapping range set $\Re$ is transformed into an Equivalent Non-Overlapping Range Set that yields consistently the same associated data from an Associated Data Set corresponding to the Equivalent Non-Overlapping Range Set.

In a Non-Overlapping Range Set, an integer K cannot belong simultaneously to two different ranges. This makes the notion of range priority dispensable.

A Non-Overlapping Range Set and an Overlapping Range Set are equivalent if and only if for every integer K the two yield the same results, i.e., the same Match values and Associated Data.

The combination of two overlapping ranges is defined in terms of the two overlapping ranges $R_a/d_a$, that represents a range $R_a = [N_L^a, N_H^a)$ with an Associated Data $d_a$, and $R_b/d_b$, that represents a range $R_b = [N_L^b, N_H^b)$ with an Associated Data $d_b$, where a<b; that is, $R_a$ has a higher priority than $R_b$.

The overlapping $R_a$ and $R_b$ lead to several possible combinations. The combination results are illustrated in FIG. 1 and summarized in Table 1. In each of these combinations, $R_a$ has a higher priority than $R_b$ and the result always contains the original $R_a$; however, $R_b$ is always replaced by newly created ranges or is completely eliminated.

The $\underline{U}$ sign designates the operation that combines the two ranges. Range Algebra is distinct in the sense that the $\underline{U}$ operand result depends not only on value of the basic elements but also on their boundary values.

TABLE 1

Combination of Two Overlapping Ranges and the Resulting Equivalent Non-Overlapping Ranges

| Topological Relation Between $R_a$ and $R_b$ | | Result: | |
|---|---|---|---|
| $N_L^a$ | $N_H^a$ | $R_a \underline{U} R_b$ | Comment |
| $N_L^a \in R_b$ | $N_H^a \in R_b$ | $[N_L^b, N_L^a)/d_b$, $R_a/d_a$, $[N_H^a, N_H^b)/d_b$ | $R_a$ is included in $R_b$ |

TABLE 1-continued

Combination of Two Overlapping Ranges and the Resulting Equivalent Non-Overlapping Ranges

| Topological Relation Between $R_a$ and $R_b$ | | Result: | |
|---|---|---|---|
| $N_L{}^a$ | $N_H{}^a$ | $R_a \underline{U} R_b$ | Comment |
| $N_L{}^a \in R_b$ | $N_H{}^a \in R_b$ | $R_a/d_a$, $[N_H{}^a, N_H{}^b)/d_b$ | |
| $N_L{}^a \in R_b$ | $N_H{}^a \in R_b$ | $[N_L{}^b, N_L{}^a)/d_b$, $R_a/d_a$ | |
| $N_L{}^a \in R_b$ | $N_H{}^a \in R_b$ | $R_a/d_a$ | $R_b$ is included in $R_a$ |

In general, there are five possible different results when two ranges are combined using the $\underline{U}$ operator. FIG. 1 illustrates graphically these results in five separate drawings, FIG. 1(a) through FIG. 1(e). The original Ranges $R_a$ and $R_b$ are depicted at the left side of each drawing. The $\underline{U}$ operation result is depicted at the right side of each drawing. In all the cases, $R_a$ assumes a higher priority than $R_b$, that is, a<b.

FIG. 1(a) corresponds to the simple case of non-overlapping ranges, which remain unchanged; this case is not listed in Table 1. FIG. 1(b) through FIG. 1(e) correspond to the four cases presented in the table. In FIG. 1(a), $R_a$ and $R_b$ remain unchanged after the $\underline{U}$ operation. In FIG. 1(e), $R_a$ remains unchanged whereas $R_b$ is eliminated. In FIG. 1(b) through FIG. 1(d), $R_a$ remains unchanged, $R_b$ disappears, and one or two ranges are created.

Two Non-overlapping Ranges $R_i$ and $R_{i+1}$ are called Adjacent Ranges, if they share one boundary, that is $$N_H^i = N_L^{i+1}.$$

According to this definition, $[N_L{}^b, N_L{}^a)$ and $R_a$ in FIG. 1(b) are Adjacent Ranges as they share $N_L{}^a$, which is the open boundary of $[N_L{}^b, N_L{}^a)$ and the closed boundary of $R_a$, two non-overlapping ranges. Similarly, $R_a$ and $[N_H{}^a, N_H{}^b)$ in the same figure are Adjacent Ranges, sharing $N_H{}^a$, which is the open boundary of $R_a$ and the closed boundary of $[N_H{}^a, N_H{}^b)$.

Adjacent Ranges enable a compact way of representing ranges, which results in significant saving in storage space. The shared boundaries of the Adjacent Ranges in FIG. 1(b) are marked twice, once as the open boundary of a left-hand range, and once as a closed boundary for the right-hand range.

An Adjacent Range Set, $\Re^A \equiv \{[N_1, N_2), [N_2, N_3), \ldots, [N_{i-1}, N_i), [N_i, N_{i+1}), \ldots, [N_{q-1}, N_q), [N_q, N_{q+1})\}$, and its Associated Data Set, $D^A = \{d_1, d_2, \ldots, d_{i-1}, d_i, \ldots, d_{q-1}, d_q\}$, can be represented by the boundary integer set $\Re^A = [N_1, N_2, N_3, \ldots, N_{i-1}, N_{i+1}, \ldots, N_{q-1}, N_q, N_{q+1})$, where $N_1$ is the closed boundary of the leftmost Adjacent Range, $N_2, N_3, \ldots, N_{i-1}, N_i, \ldots N_{q-1}, N_q$ are the shared boundaries of the Adjacent Ranges, and $N_{q+1}$ is the open boundary of the rightmost Adjacent Range.

This definition implies that $N_1 < N_2 < N_3 < \ldots < N_{i-1} < N_i < \ldots < N_{q-2} < N_{q-1} < N_q < N_{q+1}$.

Searching in $\Re^A$ for a Range $R_i$ which contains the integer K, and retrieving the Associated Data $d_i$, implies finding i such that $N_i \leq K < N_{i+1}$.

The above definition yields a compact Adjacent Range representation, because each shared boundary is presented only once, instead of twice in the Adjacent Range notation used above. For instance, the following notations are equivalent in the case shown in FIG. 1(b):

$\{[N_L{}^b, N_L{}^a), R_a, [N_H{}^a, N_H{}^b)\} \equiv [N_L{}^b, N_L{}^a, N_H{}^a, N_H{}^b)$ FIG. 1 and Table 1 show that if $R_a$ and $R_b$ are two Overlapping Ranges, then $\Re^A = R_a \underline{U} R_b$ is an Adjacent Range Set, whose compact representation is $[N_1^A, \ldots, N_n^A)$, where $2 \leq n \leq 4$.

Using the $\underline{U}$ operator repeated times upon an Overlapping Range Set $\Re$ and its Associated Data Set D, and applying the Commutative and Associative Laws for this operator until all the resulting ranges become non-overlapping, yield an Equivalent Non-overlapping Range Set with an Associated Data Set.

In general, the number of boundaries in the Equivalent Non-Overlapping Range is significantly less than the sum of all the boundaries of the overlapping ranges. Some of these boundaries may coincide with one or more of the overlapping range boundaries.

Figure 2:
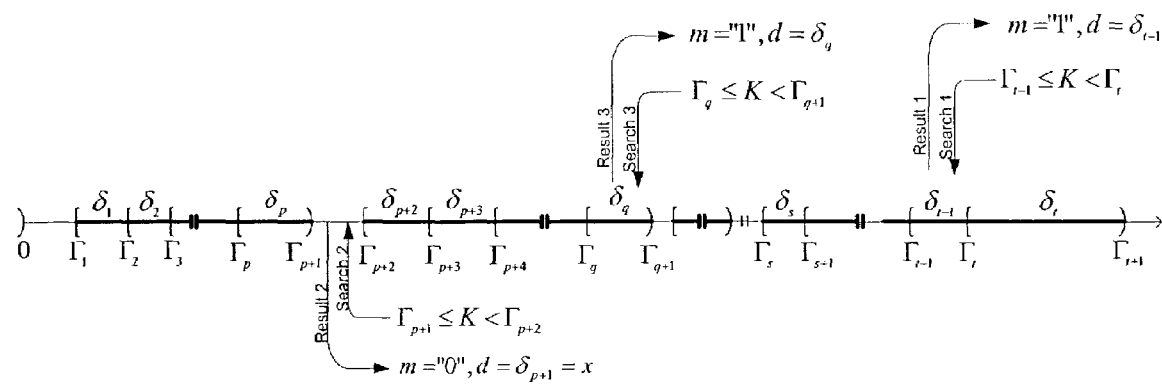
FIG. 2 is a graphical illustration of a Key search process for a matching non-overlapping range and the corresponding associated data.

FIG. 2 illustrates how a Key Search is performed over an Equivalent Non-overlapping Range Set and its Associated Data.

Three different cases of searches are presented:

Case 1: Search is performed where the key K falls into an interval $\Gamma_{t-1} \leq K < \Gamma_t$. Since $\Gamma_{t-1}$ is a Closed Boundary, then $[\Gamma_{t-1}, \Gamma_t)$ is a Range. The result of this search is m="1" (Match), and d=$\delta_{t-1}$. It should be noted that since $\Gamma_t$ is a Closed Boundary, the interval at the right of $\Gamma_t$ is also a Range.

Case 2: Search is performed where the key K falls into an interval $\Gamma_{p+1} \leq K < \Gamma_{p+2}$. Since $\Gamma_{p+1}$ is an Open Boundary, then the interval]$\Gamma_{p+1}, \Gamma_{p+2}$[is not a Range. The result of this search is m="0" (No-Match) and d=x, where x means Don't Care.

Case 3: Search is performed where the key K falls into an interval $\Gamma_q \leq K < \Gamma_{q+1}$. Since $\Gamma_q$ is a Closed Boundary, then $[\Gamma_q, \Gamma_{q+1})$ is a Range. The result of this search is m="1" (Match), and d=$\delta_q$. Since $\Gamma_{q+1}$ is an Open Boundary, the interval at the right of $\Gamma_{q+1}$ is not a Range.

It may be concluded from the three cases presented above that the type of interval that contains the key K is a Range is solely determined by the interval left boundary. If this is a Closed Boundary, then the interval is a Range, there is a Match ($m_{interval}$="1") and there is a meaningful Associated Data $d_{interval}$ corresponding to this Range. If, however, the interval left boundary is an Open Boundary, then the interval is not a Range, and there is No-Match ($m_{interval}$="0") the Associated Data has no meaning.

Since the notion of the leftmost boundary of an interval that contains the key is used to determine whether the interval is a Range, care must be taken regarding the interval between 0 and $\Gamma_1$ (left boundary of the leftmost Range). If $\Gamma_1 > 0$, then the integer 0 must be denoted as an Open Boundary. This ensures that searching for a key in the interval]0, $\Gamma_1$[will yield No-Match.

1.5 Use of Non-Overlapping Ranges for Storing IPv4 CIDR Addresses

An IPv4 CIDR Address (actually a range of addresses) consists of 32 bits. These 32-bit values are typically represented as four decimal values separated by dots, each representing an 8-bit binary number. The IPv4 CIDR address range is represented as:

A/p, where A is the IPv4 address and p is the prefix.

The prefix is the number of contiguously compared most significant bits from left to right. $0 \leq p \leq 32$. The prefix is equivalent to a 32-bit mask consisting of p 1's followed by 32-p 0's; each bit 0 indicates that this bit in the CIDR address must be ignored when compared its value with a submitted address.

The IPv4 CIDR address range can be represented as a range using the following formula:

$$A/p \equiv [A, A+2^{32-p})$$

comparing this formula with the range definition given above $R \equiv [N_L, N_H)$, it is clear that the IPv4 CIDR address range parameters A and p are related to the range lower (closed) boundary $N_L$ and upper (open) boundary $N_H$ by simple formulas:

$$N_L = A$$

$$N_H = A + 2^{32-p}$$

$$p = 32 - \log_2(N_H - N_L)$$

IPv4 CIDR addresses can always be represented by ranges, but not all the ranges can have equivalent CIDR addresses. However the CIDR addresses can be aggregated to form any range.

IPv4 CIDR address ranges are characterized in that smaller ranges have higher priority and are thus contained in larger ranges; i.e., if $R_a \equiv A_a/P_a$ and $R_b \equiv A_b/p_b$ are two IPv4 CIDR overlapping address ranges, where $p_a > p_b$ (a<b), then $R_a \equiv A_a/p_a \subset R_b \equiv A_b/p_b$, as shown in FIG. 1(b). IPv4 CIDR address ranges can also be non-overlapping, as in FIG. 1(a), but cannot be partially overlapping as in FIG. 1(c) or FIG. 1(d). The case shown in FIG. 1(e), where the larger range $R_b$ has higher priority than $R_a$ is not possible either.

If $R_a \subseteq R_b$, as shown in FIG. 1(b), then $R_a$ is left unchanged after the $R_a \underline{U} R_b$ operation, and the ranges $[N_L^a, N_L^b)/d_b$ and $[N_H^a, N_H^b)/d_b$ are created; both ranges have the priority of $R_b$, which is lower than that of $R_a$.

The IPv4 CIDR address ranges are pre-processed using the $\underline{U}$ operator until yielding equivalent non-overlapping ranges for storage as sequential keys in the Key TDA of a RAM-Based RCAM. When a new IPv4 CIDR address range is inserted, it is processed with the already stored non-overlapping ranges within its boundaries only, because larger ranges outside them have lower priority and are not affected. Similarly, when an enlisted address range is removed, the remaining ranges within its boundaries are processed before their storage.

1.6 Bit-Map Update Operation

The Bit-Mapped Update Operation consists of changing the Associated Data and Associated Boundary Type entries corresponding to a specified group of sequential keys in the Key TDA, without changing the number of keys in this TDA. This operation is generally necessary when an overlapping IPv4 CIDR address range is inserted in or removed from the TDA. A pre-processing algorithm determines whether it is necessary to insert or remove one or more keys within the boundaries of the inserted or removed address range, and also the consequent changes (if required) in the associated boundary type and associated data entries corresponding to this group of sequential keys.

The Bit-Mapped Update Operation can be implemented by first using Memory pointers defined by the Search command to determine the specific write row location. The Bit-Mapped Update command determines, by means of a fixed-length Bit-Map, the group of sequential keys whose associated boundary type and associated data entries are to be (or not) changed in each row. Then, the command writes at-once, row by row, the groups of associated boundary type and associated data entries corresponding to the specified group of sequential keys.

2. Single-RAM Binary CAM and RCAM 2.1 Single-RAM Architecture

The basic concept underlying the approach of the RAM-Based Binary CAM or RAM-Based RCAM is keeping the key list in an orderly fashion. The key entries are stored in such a way that:

The key entries may be located in either a contiguous ascending or descending order in a multidimensional memory array.

The block of occupied locations may either start at the first memory address or end in the last memory array address.

The empty locations in the memory array are contiguous, and may either follow or precede the occupied locations, with a uniquely defined transition point between the last occupied location and the first empty location, or vice versa.

Although the RAM-based RCAM may be implemented using any of the alternatives described above, we shall limit our discussion to the following cases:

The key entries are stored in contiguous ascending order along the rows of a Two-Dimensional Array (TDA).

The key list starts at the lowest memory array address.

The empty locations block follows the key list.

Figure 3:
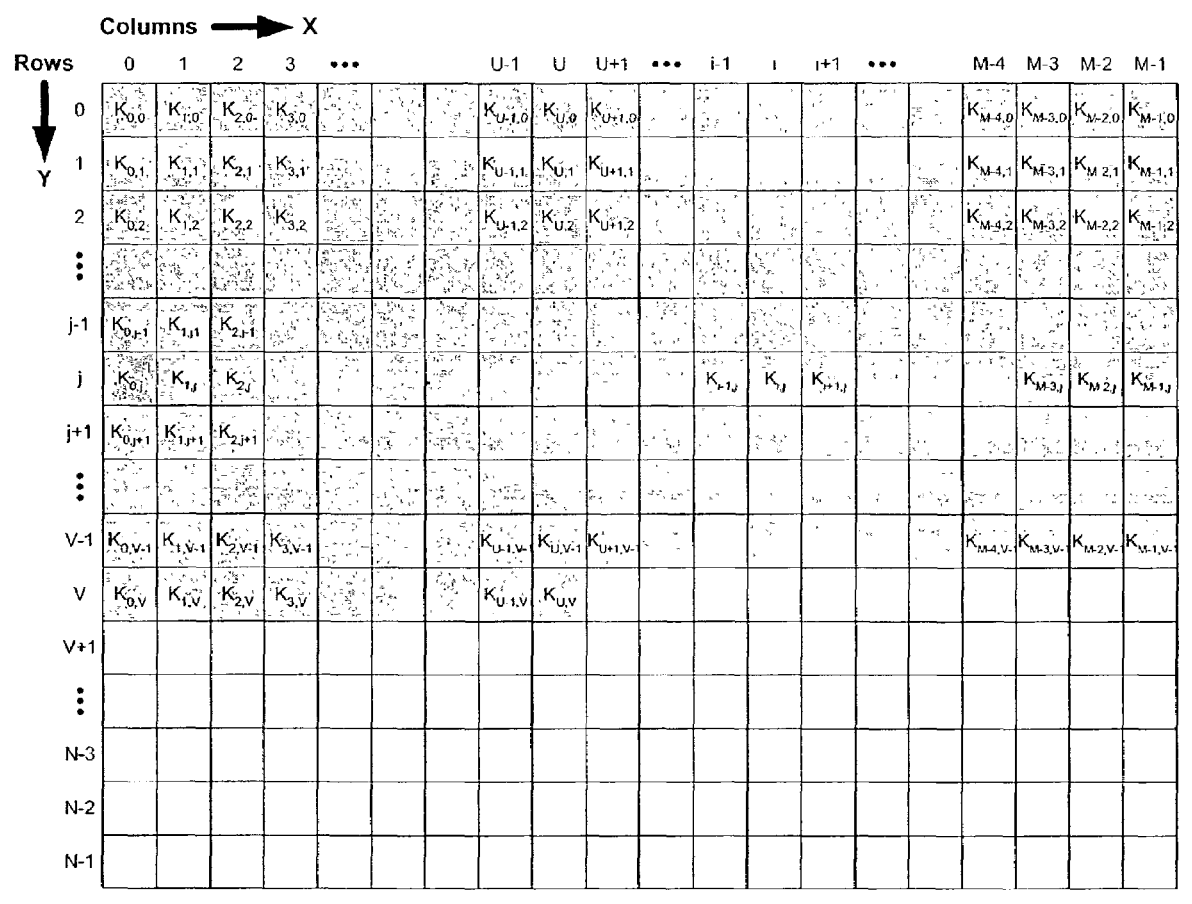

FIG. 3 depicts a TDA of M columns by N rows. The rows are sequenced from top to bottom and indexed with an integer j, where $0 \leq j \leq N-1$. The columns are sequenced from left to right and indexed with an integer i, where $0 \leq i \leq M-1$. The occupied key entry locations are shadowed with light gray. The empty locations are blank. A key located in column i and row j has an integer value Ki,j. The lowest key value $K_{0,0}$ resides in row 0 and column 0. The highest key value $K_{U,V}$ resides in row V and column U.

The TDA parameters are:

b: Key data width

M: Number of TDA columns, or number of b-bit wide key words in a TDA row

N: Number of TDA rows

U: Last key entry column

V: Last key entry row j: Key row index, $0 \leq j \leq V$ i: Key column index, $0 \leq i \leq M-1$ for j<V and $0 \leq i \leq V$ for j=V The TDA is implemented by means of a conventional RAM depicted in FIG. 4. The RAM parameters are:

W: Width of the RAM word and of the RAM data bus $\delta_0 - \delta_{w-1}$: RAM word bus, where $\delta_0$ is defined as the word rightmost bit, and $\delta_{w-1}$ is the word leftmost bit.

P: Number of w-bit wide words in the RAM $Adr_0 - Adr_{k-1}$: k-bit wide RAM address bus.

Each w-bit wide RAM word contains M key words:

$$w = M \cdot b$$

Figure 5:
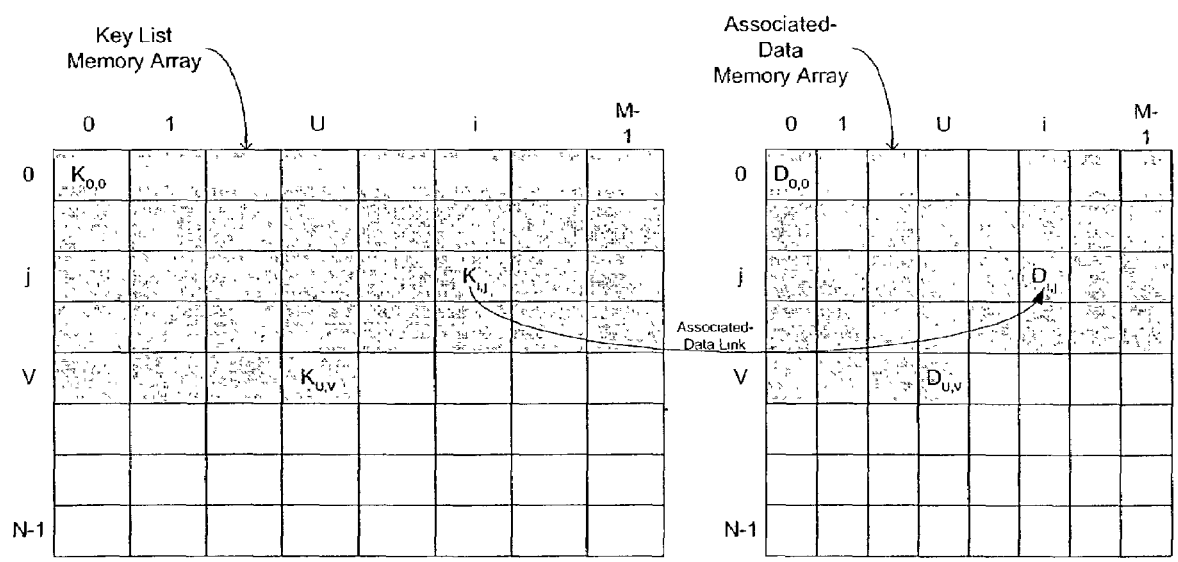
FIG. 5 is a schematic illustration of the correspondence between the two-dimensional key list and the associated data list for a binary CAM.

The RAM-Based Binary CAM contains two TDAs or lists, Key List and Associated Data List. Each key entry Ki,j has a corresponding Associated Data entry Di,j as depicted in FIG. 5. Since the Binary CAM stores an ordered list of single integer keys, a key search results in an exact match and a straightforward access to the corresponding associated data.

Figure 6:
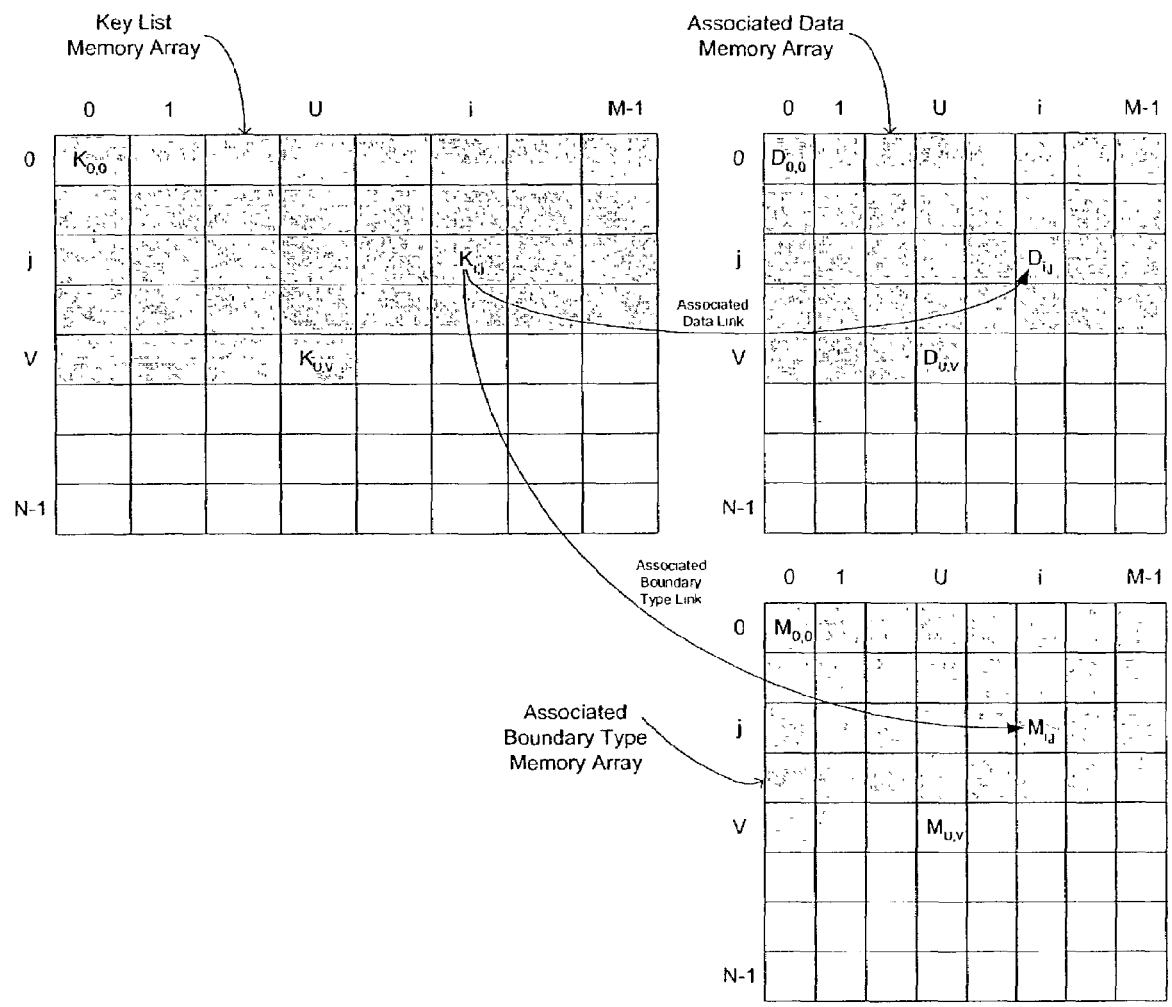
FIG. 6 is a schematic illustration of the correspondence between the two-dimensional key list, the associated data list and the associated boundary type list.

The RAM-Based RCAM includes additionally an Associated Boundary Type List, where each Associated Boundary Type entry Mi,j corresponds to the key entry Ki,j as shown in FIG. 6. The RCAM stores a list of key entries that represent range boundaries, so that a key search results in a matching range, and the retrieval of the associated data and boundary type that corresponds uniquely to this range. The associated boundary type determines the validity of the matching range and the associated data.

The entries of the Key List, Associated Data List and Associated Boundary Type List (for an RCAM) are always kept in a compact and sequential form (monotonously increasing or decreasing), and perfect correspondence, by means of consistent Insert and Remove algorithms.

The RCAM ranges must be adjacent non-overlapping for RAM-based operation. This requires the prior conversion of overlapping range sets into equivalent adjacent non-overlapping range sets. If the non-overlapping ranges are not adjacent, they can be are made adjacent by "interpolating" intervals between them. These intervals are not proper ranges, because they have open lower boundary and closed upper boundary, unlike a proper range that has closed lower boundary and open upper boundary. Adjacent ranges yield a compact representation, in which each shared boundary appears once instead of twice in the "conventional" adjacent range notation. The RCAM sequentially stores only the lower boundaries of the adjacent ranges (in contiguous ascending order) instead of both the lower and upper boundaries. The upper boundary of the last range is also included at the end. The intervals with open lower boundaries are considered as invalid ranges and the data entries associated with these intervals have no meaning (Don't Care).

The performance of the Search, Insert and Remove operations requires additional components around the Key TDA, such as a First Column Register, Search Row and Column Locators, and an Inserter/Remover Register.

2.2 Principles of Operation 2.2.1 Key Search in the Key List 2.2.1.1 Serial Two-Step Search Algorithm A sequential search of the submitted key (Key Search) in the TDA can be completed in two steps:

Step 1: Identification of the TDA row where the submitted key may be located. This step is identical for Binary CAMs and RCAMs.

Step 2: Access to the row identified in Step 1 and lookup of the submitted key, to find an exact match (for a Binary CAM) or a range match (for an RCAM). This step is different for Binary CAMs and RCAMs.

Prior to the Key Search in the Key List, the submitted key K is compared with the Key List values in the first and last locations. If $K<K_{0,0}$ (for exact or range match) or $K>K_{U,V}$ (for exact match only), then the search is over because the key is not included in the Key List.

If $K_{0,0} \leq K \leq K_{U,V}$, then the key is potentially listed in the Key List. In this case, the search procedure can start with Step 1.

Figure 7:
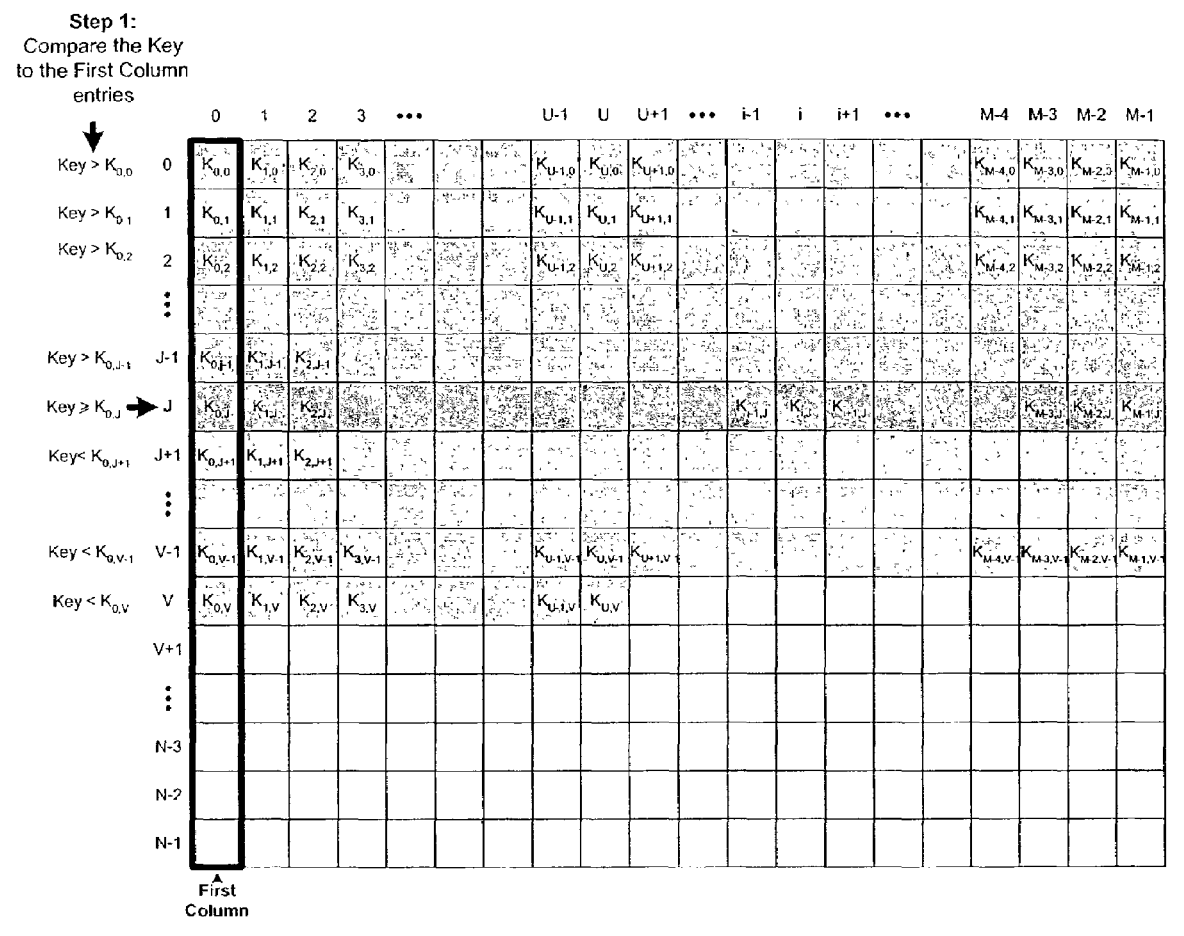

Step 1: This step is performed to locate the TDA row J that may contain submitted the key by searching through the first column key entries (FIG. 7). If the key entry is contained in the Key List, it must be located between two keys in the first column, one smaller or equal and the other larger than the searched key; that is:

$$K_{0,J} \leq K < K_{0,J+1} \text{ for } J<V \text{ or}$$

$$K_{0,J} \leq K \leq K_{U,V} \text{ for } J=V$$

Figure 8:
FIG. 8 is a schematic illustration of Step 2—column location—of a sequential key search in a TDA.

Step 2: This step is performed to locate the key entry in row J (determined in step 1) that may match the submitted key (FIG. 8).

In Binary CAMs, the submitted key is compared with the key entries listed in row J in search for an Exact Match (identical values). The entire J-th row is read out and all the key entries listed in the row are compared with the submitted key K. If there is a row index I such that:

$$K=K_{I,J}$$

the key entry $K_{I,J}$ matches the searched key. In this case the index pair (I,J) is used to access the entry $D_{I,J}$ located in the Associated Data List under the same index pair; $D_{I,J}$ is readout along with a Match signal M="1" that indicates the validity of the retrieved associated data.

In the event that $$K \neq K_{I,J} \text{ for } 0 \leq i \leq M-1 \text{ when } J \neq V \text{ or}$$

$$K \neq K_{I,J} \text{ for } 0 \leq i \leq V \text{ when } J=V$$

there is No Match. In this case, the CAM issues a No-Match signal M="0" to indicate the invalidity of the associated data issued on the Data Bus.

In RCAMs, the submitted key is compared with the key entries in row J in search for a Range Match (inclusion within the range). The entire J-th row is read out and all the range keys listed in the row are compared with the searched key.

If $K_{I,J} \leq K < K_{I+1,J}$, then $$K \geq K_{I,J} \text{ for } i \leq I$$

$$K < K_{I,J} \text{ for } I<i \leq M-1 \text{ if } J<V$$

and for $I<i \leq U$ if $J=V$

If the submitted key is larger than or equals the key $K_{I,J}$, and is smaller than the next key $K_{I+1,J}$, then $K_{I,J}$ listed in row J and column I matches the searched range defined by $K_{I,J} \leq K < K_{I+1,J}$. If the submitted key is larger than all the row entries in the Key TDA, then the last valid key entry in the row is defined as the matching key. The index pair (I,J) of the matching key is used to access the associated data entry $D_{I,J}$ corresponding to $K_{I,J}$ (and to the matching range) located in the Associated Data Memory TDA. The index pair (I,J) is also used to access the associated boundary type entry $M_{I,J}$ located in the Associated Boundary Type TDA; $M_{I,J}$ is a 1-bit number that determines the validity of the range:

$M_{I,J}$="1" corresponds to a Closed Boundary and designates a valid range, and $M_{I,J}$="0" corresponds to an Open Boundary and indicates that the range is not valid.

2.2.1.2 Pipelined Two-Step Search Algorithm

The timing diagrams in FIG. 9 illustrate the difference between the two-step serial and pipelined search algorithms for the Binary CAM or RCAM. In both modes, it is assumed that:

Each step of the two-step search cycle requires one RAM clock period for execution, denoted by T. Thus, each search cycle lasts 2T.

The Search operation starts with a search cycle for submitted Key 1, denoted as Search 1, which starts with a at t=0. Thus, step 1 of Search 1 (RAM row identification) is completed at t=T and step 2 (key entry location in the identified row) at t=2T.

Search $m_1$ and Search $m_2$ represent steps 1 and 2, respectively, of a generic Search m for submitted Key m.

In the serial two-step search algorithm, a new search cycle starts only after the search cycle for the previous key is completed; thus, it requires two clocks for execution and it is performed at half of the clock rate. In this mode, since Step 1 (for Key 1) starts at t=0 and ends at t=2T, Search 2 (for Key 2) starts at t=2T and ends at t=4T; a generic Search m (for Key m) starts at t=(m−1)·2T and ends at t=m·2T. FIG. 9(a) shows the corresponding timing diagram.

In the pipelined search algorithm, a new search cycle starts after the first step of the previous search cycle is completed, i.e., just a clock period T after the start of the previous cycle; thus, it enables to perform search operations at full clock rate. In this mode, Search 2 (for Key 2) starts at t=T and ends at t=3T. A generic Search m (for Key m) starts at t=(m−1)·T and ends at t=(m+1)·2T. Step 1 of Search m takes place simultaneously with step 2 of the preceding Search m−1, whereas Step 2 of Search m proceeds simultaneously with step 1 of the succeeding Search m+1. FIG. 9(b) shows the corresponding timing diagram.

2.2.1.3 First Column Register

Figure 10:
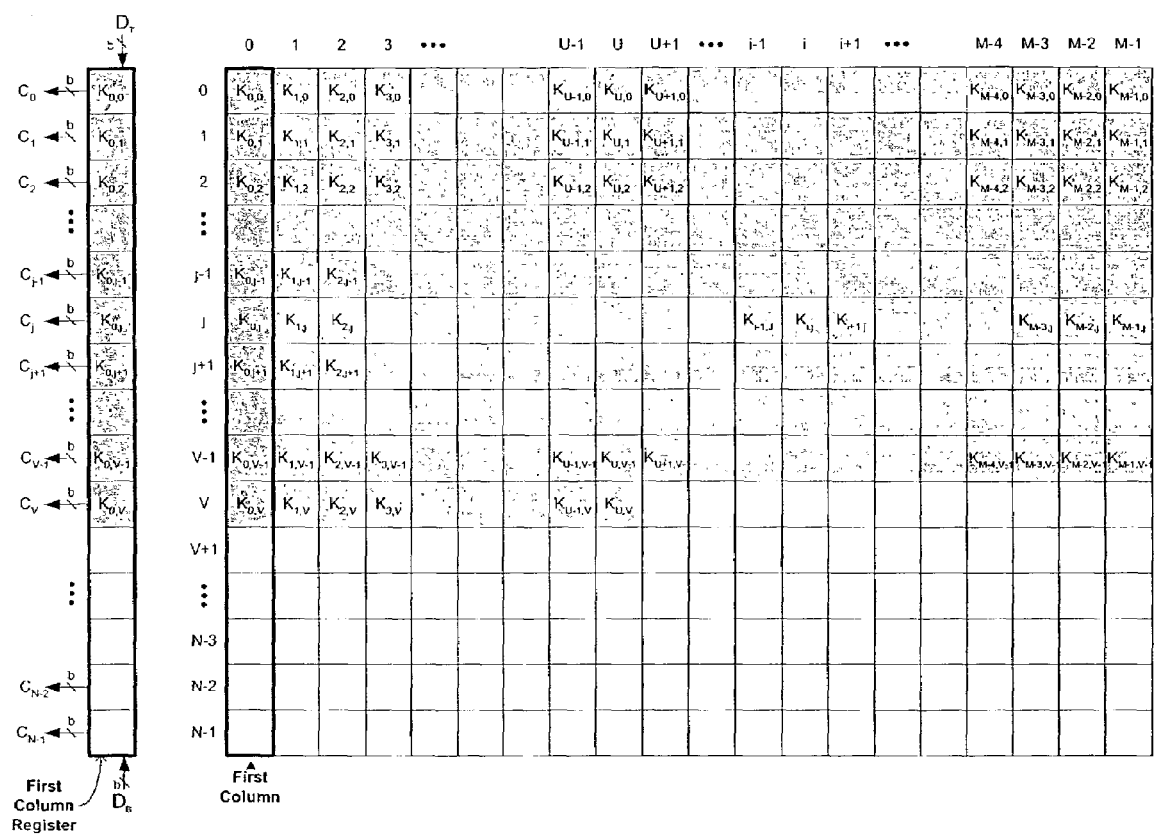
FIG. 10 is a schematic illustration of a first column register enabling simultaneous access to the first column keys.

The search algorithms mentioned above are based on the assumption that the access to the first column entries in the RAM can be performed in one step (or in a single clock). Since the RAM structure enables the access to a single RAM word (or a single TDA row) in a single clock cycle, a First Column Register is used to allow a simultaneous access to the first column keys in the TDA in a single clock (in step 1 of the Serial Two-Step Search Algorithm). This register is identical for Binary CAMs and RCAMs. It incorporates the first column keys and is kept updated as shown in FIG. 10.

The loading of the First Column Register keys is performed during the Key Insert or Key Remove operations. During the Insert operation, the keys are loaded and serially shifted bottom-up from the $D_B$ input. During the Remove operation, the keys are loaded and serially shifted top-down from the $D_T$ input.

2.2.1.4 Search Row and Column Locators

The search algorithms also require a Row Locator for row identification (in step 1 of the Two-Step Search Algorithm) and a Column Locator for key location in the identified row (in step 2).

Figure 11:
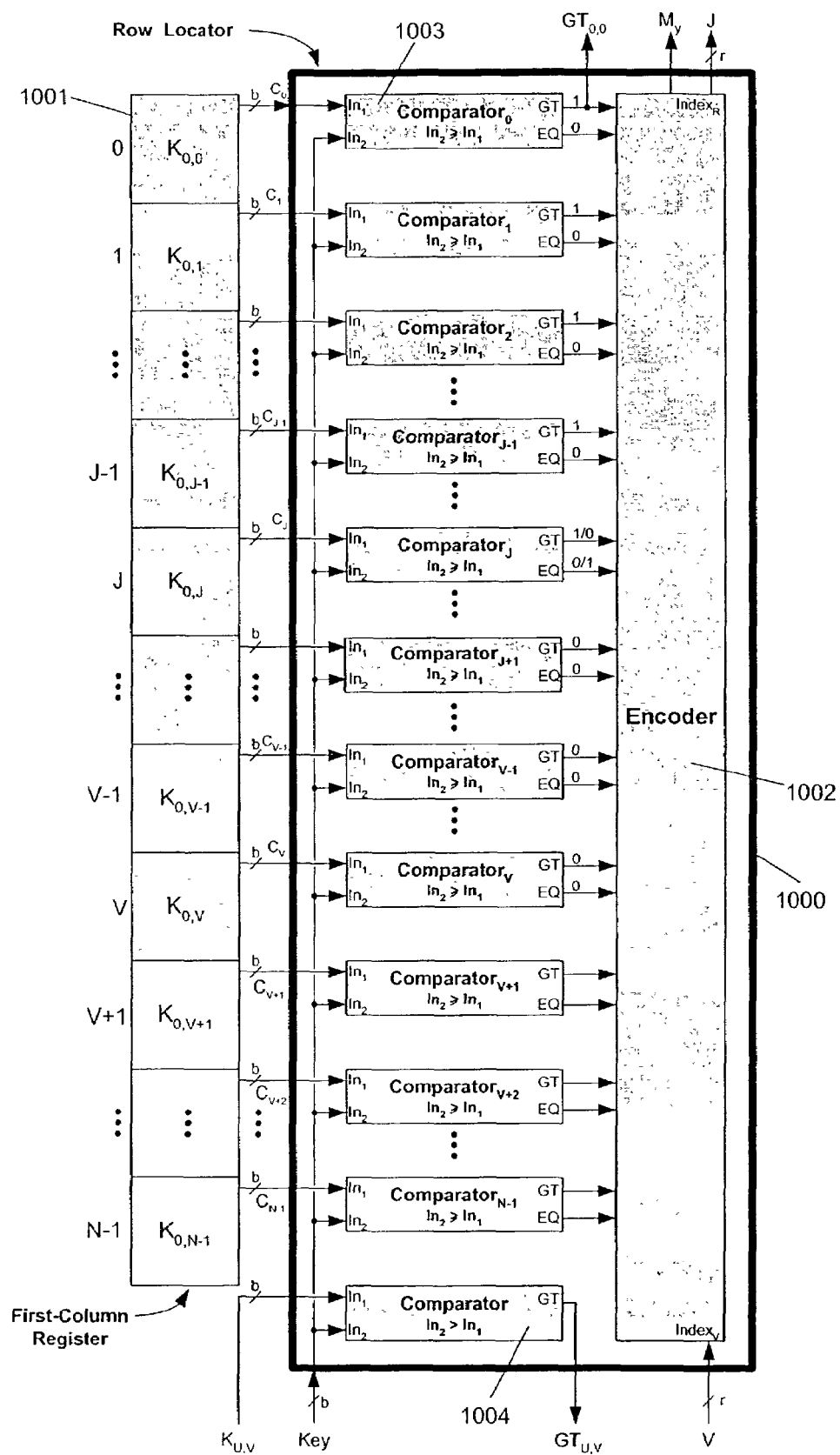
FIG. 11 is a schematic illustration of a preferred embodiment of a row locator.

The Row Locator is identical for Binary CAMs and RCAMs. A possible implementations is shown in FIG. 11.

The Column Locator is different for Binary CAMs and RCAMs. In Binary CAMs, the Column Locator searches for a key entry that exactly matches the submitted key, whereas in RCAMs it searches for a key entry which represents the lower boundary of the range that contains the submitted key.

Figure 12:
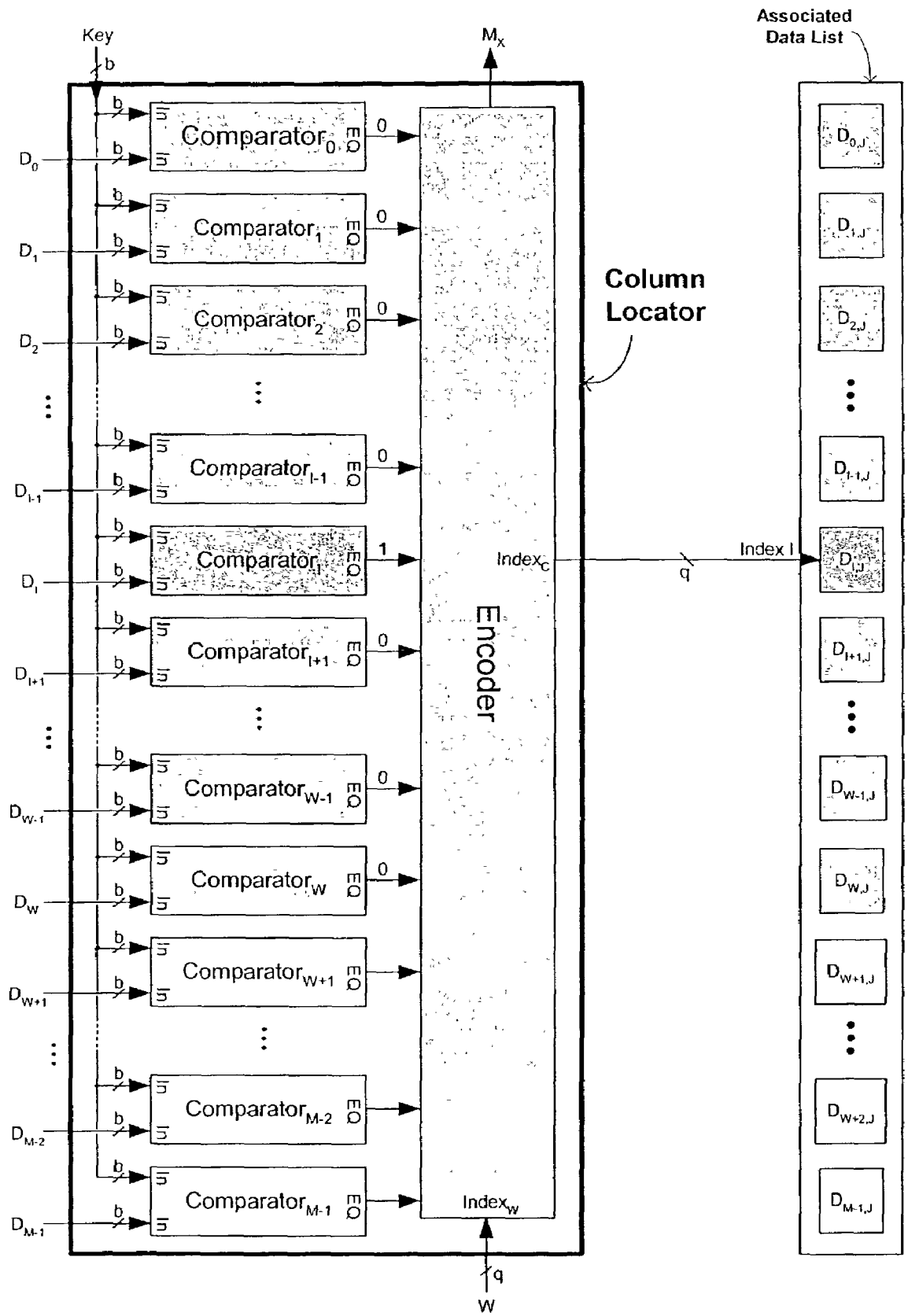
FIG. 12 is a schematic illustration of a preferred embodiment of an exact search column locator.
Figure 13:
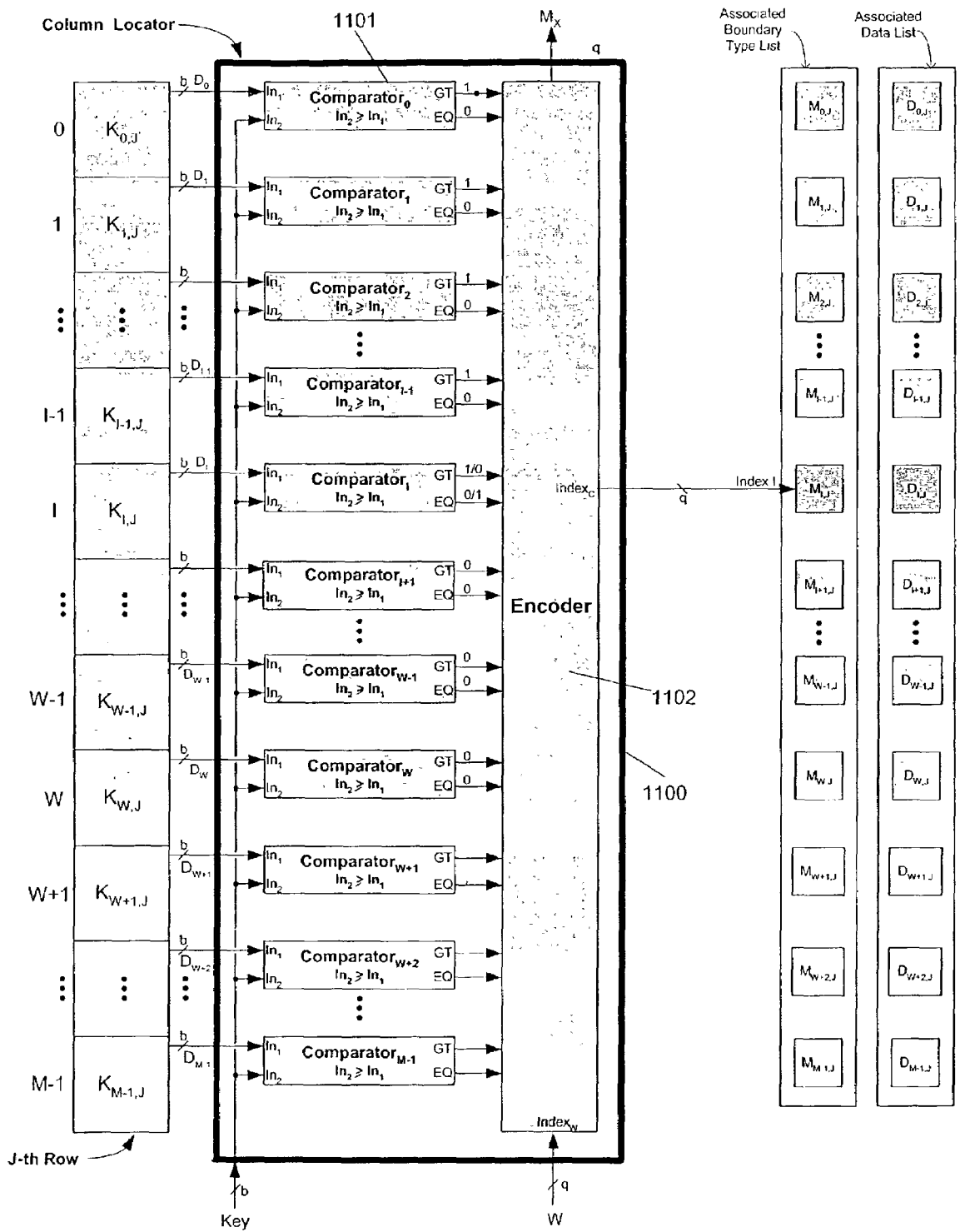
FIG. 13 is a schematic illustration of a preferred embodiment of a range search column locator.

Possible implementations of a Column Locator and a Row Locator for Binary CAMs and RCAMs are shown in FIG. 12 and FIG. 13 respectively.

2.2.2 Keeping the Key List in Order—Insert and Remove Operations

The insertion or removal of keys demands constant updating of the Key List to keep it in order. The straightforward way to update the keys is by applying a serial and lengthy algorithm that requires sequential readout and update of all the Key List entries. The procedures described below are based on the fact that the TDA structure is implemented with a w-bit wide RAM. Since each RAM word consists of M keys, the Key List can be readout and written in steps of M keys.

2.2.2.1 Preliminary Search for the Insert and Remove Operations

Prior to the key insertion/removal, a Search procedure determines the position where the submitted Key $K_E$ is to be inserted or removed, provided that these operations are allowed. Key insertion is allowed only if the key is not included in the TDA, whereas key removal is possible only if it is already included in the TDA. The preliminary Search procedure is identical for Binary CAMs and RCAMs. The Search algorithm used to locate the position where the submitted key has to be inserted or removed is described in co-pending, unpublished PCT Patent Application Serial No. IL01/01025. This algorithm is similar to the Serial Two-Step Search algorithm which determines the validity of the identified range and associated data in RCAMs, but in this case it determines the index of the key to be inserted or removed, provided that these operations are allowed.

2.2.2.1.1 Locating the Position Index of the New Key for Insertion

Since all the inserted keys are different, the following cases may occur:

Case 1: $K_E < K_{0,0}$

In this case, the new key must be inserted right at the beginning of the list. All the other list entries have to be shifted one location forward.

Case 2: $K_E > K_{U,V}$

In this case, the new key is simply appended at the end of the list.

Case 3: $K_{M-1,J-1} < K_E < K_{0,J}$

In this case, the key has to be inserted just in the beginning of row J.

Case 4: $K_{0,J} < K_E < K_{M-1,J}$

In this case, the key has to be inserted inside row J.

The requirements for locating the row and column for key insertion are similar to those for locating the row and column during a Range Key Search; therefore, the Insert Row Locator is similar to the Search Row Locator shown in FIG. 11, and the Insert Column Locator is similar to the Range Search Column Locator shown in FIG. 13.

2.2.2.1.2 Locating the Position Index of the Key for Removal

The requirements for locating the row and column for key removal are similar to those for locating the row and column during Exact Key Search; thus, the Remove Row Locator is similar to the Search Row Locator shown in FIG. 11, and the Remove Column Locator is similar to the Exact Search Column Locator shown in FIG. 12.

2.2.2.2 Insert and Remove Supporting Structures

Figure 14:
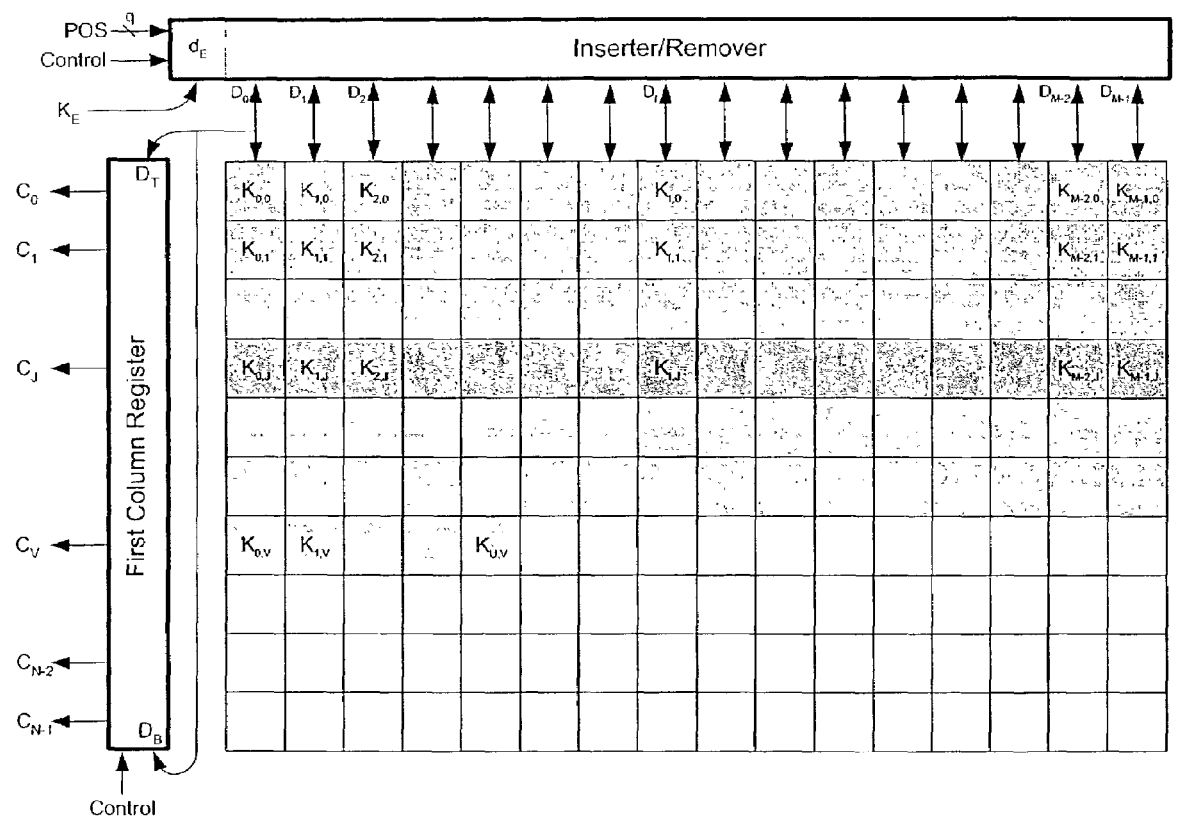
FIG. 14 is a schematic illustration of a preferred embodiment of a TDA and supporting hardware for key insertion and removal.

The TDA and the surrounding hardware that supports the Key insertion and removal are identical for Binary CAMs and RCAMs. The surrounding hardware includes an Inserter/Remover and a First Column Register, as shown in FIG. 14.

2.2.2.2.1 Inserter/Remover Structure and Operations

The Inserter/Remover acts on the TDA rows. The basic functions of the Inserter/Remover are:

Insertion of the new key in the appropriate row and column.

Repositioning of the TDA key entries as necessary for insertion and removal.

Source for the First Column keys.

Figure 15:
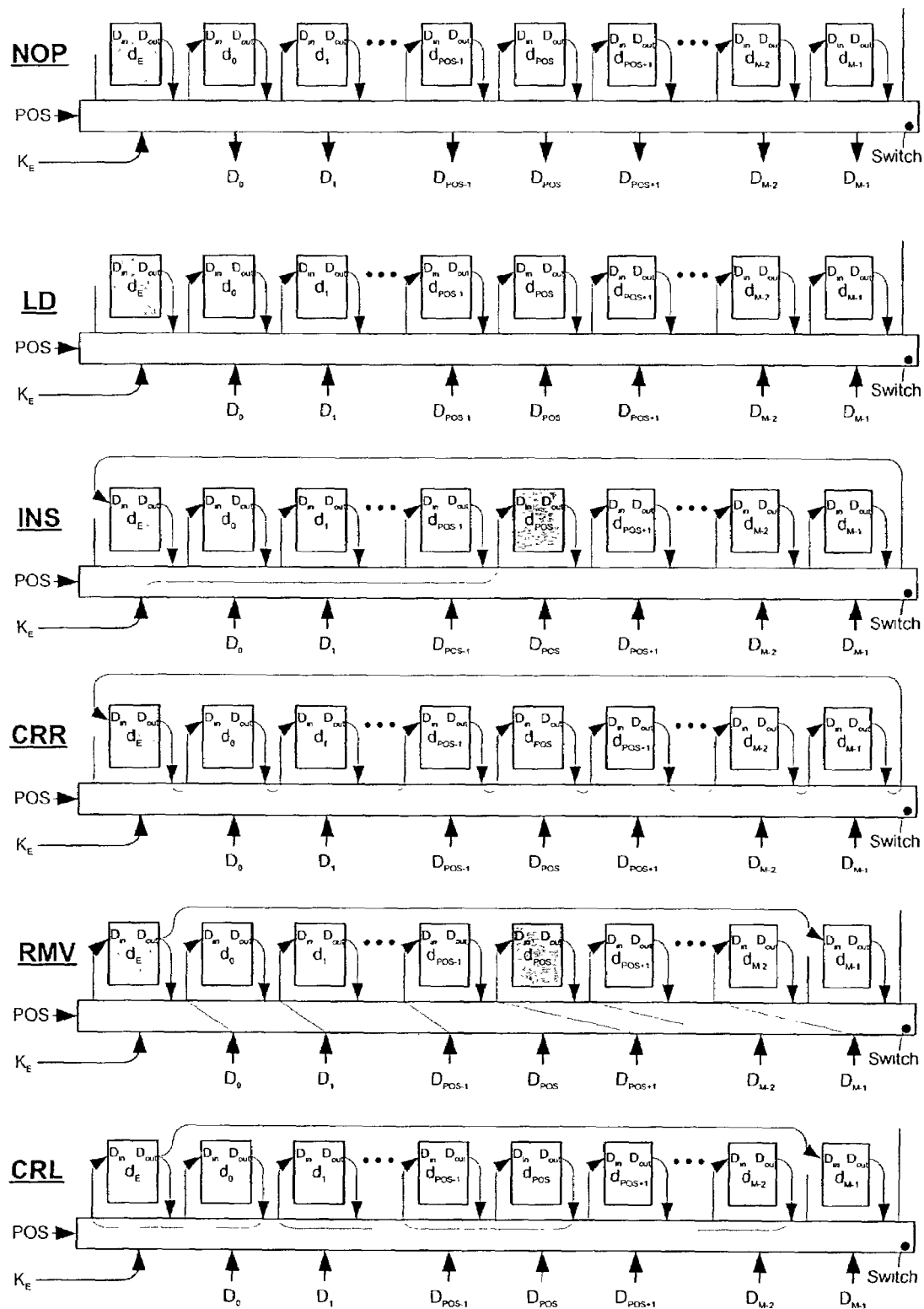
FIG. 15 is a schematic illustration of a preferred embodiment of inserter/remover interconnections in the required configurations of the insert and remove operations.

The Inserter/Remover consists of M+1 b-bit wide registers. Registers $d_0, d_1, d_2, \ldots, d_{M-2}, d_{M-1}$, and register $d_E$ store temporarily and are used to reposition the keys. The interconnections between the registers are controlled by switch hardware. This hardware reconfigures the interconnections to one of the following six configurations (as depicted in FIG. 15):

NOP (No Operation): Used for Insert and Remove operations. When NOP is issued, the outputs $D_{out}$ of registers $d_0, d_1, d_2, \ldots, d_{M-2}, d_{M-1}$ are connected to the TDA $D_0, D_1, D_2, \ldots, D_{M-2}, D_{M-1}$, respectively. The leftmost register $d_E$ is not connected.

LD (Load): Used for Insert and Remove operations. During LD, the inputs $D_{in}$ of registers $d_0, d_1, d_2, \ldots, d_{M-2}, d_{M-1}$ are connected to the TDA $D_0, D_1, D_2, \ldots, D_{M-2}, D_{M-1}$, respectively. The leftmost register $d_E$ is not connected.

INS($K_E$,POS) (Insert): Used for Insert operation. When INS is applied, the Inserter/Remover is configured to:

Load the new Key $K_E$ into $d_{POS}$ as defined by the POS bus.

Load $D_{POS}, D_{POS+1}, \ldots, D_{M-2}, D_{M-1}$ into $d_{POS+1}, d_{POS+2}, \ldots, d_{M-1}, d_E$, respectively.

Load $D_0, D_1, D_2, \ldots, D_{POS-2}, D_{POS-1}$ into $d_0, d_1, d_2, \ldots, d_{POS-2}, d_{POS-1}$, respectively.

This operation results in all the keys smaller than the inserted key being left in the same position, and all the keys larger than the inserted key being shifted one position forward. The rightmost key is temporarily stored to be appended as the leftmost key in the next row in sequence.

CRR (Circulate to the Right): Used for Insert operation. This operation shifts forward in circle the positions of all the keys. At the end of this operation, $d_E, d_0, d_1, d_2, \ldots, d_{M-2}, d_{M-1}$ reside in $d_0, d_1, d_2, \ldots, d_{M-2}, d_{M-1}, d_E$, respectively. This operation is used to:

Introduce the rightmost key of the preceding row in the sequence, as the leftmost key in the current row.

Shift the row keys one position forward.

Store the rightmost key of the current row in dE for operation in the next TDA row.

RMV(POS) (Remove): Used for Remove operation. When RMV is applied, the Inserter/Remover is configured to:

Load $D_{POS+1}, \ldots, D_{M-2}, D_{M-1}$, into $d_{POS}, \ldots d_{M-3}, d_{M-2}$, respectively.

Load $D_0, D_1, D_2, \ldots, D_{POS-2}, D_{POS-1}$, into $d_0, d_1, d_2, \ldots, d_{POS-2}, d_{POS-1}$, respectively.

Load the $d_E$ output value (Dout) into $d_{M-1}$.

This operation results in all the keys smaller than the deleted key being left in the same position as before, and all the keys larger than the deleted key being shifted one position backward. This effectively overrides the value of the key to be removed. The leftmost key of the next row in sequence, stored during the previous operation in $d_E$, is loaded to the rightmost position in the row in which the key removal takes place.

CRL (Circulate to the Left): Used for Remove operation. This operation shifts backward in circle the positions of all the keys in the row. At the end of this operation, $d_0, d_1, d_2, \ldots, d_{M-2}, d_{M-1}, d_E$ reside in $d_E, d_0, d_1, d_2, \ldots, d_{M-2}, d_{M-1}$, respectively. This operation is used to:

Introduce the leftmost key of the next row in sequence as the rightmost position key in the current row.

Shift the row keys one position backward.

Store the leftmost most key of the current row in dE for operation in the preceding TDA row.

2.2.2.2.2 First Column Register Structure and Operations

Figure 16:
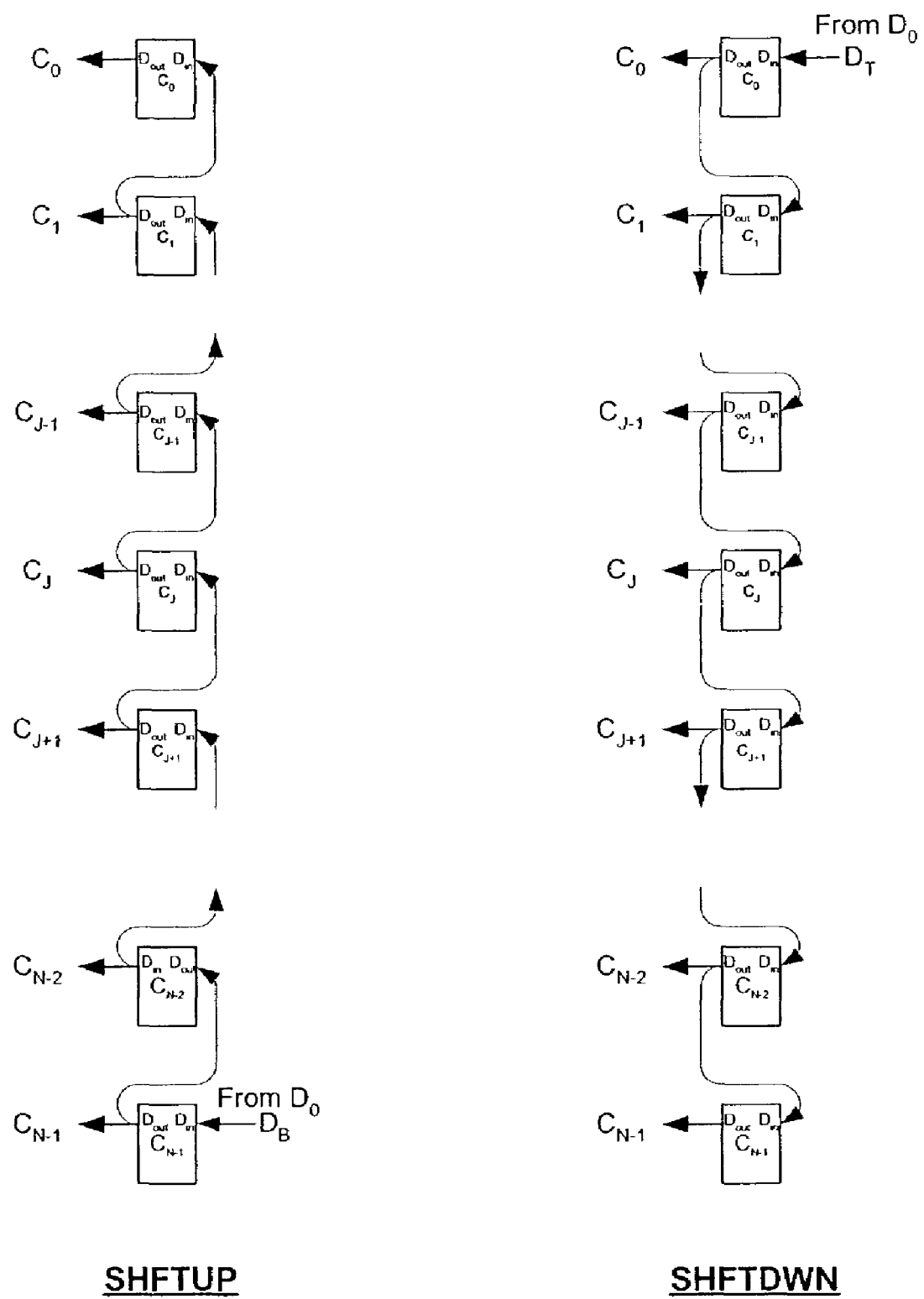
FIG. 16 is a schematic illustration of a first column register structure and shift configurations for the insert and remove operations according to one embodiment of the present invention.

FIG. 16 shows the First Column Register, its structure and configurations, in the context of the Insert and Remove operations. The First Column Register consists of N b-bit wide registers, which mirror the contents of the TDA first column. This register performs two shift operations. It copies the new leftmost column value from $D_0$ when the processed row is written back into the TDA. The new value is either written to the bottom or the top cell for Insert and Remove operations, respectively, as follows:

SHFTUP (Shift-Up): Used for Insert operation. During SHFTUP, $D_B$ serves as input and copies $D_0$ into the $c_{N-1}$ register, while $c_{N-1}, c_{N-2}, c_{N-3}, \ldots, c_1$ are copied into $c_{N-2}, c_{N-3}, \ldots, c_1, c_0$, respectively. After shift-up, the key previously residing in register $c_0$ is dumped.

SHFTDWN (Shift-Down): Used for Remove operation. During SHFTDWN, $D_T$ serves as input and copies $D_0$ into the $c_0$ register, while $c_0, c_1, c_2, \ldots, c_{N-2}$ are copied into $c_1, c_2, \ldots, c_{N-2}, c_{N-1}$, respectively. After shift-down, the key previously residing in register $c_{N-1}$ is dumped.

2.2.2.2.3 TDA Operations

Since the TDA is actually a RAM structure, the only two operations that may be performed in the TDA are:

RD(j): Read row number j.

WR(j): Write to row number j.

The Read and the Write operations are performed from/to the Inserter/Remover.

2.2.2.3 Insert Operation

Figure 17:
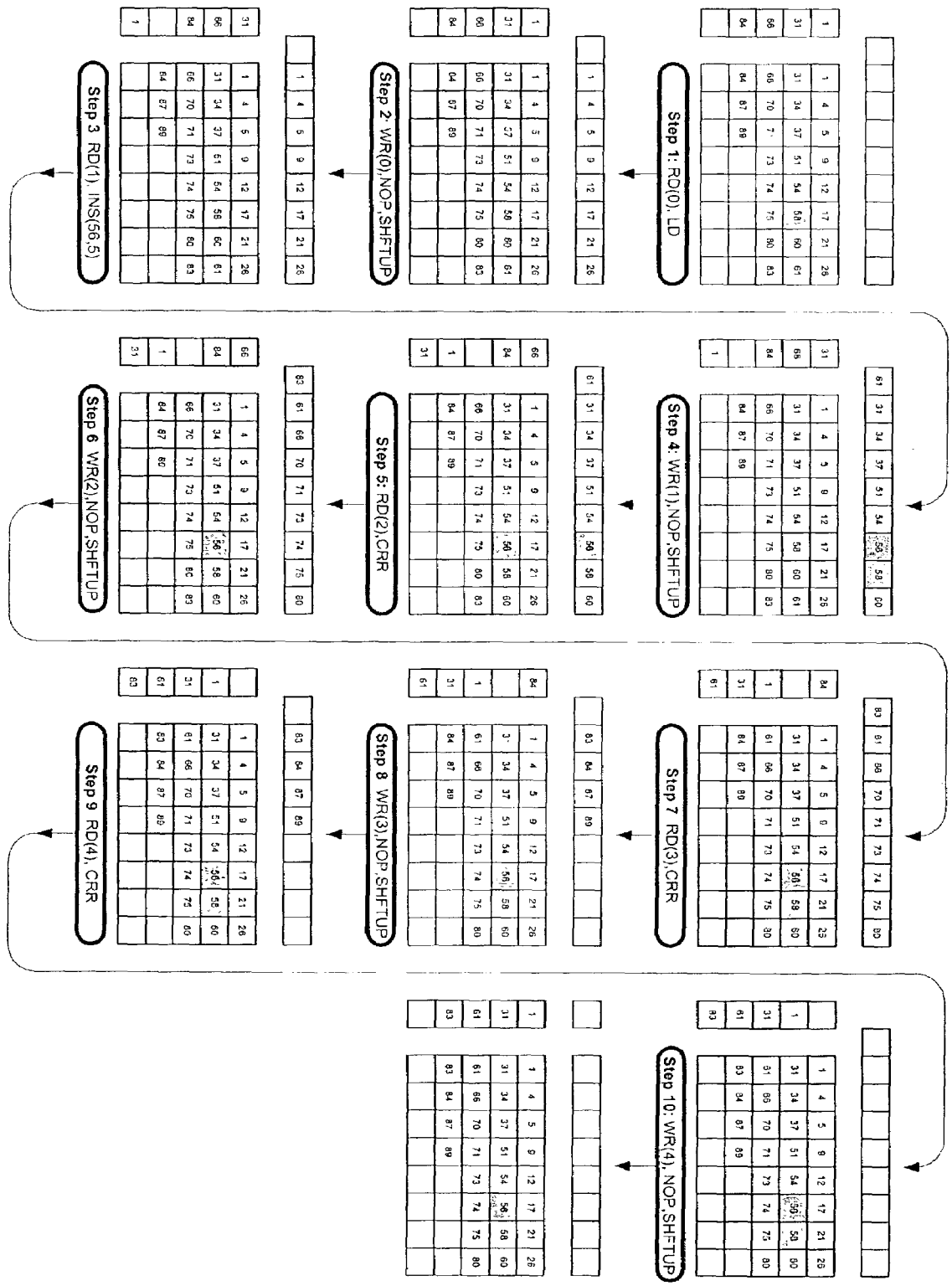
FIG. 17 is an exemplary, schematic illustration in which the number 56 is inserted into a 5×8 TDA according to one embodiment of the present invention.

The Insert operation is identical for Binary CAMs and RCAMs. The insertion of the key 56 in a 5×8 TDA exemplifies the entire Insert procedure. FIG. 17 shows the TDA, the First Column Register and the Inserter/Remover after each step.

The initial state of the TDA is depicted in the upper leftmost corner of FIG. 17. Each step consists of concurrent actions performed on a single TDA row, an Inserter/Remover operation, and a First Column Register operation.

The Insert operation starts with a search to locate the position in which the key 56 must be inserted in the TDA Key List. This position is in row number 1 and column number 5 (second row and sixth column, respectively). The operation consists of a series of steps involving TDA reads followed by writes, starting with row 0 and ending with row 4 (first and last rows, respectively).

The Inserter/Remover operations differ based upon the location of the manipulated row:

For j<1, the readout rows (one row in this case) are simply loaded into the Inserter/Remover using the LD operation. This operation leaves these rows unmodified.

For j=1, the insertion of the new key, 56, involves INS(56,5) of the readout row number 1.

For j>1, the row readout is accompanied by the Inserter/Remover CRR operation. This shifts all the keys one position to the right and saves the rightmost key in $d_E$ to be introduced in the leftmost position (0) of the next row.

Writing in the TDA row from the Inserter/Remover by NOP is accompanied by SHFTUP of the First Column Register. This writes back the unmodified or modified row into the TDA and updates the First Column Register by copying the new First Column key from the Inserter/Remover $D_0$ output. Excluding the Search procedure, the Insert operation takes 10 steps altogether.

2.2.2.4 Remove Operation

Figure 18:
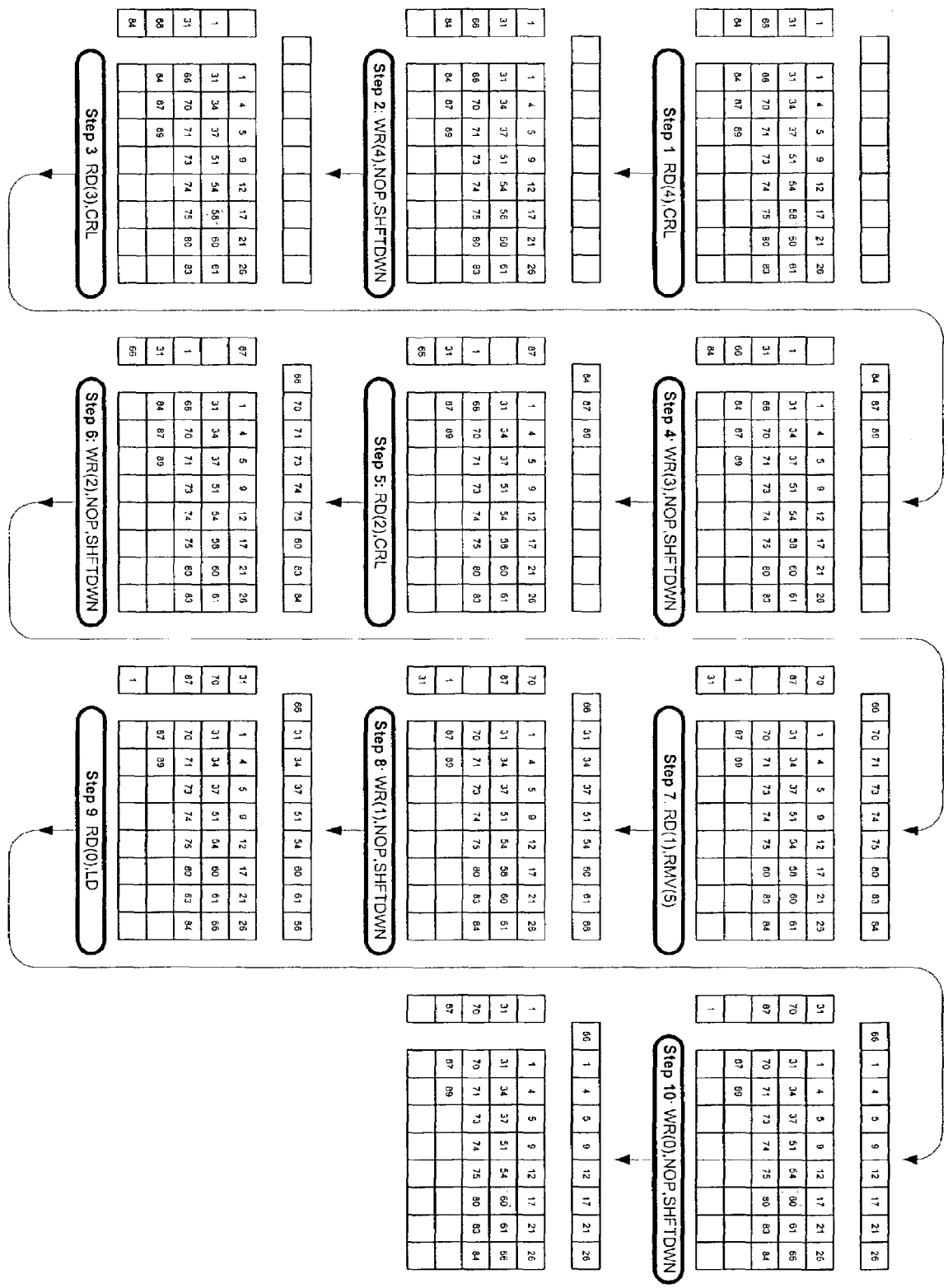
FIG. 18 is an exemplary, schematic illustration in which the number 58 is removed from a 5×8 TDA according to one embodiment of the present invention.

The Remove operation is identical for Binary CAMs and RCAMs. The removal of the key 58 from a 5×8 TDA exemplifies the entire Remove procedure. FIG. 18 shows the TDA, the First Column Register and the Inserter/Remover after each step.

The initial state of the TDA is shown in the upper leftmost corner of FIG. 18. In a fashion similar to the Insert operation, each step consists of concurrent read or write performed on a single row of the TDA, an Inserter/Remover operation, and a First Column Register operation.

The Remove operation starts with a Search operation to locate the position of the key 58 to be removed from the TDA Key List. This position is in row number 1 and column number 5 (second row and sixth column, respectively). The operation involves a series of steps involving TDA reads followed by writes, starting with row 4 (the last row), going backwards and ending with row 0 (first row). The Inserter/Remover operations differ based upon the location of the manipulated row:

For $1 < j \leq N-1$, the row readout is accompanied by the Inserter/Remover CRL operation. This shifts all the keys one position to the left and saves the leftmost key in $d_E$ to be introduced in the rightmost position (M−1) of the preceding row.

For $j=1$, the deletion of key 58 involves RMV(58) in row number 1.

For $j<1$, the row readout is accompanied by the Inserter/Remover LD operation. This operation leaves these rows unmodified.

Writing in the TDA row from the Inserter/Remover by NOP is accompanied by SHFTDWN of the First Column Register. This writes back the modified or the unmodified row into the TDA, and updates the First Column Register by copying the new First Column keys from the Inserter/Remover $D_0$ output. Excluding the Search procedure, the Remove operation takes 10 steps altogether.

2.2.2.5 Disruption of an Insert/Remove Operation to Perform a Search Operation When a key K is submitted for search (lookup) during an Insert or Remove operation, this operation stops in a specific row in order to proceed with the search; this row is called "Paused Row" and its key entries are denoted as $K_{i,P}$. If the searched key K is located in a row that is not the Paused Row (any preceding or succeeding row), or it is equal to or smaller than the current last entry in the Paused Row ($K \leq K_{M-1,P}$), then the search proceeds within the relevant row in the usual fashion, as described in step 2 of the Two-Step Search Algorithm (see Section 2.2.1.1).

However, if $K > K_{M-1,P}$, then the searched key K can be either $K_{M-1,P}$ or the value of the key stored in the register $d_E$ of the Inserter/Remover (see Section 2.2.2.2.1 and FIG. 14). This key is, in the case of an Insert operation, the value of the last entry in the Paused Row previous to the key insertion (denoted as $K^*_{M-1,P}$), or, in the case of a Remove operation, the value of the first entry in the row succeeding the Paused Row prior to the key removal (denoted as $K^*_{0,P+1}$). The search of the submitted key K requires, in either case, a comparison of K with the key stored in the register $d_E$ ($K^*_{M-1,P}$ for insertion or $K^*_{0,P+1}$ for removal) to determine the index of K. This can be implemented with a comparator similar to comparator 1101 in the Search Column Locator used for RCAMs, shown in FIG. 13. This comparator issues two signals: GT, which equals "1" when $In_2 > In_1$, otherwise GT equals "0"; and EQ, which is "1" when $In_2 = In_1$, otherwise EQ equals "0".

For a RAM-Based Binary CAM, the EQ signal is used. If $K = K^*_{M-1,P}$ for insertion, or $K = K^*_{0,P+1}$ for removal, then $K^*_{M-1,P}$ or $K^*_{0,P+1}$ exactly matches the searched key and the index thereof is used to access the corresponding entry in the Associated Data List. The Associated Data entry is readout along with a Match signal M="1" that indicates entry validity.

For a RAM-Based RCAM, both the GT and EQ signals are used. If $K < K^*_{M-1,P}$ for insertion, or $K < K^*_{0,P+1}$ for removal, then the searched key is $K_{M-1,P}$. If $K \geq K^*_{M-1,P}$ for insertion, or $K \geq K^*_{0,P+1}$ for removal, then the searched key is $K^*_{M-1,P}$ or $K^*_{0,P+1}$, respectively. The index of $K_{M-1,P}$, $K^*_{M-1,P}$ or $K^*_{0,P+1}$, whichever is relevant, is used to access the corresponding entries in the Associated Data and Associated Boundary Type Lists. An Associated Boundary Type entry of "1", corresponds to a Closed Boundary and designates a valid range; an entry of "0" corresponds to an Open Boundary and indicates that the range is not valid.

When a key is submitted for a search operation, the Insert or Remove operation in execution is disrupted only after the contents of the Inserter/Remover are written to the Paused Row. The Insert or Remove operation is subsequently resumed by reading the succeeding row (for insertion) or the preceding row (for removal).

Example of Disruption of an Insert Operation:

In this example, the insertion of the key 56 in a 5×8 TDA (Section 2.2.2.3) is disrupted. FIG. 17 shows the TDA, First Column Register and Inserter/Remover after each step of the Insert procedure. Assume that the key K=65 is submitted for search.

If the key is submitted during any step of the Insert procedure that does not involve row number 1 (i.e., the Paused Row is not row number 1), or if $K \leq K_{M-1,1}$, the search proceeds as described in step 2 of the Two-Step Search Algorithm (Section 2.2.1.1). However, if the key is submitted during step 3 or 4 in FIG. 17, then the key insertion is disrupted after step 4. Since $K=65 > K_{M-1,P}=60$, then 65 is compared with the key stored in the register $d_E$, i.e., $K^*_{M-1,P}=61$.

Since $K > K^*_{M-1,P}$, then in the case of a RAM-Based Binary CAM, there is no key entry that exactly matches the searched key. A No-Match signal M="0" is consequently issued, and no Associated Data entry is retrieved. In the case of a RAM-Based RCAM, $K^*_{M-1,P}=61$ is the range match for the searched key and is used to retrieve the Associated Data and Boundary Type entries.

Example of Disruption of a Remove Operation:

In this example, the removal of the key 58 from a 5×8 TDA (Section 2.2.2.4) is disrupted. FIG. 18 shows the TDA, First Column Register and Inserter/Remover after each step of the Remove procedure. Assume that the key K=65 is submitted for search.

If the key is submitted during any step of the Insert procedure that does not involve row number 1 (i.e., the Paused Row is not row number 1), or if $K \leq K_{M-1,1}$, the search proceeds as described in step 2 of the Two-Step Search Algorithm (Section 2.2.1.1). However, if the key is submitted during step 7 or 8 in FIG. 18, then the key insertion is disrupted after step 8. Since $K=65 > K_{M-1,P}=61$, then 65 is compared with the key stored in the register $d_E$, i.e., $K^*_{0,P+1}=66$.

Since $K < K^*_{0,P+1}$, then in the case of a RAM-Based Binary CAM, there is no key entry that exactly matches the searched key, so a No-Match signal M="0" is issued and no Associated Data entry is retrieved. In the case of a RAM- Based RCAM, $K_{M-1,P}=61$ is the range match for the searched key and is used to retrieve the Associated Data and Boundary Type entries.

2.2.2.6 Insert and Remove Operations in the TDAs for the Associated Data and the Associated Boundary Type The indices of the TDAs for the Associated Data and the Associated Boundary Type (for RCAMs only) must remain in correspondence with the key index. The Insert and Remove operations in the Key List TDA are accompanied by corresponding, simultaneous and identical Insert and Remove operations in the Associated Data TDAs for Binary CAMs and RCAMs. Additional Insert and Remove operations take place in the Boundary Type TDAs for RCAMs only. The disruption in the insertion or removal of key entries for a search of submitted keys is accompanied by corresponding disruptions in the insertion or removal of Associated Data and Boundary Type entries.

2.2.2.7 Bit-Mapped Update Operation (for RCAMs Only)

The Bit-Mapped Update Operation changes the Associated Data and Associated Boundary Type entries corresponding to a specified group of sequential keys in the Key TDA, without changing the number of keys in this TDA. This operation is generally necessary when an overlapping range is inserted in or removed from the TDA (see Section 1.6).

When, for example, the key 56 is inserted in a 5×8 TDA (FIG. 17), the associated boundary type and associated data entries corresponding to the sequential keys 56 and 57 must change to $m_{56}$ and $d_{56}$, respectively, instead of $m_{54}$ and $d_{54}$ (corresponding to the keys 54), and all the other keys in the same row do not change. This integrated change in the second row (number 1) is performed by an 8-bit long Bit-Mapped Update command consisting of 1's for the keys 56 and 57 and 0's for all the other keys in this row. Similar Bit-Mapped Update commands are applied in all the other rows of the TDA corresponding to the changes required in each row.

Similarly, when the key 58 is removed from a 5×8 TDA (FIG. 18), the associated boundary type and associated data entries corresponding to the sequential keys 58 and 59 must change to $m_{54}$ and $d_{54}$ (corresponding to the keys 54), respectively, instead of $m_{58}$ and $d_{58}$, whereas all the other keys in the same row remain unchanged. This change in the second row (number 1) is performed by an 8-bit long Bit-Mapped Update command consisting of 1's for the keys 58 and 59 and 0's for all the other keys in this row. Similar Bit-Mapped Update commands are applied in all the other rows of the TDA corresponding to the changes required in each row.

3. Multiple-RAM Binary CAM and RCAM

Improved implementations of the RAM-Based Binary CAM and RAM-Based RCAM, denoted as Multiple-Module Binary CAM and Multiple-Module RCAM, have been disclosed in my co-pending U.S. patent application Ser. No. 09/779,941. These multiple-module implementations are based on a method of interconnection of multiple Binary CAM or RCAM modules into a single Binary CAM or RCAM device, respectively. This method allows the division of the Binary CAM or RCAM structure into partial modules, each containing a small number of rows. The use of the smaller partial modules significantly speeds up the Insert and Remove operations in these devices because the Insert and Remove throughputs are inversely proportional to the number of rows in the CAM or RCAM.

Each module of a Multiple-Module Binary CAM or RCAM operates internally like a single Binary CAM or RCAM, with a Key Module List (TDA), Associated Data List and Associated Boundary Type List (for the RCAM).

A search of the submitted key is performed concurrently in all the modules of the Binary CAM or RCAM. The Data and Match signals correspond to those of the individual module that contains the searched key; they are obtained by summing-up the results of the Search operation performed in all the modules.

Since each module of a Multiple-Module Binary CAM or RCAM requires several registers, such as First Column Register, Inserter/Remover Register and others, plus additional components, the integrated device may become large if it includes many modules. If the contents of several registers can be suitably arranged in a conventional RAM, then a device of reduced size, power consumption and cost can be implemented.

Multiple-Module CAMs, as disclosed in my co-pending U.S. patent application Ser. No. 09/779,941, are directed towards improving efficiency within a single RAM. An alternative, inventive approach, in which a plurality of RAMs is configured to provide efficient, high-performance memory, is provided hereinbelow.

3.1 Multiple-RAM Architecture

The Multiple-RAM Binary CAM or RCAM includes an ordered group of RAMs, where g denotes the serial number of a particular RAM and G denotes the total number; thus, $0 \leq g \leq G-1$. This group is regarded as an "extended RAM" and denoted as "G-RAM".

Figure 19:
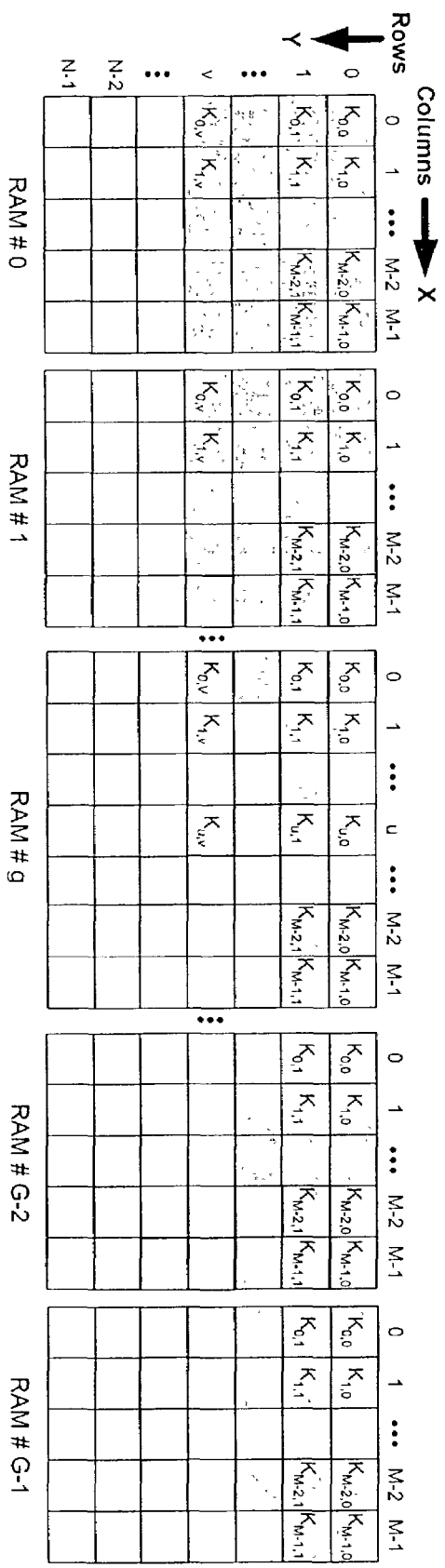
FIG. 19 is a schematic illustration of a G-RAM having RAMs with separate key indexing.

The basic concept underlying the approach of the Multiple-RAM Binary CAM or RCAM is keeping the list of key entries of the G-RAM in an orderly fashion. The key entries are stored in such a way that:

- The RAMs composing the G-RAM may be lined in a row along the X-axis, as shown in FIG. 19, where the key entries are arranged in a G-RAM with N rows and G·M columns. The key entries may be located in a contiguous ascending or descending order in the G·M key entries of the "extended rows". In FIG. 19, the RAMs of the G-RAM still show separate key indexing and the key entries fill up to the (u,v) cell of a generic RAM # g. The occupied key entry locations are shadowed with light gray. The empty locations are blank.
- In a similar way, the RAMs composing the G-RAM may be lined in a column along the Y-axis. In this case, the key entries will be arranged in a G-RAM with G·N rows and M columns. The key entries may be located in a contiguous ascending or descending order in the G·N key entries of the "extended columns".
- The block of occupied locations may either start at the first extended memory address or end in the last extended memory array address.
- The empty locations in the extended memory array are contiguous, and may either follow or precede the occupied locations, with a uniquely defined transition point between the last occupied location and the first empty location, or vice versa.

Although the Multiple-RAM Binary CAM or RCAM may be implemented using any of the alternatives described above, we shall limit our discussion to the following cases:

- The RAMs composing the G-RAM are lined in a row along the X-axis. The key entries are stored in contiguous ascending order along the extended rows of a G-RAM.

The key list starts at the lowest extended memory array address.

The empty locations block follows the key list.

Figure 20:
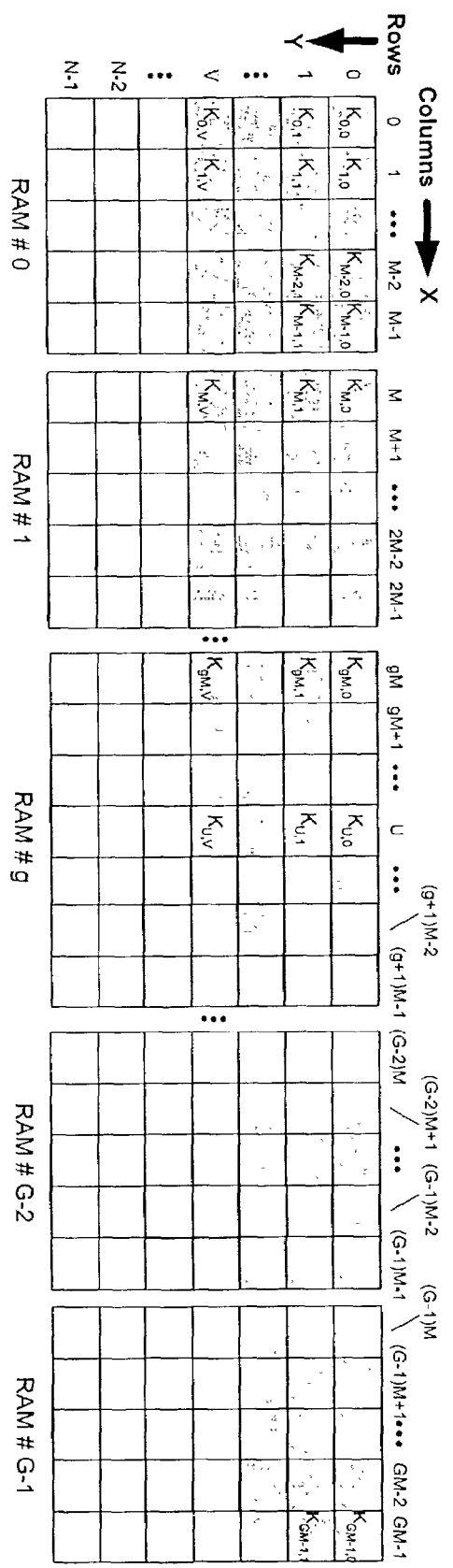
FIG. 20 is a schematic illustration of a G-RAM having RAMs with integrated key indexing, according to a preferred embodiment of the present invention.

FIG. 20 depicts the extended RAM or G-RAM composed of G·M columns by N rows with integrated key indexing. The extended rows are sequenced from top to bottom and indexed with an integer J, where $0 \leq J \leq N-1$. The columns are sequenced from left to right and indexed with an integer I, where $0 \leq I \leq G \cdot M-1$. The occupied key entry locations are shadowed with light gray. The empty locations are blank. A key located in column I and extended row J has an integer value $K_{I,J}$. The lowest key value $K_{0,0}$ resides in the extended row 0 and column 0. The highest key value $K_{U,V}$ resides in the extended row V and column U.

In a generic RAM # g with M columns and N rows, the rows are indexed with j, where $0 \leq j \leq N-1$, and the columns are indexed with i, where $0 \leq i \leq M-1$. An index pair (i,j) in this RAM is related to the corresponding index pair (I,J) in the G-RAM as follows:

$$I = i + g \cdot M$$

$$J = j$$

The highest key value $K_{U,V}$ resides in row V and column U. If this key is located in the cell (u,v) of RAM # W, then:

$$U = u + W \cdot M$$

$$V = v$$

Summarizing, the parameters of the extended RAM or G-RAM are:

b: Key data width

G·M: Number of columns, or number of b-bit wide key words in a row

N: Number of rows

U: Last key entry column

V: Last key entry row

J: Key row index, where $0 \leq J \leq N-1$

I: Key column index, where $0 \leq I \leq G \cdot M-1$ for J<V and $0 \leq I \leq U$ for J=V.

Figure 4:
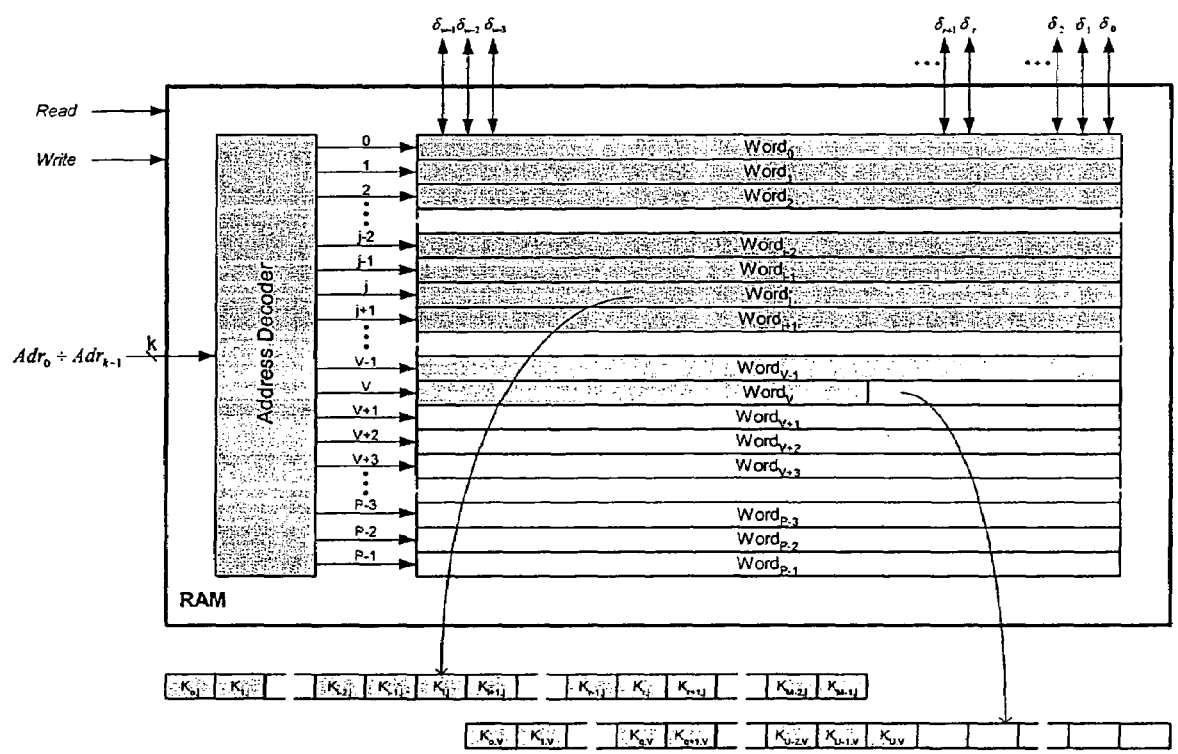
FIG. 4 is a schematic illustration of key mapping in a conventional RAM of the prior art.

The parameters of a conventional RAM are depicted in FIG. 4 and listed in Section 2.1 above.

The Multiple-RAM Binary CAM contains two extended RAMs or G-RAMs, Key G-RAM and Associated Data G-RAM. Each key entry $K_{I,J}$ of the Key G-RAM has a corresponding Associated Data entry $D_{I,J}$ in the Associated Data G-RAM. Since the Binary CAM stores an ordered list of single integer keys, a key search in results in an exact match and a straightforward access to the corresponding associated data.

The Multiple-RAM RCAM includes additionally an Associated Boundary Type G-RAM, where each Associated Boundary Type entry $M_{I,J}$ corresponds to the key entry $K_{I,J}$. The RCAM stores a list of key entries that represent range boundaries, so that a key search results in a matching range, and the retrieval of the associated data and boundary type that corresponds uniquely to this range. The associated boundary type determines the validity of the matching range and the associated data.

The entries of the Key G-RAM, Associated Data G-RAM and Associated Boundary Type G-RAM (for an RCAM) are always kept in a compact and sequential form (monotonously increasing or decreasing), and perfect correspondence, by means of consistent Insert and Remove algorithms.

As in the Single-RAM RCAM, the ranges must be adjacent non-overlapping for RAM-based operation. The RCAM sequentially stores only the lower boundaries of the adjacent ranges. The upper boundary of the last range is also included at the end. The intervals with open lower boundaries are considered as invalid ranges and the data entries associated with these intervals have no meaning (Don't Care).

3.1.1 Single-Hierarchy Architecture

Figure 21:
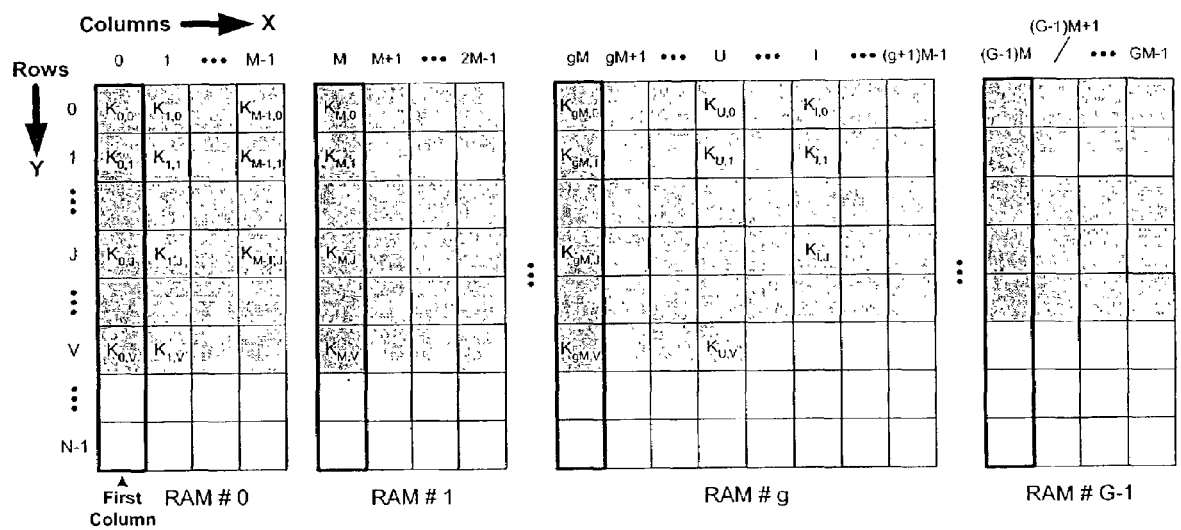
FIG. 21 is a schematic illustration of the G-RAM of FIG. 20, with further characterization of the integrated key indexing.

In a Multiple-RAM CAM, the key entries in the first columns of the multiple RAMs composing the G-RAM (FIG. 21) can be arranged in sequential columns in an integrated First Column RAM (FC-RAM) of N rows and G columns, as shown in FIG. 22. A generic column g of this RAM contains the first column entries of RAM # g in the G-RAM. Thus, the First Column Register of the FC-RAM contains the same entries as the first column of RAM # 0. The rows of the FC-RAM list the first column entries with common indices of the multiple RAMs along a Z-axis.

The performance of the Search, Insert and Remove operations requires additional components around the Key G-RAM, such as a First Column Register, Search Row and Column Locators, and an Inserter/Remover Register.

A key search in the G-RAM starts with a search in the FC-RAM, using one Search Row Locator and one Column Locator, to locate the largest key entry that is smaller than (or equal to) the submitted key, which points to a specific row in RAM # g. Then, the submitted key is searched in this row of RAM # g, to find an exact match (for a Binary CAM) or a range match (for an RCAM); this requires an additional set of Search Column Locators for the G individual RAMs.

It should be noted that in a similar way, the last columns of the G RAMs could be arranged in sequential columns in an integrated Last Column RAM (LC-RAM), to be used instead of (or together with) the FC-RAM for search purposes.

A key insertion or removal in the G-RAM starts with a search in the FC-RAM, to locate the largest key entry that is smaller than (or equal to) the submitted key, which points to a specific row in RAM # g. Then, the search proceeds in this row of RAM # g, to determine whether the key exactly matches a key entry. In the case of an exact match, the submitted key can be removed but not inserted; otherwise, the submitted key can be inserted after the largest key entry that is smaller than this key. A key insertion or removal requires a set of G Inserter/Removers for the G individual RAMs; however, each of these devices consists of only M b-bit wide registers, because it does not require a leftmost register $d_E$. Only one such register ir required, and can be integrated with the Inserter/ Remover for RAM # 0, which then has M+1 registers. An additional Inserter/Remover is required to update the FC-RAM on the changes undergone in the first columns of the G RAMs; this Inserter/ Remover does not require shifting capabilities.

An implementation that provides more efficient storage when the FC-RAM is used in the Key G-RAM, omits all the key entries in the first columns of the multiple RAMs (already included in the FC-RAM) from these RAMs, saving storage space of G×N cells. This scheme requires a corresponding arrangement in the Associated Data &-RAM and Associated Boundary Type G-RAM (for an RCAM), using FC-RAMs for these two G-RAMs, and omitting the key entries already included in these FC-RAMs from the individual RAMs. The Search, Insert and Remove procedures must be adapted to suit these arrangements.

3.1.2 Multiple-Hierarchy Architecture

Figure 23:
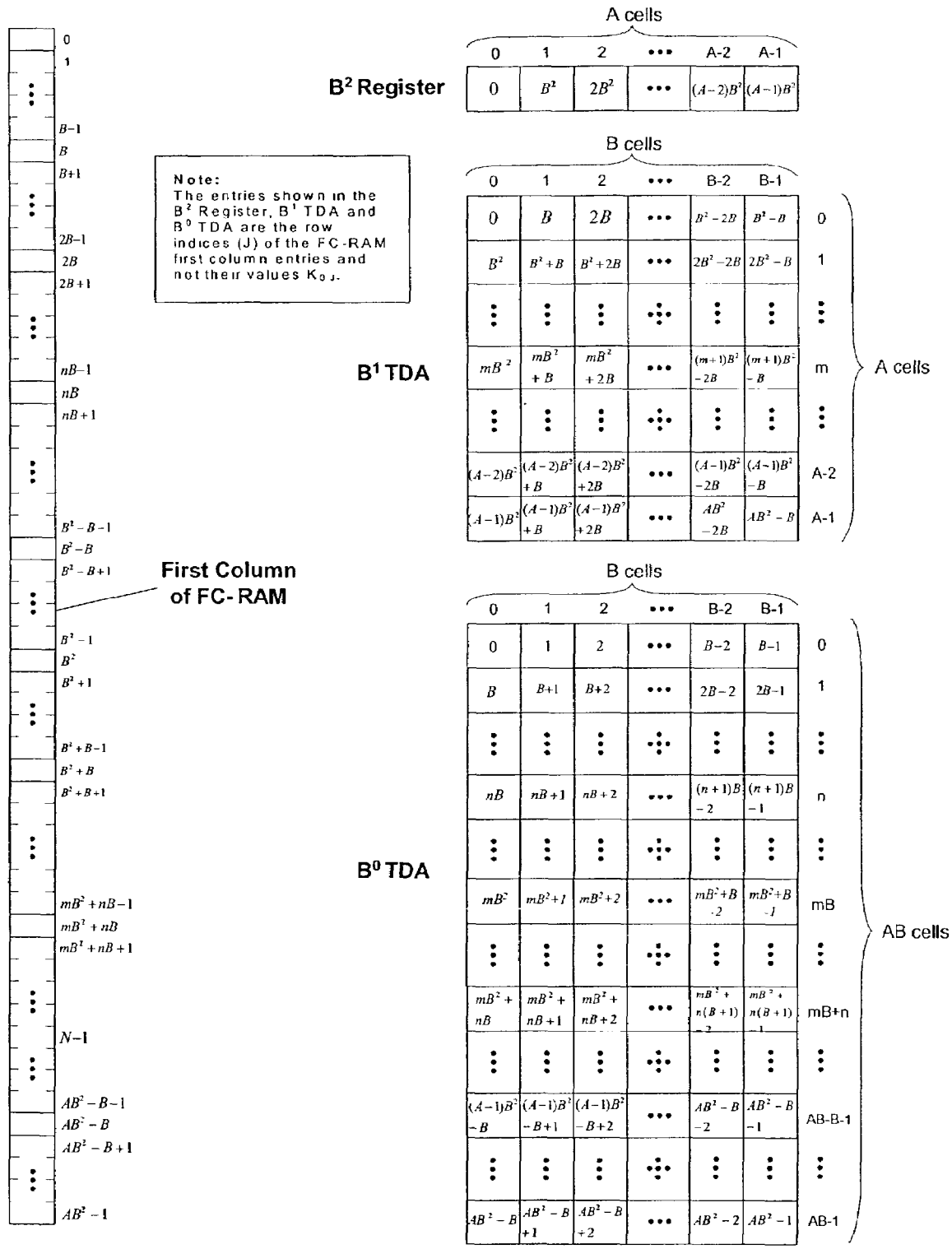
FIG. 23 is a schematic illustration of a partitioning of an FC-RAM in three hierarchical levels, according to base B.

To save further chip space, the first column of the FC-RAM can be partitioned in hierarchical blocks according to a numerical system of base B, as shown in FIG. 23. The FC-RAM first column contains $AB^2$ key entries, where the number A is selected to meet the condition $AB^2 \geq N$, so that the three storing devices contain all the first column entries. If $AB^2 > N$, some of the last entries of the $B^0$ RAM remain empty and are filled with "1" s which places them "out of range" for all Search purposes.

The partitioning process is performed in recursive mappings of a one-dimensional first column array into a two-dimensional array (TDA) with the same column entries. In the first mapping, the FC-RAM first column is mapped into a TDA (denoted as $B^0$ TDA) with AB rows and B columns, so that all the entries whose row indices are multiples of B are arranged in its first column; this array, without the first column thereof, is stored in the lowest hierarchy block, denoted as $B^0$ RAM (see FIG. 24). The first column of the $B^0$ TDA is mapped into a second TDA (denoted as $B^1$ TDA) with A rows and B columns, so that all the entries whose row indices are multiples of $B^2$ are arranged in the first column thereof; this array, without the first column thereof, is stored in the next hierarchy block, and is denoted as $B^1$ RAM. The first column entries of the $B^1$ TDA are stored in the highest-hierarchy block, which is a one-dimensional register having A cells, and is denoted as $B^2$ Register.

Thus, the $B^2$ Register contains all the first column entries whose row indices are multiples of $B^2$, i.e., $K_{0,J}$, where $J=mB^2$, $0 \leq m \leq A-1$. The $B^1$ RAM has A rows and (B-1) columns, and stores all the entries whose row indices are multiples of B, i.e., $K_{0,J}$, where $J=nB$, $0 \leq n \leq AB-1$, except for $n=mB$ corresponding to multiples of $B^2$ that are stored in the $B^2$ Register. The dashed first column at the left of the $B^1$ RAM is not included in the RAM; it lists all the entries of the $B^2$ Register and is shown for reference only. All the remaining entries of the FC-RAM (i.e., those that are not multiples of B) are stored in the lowest-hierarchy block $B^0$ RAM, which has AB rows and (B-1) columns. The dashed column at the left of the $B^0$ RAM, which is not included in the RAM, lists all the entries of the $B^1$ Register and is shown for reference only.

Figure 24:
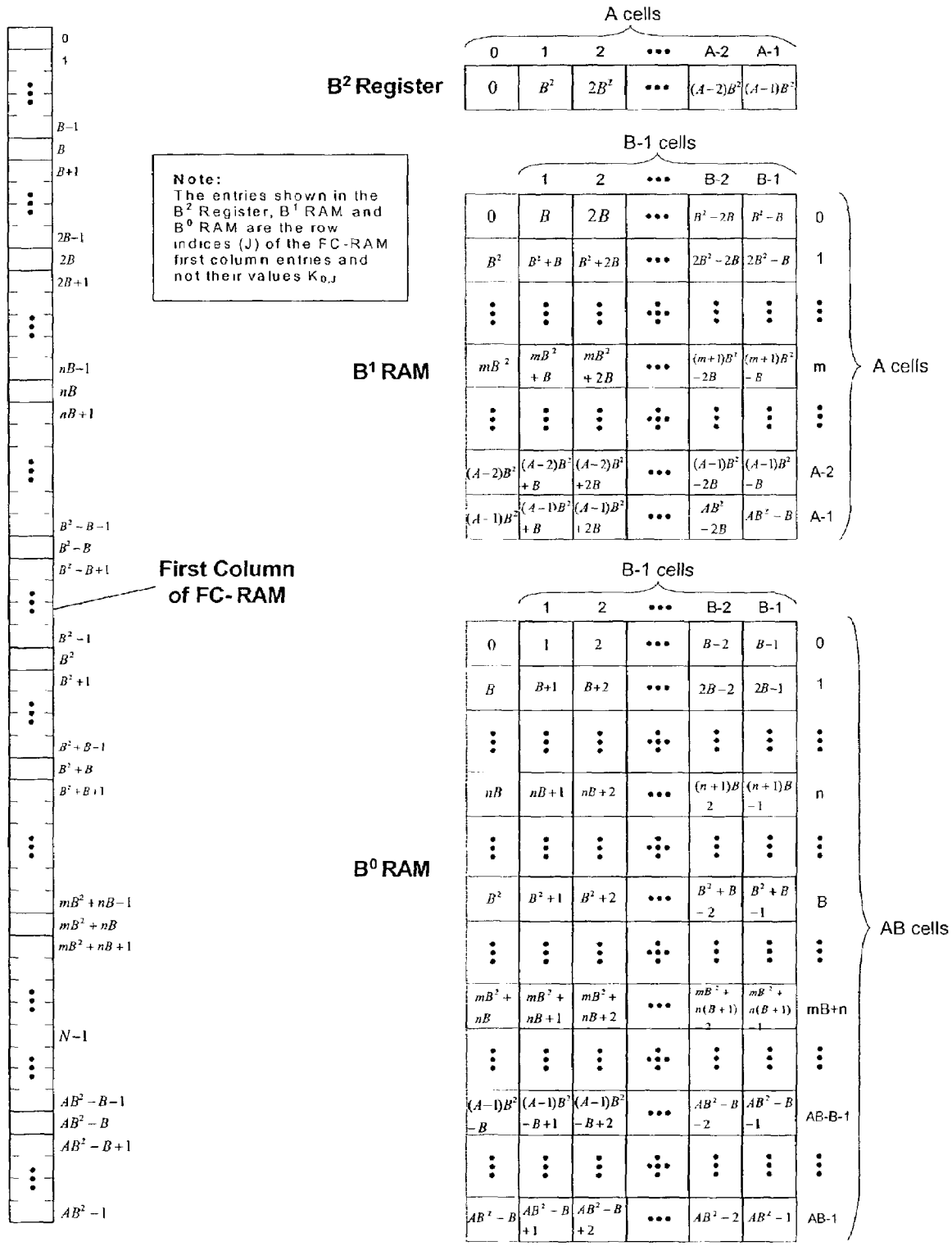
FIG. 24 is a schematic illustration of a partitioning of an FC-RAM in three hierarchical blocks, according to base B.

It must be stressed that the entries shown in the $B^2$ Register, $B^1$ RAM and $B^0$ RAM in FIG. 23 and FIG. 24 are the row indices (J) of the FC-RAM first column entries and not their values $K_{0,J}$.

As in the FC-RAM, if any of the last entries of the $B^2$ Register, $B^1$ RAM and $B^0$ RAM remain empty, they are filled with "All Ones", which places them "out of range" for all Search purposes.

Figure 25:
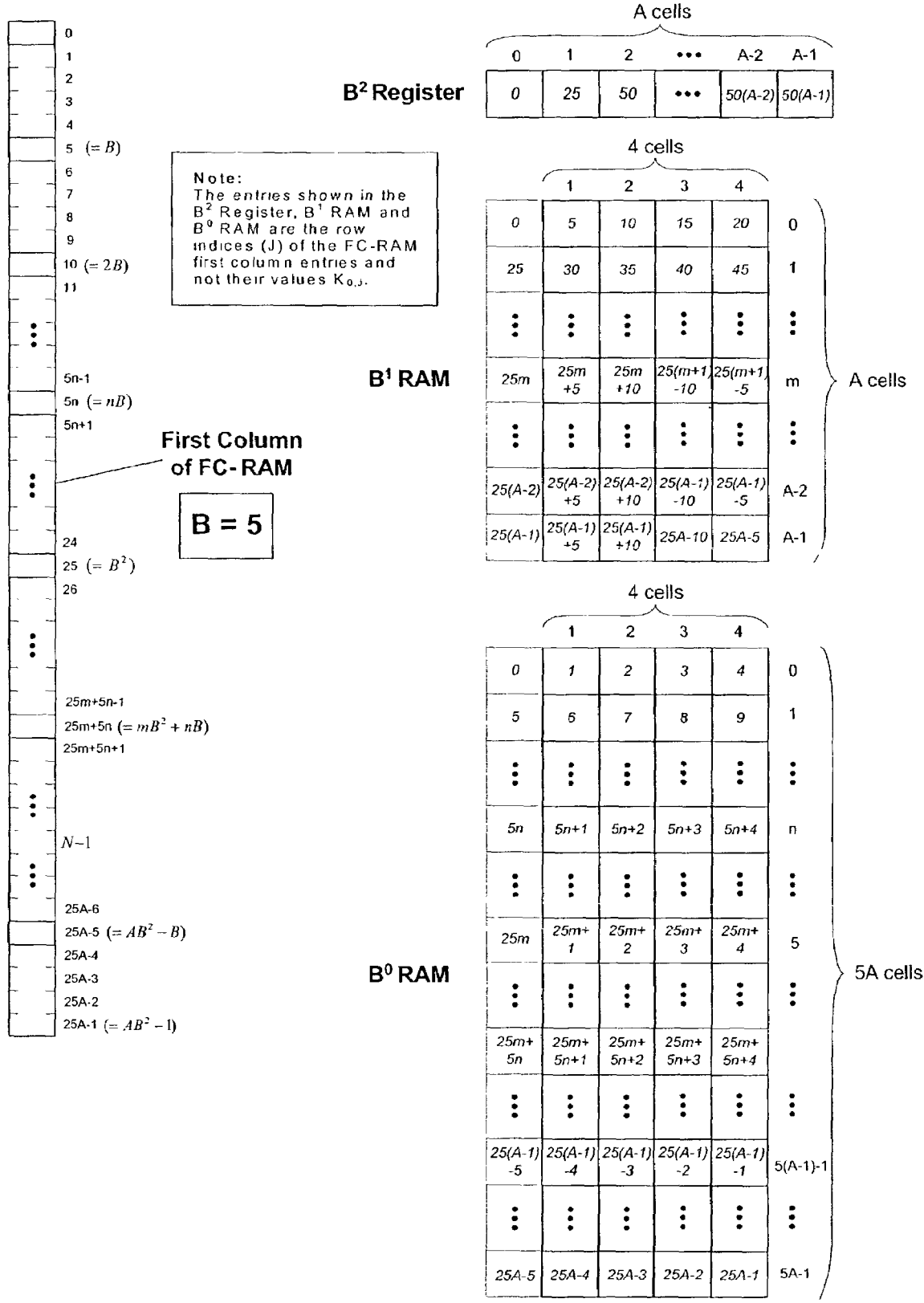
FIG. 25 is an exemplary schematic illustration of a partitioning of a FC-RAM in three hierarchical blocks, according to base 5.

FIG. 25 shows the FC-RAM first column partitioned in the hierarchical blocks $B^2$ Register, $B^1$ RAM and $B^0$ RAM, as presented in FIG. 24, according to a specific base B=5, for a generic number A of the $B^2$ Register entries.

Figure 26:
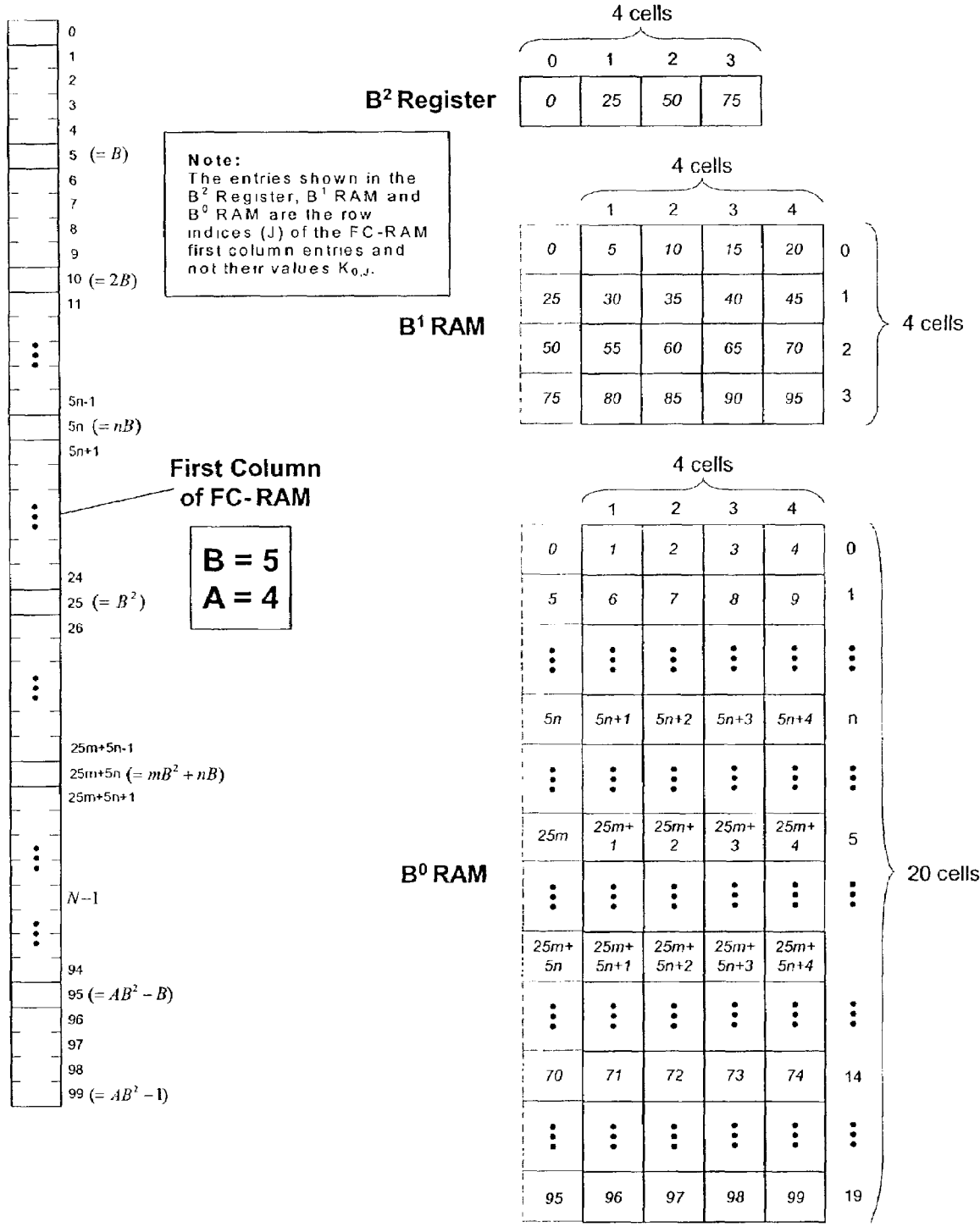
FIG. 26 is an exemplary schematic illustration of a partitioning of an FC-RAM having 100 cells in three hierarchical blocks, according to base 5.

FIG. 26 shows the same partition of an FC-RAM first column with 100 entries for B=5. This number of entries requires that $A \geq 4$, so A=4 is selected and shown.

It is noted that:

In the Multiple-Hierarchy architecture shown in FIG. 23, the FC-RAM first column entries are stored in three hierarchical blocks, $B^2$ Register, $B^1$ RAM and $B^0$ RAM. In general, when the first column is larger, more hierarchies can be used. If the first column is partitioned in k hierarchical blocks, a $B^{k-1}$ Register and (k-1) RAMs, $B^{k-2}$ RAM to $B^0$ RAM, are used. In this case, the serial Search procedure consists of k+2 steps, and a (k+2)-step pipelined procedure is required to maintain a high throughput.

The increasing number of hierarchical blocks reduces the chip space to a minimum for a specific value, and then the chip space increases with the number of hierarchical blocks. The 3-hierarchy arrangement used in the G-RAM presented in this document is an excellent tradeoff for space optimization.

If an integrated Last Column RAM (LC-RAM) is used instead of (or together with) the FC-RAM, the first column entries thereof can be similarly partitioned in hierarchical blocks and used for search purposes.

A key search in the G-RAM starts with a search in the hierarchical blocks, specifically in the highest-hierarchy $B^2$ Register, to locate the largest key entry that is smaller than (or equal to) the submitted key; this key entry points to a specific row in the $B^1$ RAM. Then, the submitted key is searched in the specific row of this RAM using a Column Locator, to locate the largest key entry that is smaller than (or equal to) the submitted key; this points to a specific row in the $B^0$ RAM. A similar search procedure is then performed in the $B^0$ RAM. The matching key entry in this RAM points to a specific row in the FC-RAM.

The search procedure in the FC-RAM is identical to that described for the single-hierarchy architecture, where the matching key entry leads to a specific row in RAM # g; and then, the submitted key is searched in this row in RAM # g, to find an exact match (for a Binary CAM) or a range match (for an RCAM).

A key insertion or removal in the G-RAM starts with a search in the hierarchical blocks, following an identical procedure to that used for lookups, described above. This search points to a specific row in the FC-RAM. The search procedure in the FC-RAM leads to a specific row in RAM # g. Then, the search proceeds in this row of RAM # g, to determine whether the key exactly matches a key entry. In the case of an exact match, the submitted key can be removed but not inserted; otherwise, the submitted key can be inserted after the largest key entry that is smaller than this key.

A key insertion or removal in a Multiple-Hierarchy architecture requires three Inserter/Removers for the three hierarchical blocks $B^2$ Register, $B^1$ RAM and $B^0$ RAM (in addition to a set of G Inserter/Removers for the G individual RAMs and an Inserter/Remover for the FC-RAM used in the Single-Hierarchy architecture). These Inserter/Removers do not require shifting capabilities.

3.2. Principles of Operation

3.2.1 Single-Hierarchy Architecture

3.2.1.1 Key Search

3.2.1.1.1 Serial Three-Step Search Algorithm

A sequential search of the submitted key (Key Search) in a G-RAM can be completed in three steps:

Step 1: Identification of the FC-RAM row where the submitted key may be located. This step is identical for Binary CAMs and RCAMs.

Step 2: Access to the FC-RAM row identified in Step 1 and identification of the key entry after which the submitted key may be located; this key entry points to a specific row in RAM # g. This step is identical for Binary CAMs and RCAMs.

Step 3: Access to the specific row in RAM # g identified in Step 2 and lookup of the submitted key, to find an exact match (for a Binary CAM) or a range match (for an RCAM). This step is clearly different for Binary CAMs and RCAMs.

Prior to the Key Search in the FC-RAM (FIG. 22), the submitted key K is compared with the FC-RAM values in the first and last locations. If $K<K_{0,0}$, the search is concluded because the key is not included in the G-RAM. If $K>K_{GW,V}$ (for exact match only), the key is not included in the FC-RAM, but the search must continue in the individual RAMs, because the key may be included in the G-RAM as long as $K \leq K_{U,V}$. If $K>K_{U,V}$ (for exact match only), then the key is not included in the G-RAM and the search is concluded.

If $K_{0,0} \leq K \leq K_{GW,V}$, the search procedure can start with Step 1:

Step 1: This step is performed to locate the FC-RAM row J (FIG. 22) that may contain the submitted key by searching through the first column key entries. If the submitted key is contained in the FC-RAM, the key must be located between two keys in the first column, one smaller or equal and the other larger than the searched key, i.e.:

$K_{0,J} \leq K < K_{0,J+1}$ for J<GW or $K_{0,J} \leq K \leq K_{GW,V}$ for J=GW Step 2: This step is performed to locate the key entry in row J of the FC-RAM (determined in step 1) that may match the submitted key. The entire J-th row is read out and all the key entries listed in the row are compared with the searched key.

If $K_{I,J} \leq K < K_{I+1,J}$, then $K \geq K_{I,J}$ for i≤I $K < K_{I,J}$ for $I<i \leq G-1$ if J<GW and for I<i≤W if J=GW If the submitted key is larger than or equals the key $K_{I,J}$, and is smaller than the next key $K_{I+1,J}$, then $K_{I,J}$ listed in row J and column I matches the searched range defined by $K_{I,J} \leq K < K_{I+1,J}$.

If the submitted key is larger than all the row entries in the FC-RAM, then the last key entry in the row is the matching key; this key points to a specific row J in RAM # g.

Step 3: This step is performed to locate the column I in RAM # g (identified in step 2) that may contain the submitted key (like in FIG. 8). The entire J-th row in RAM # g is read out and all the key entries listed in the row are compared with the searched key.

In Binary CAMs, the submitted key is compared with the key entries listed in the appropriate row (determined in step 2) in search for an Exact Match (identical values). The entire J-th row is read out and all the key entries listed in the row are compared with the submitted key K. If there is a row index I such that, $K=K_{I,J}$ then the key entry $K_{I,J}$ matches the searched key. In this case, the index pair (I,J) is used to access the entry $D_{I,J}$ located in RAM # g of the Associated Data under the same index; $D_{I,J}$ is readout along with a Match signal M="1" that indicates the validity of the retrieved associated data.

If $K \neq K_{I,J}$ for $0 \leq i \leq M-1$ when J≠V or $K \neq K_{I,J}$ for $0 \leq i \leq V$ when J=V then there is No Match. In this case, the CAM issues a No-Match signal M="0" to indicate the invalidity of the associated data issued on the Data Bus.

In RCAMs, the submitted key is compared with the key entries in the appropriate row searching for a Range Match (inclusion within the range). The entire J-th row is read out and all the range keys listed in the row are compared with the searched key.

If $K_{I,1} \leq K < K_{I+1,J}$, then $K \leq K_{I,J}$ for i≤I $K < K_{I,J}$ for $I<i \leq M-1$ if J<V and for I<i≤U if J=V If the submitted key is larger than or equals the key $K_{I,J}$ and is smaller than the next key $K_{I+1,J}$, then $K_{I,J}$ listed in row J and column I matches the searched range defined by $K_{I,J} \leq K < K_{I+1,J}$.

If the submitted key is larger than all the row entries in RAM # g, then the last valid key entry in the row is defined as the matching key. The index pair (I,J) of the matching key is used to access the associated data entry $D_{I,J}$ corresponding to $K_{I,J}$ (and to the matching range) located in RAM # g of the Associated Data List. The index pair (I,J) is also used to access the associated boundary type entry $M_{I,J}$ located in RAM # g of the Associated Boundary Type List; $M_{I,J}$ is a 1-bit number that determines the validity of the range:

$M_{I,J}$="1" corresponds to a Closed Boundary and designates a valid range, and $M_{I,J}$="0" corresponds to an Open Boundary and indicates that the range is not valid.

3.2.1.1.2 Pipelined Three-Step Search Algorithm

Figure 27:
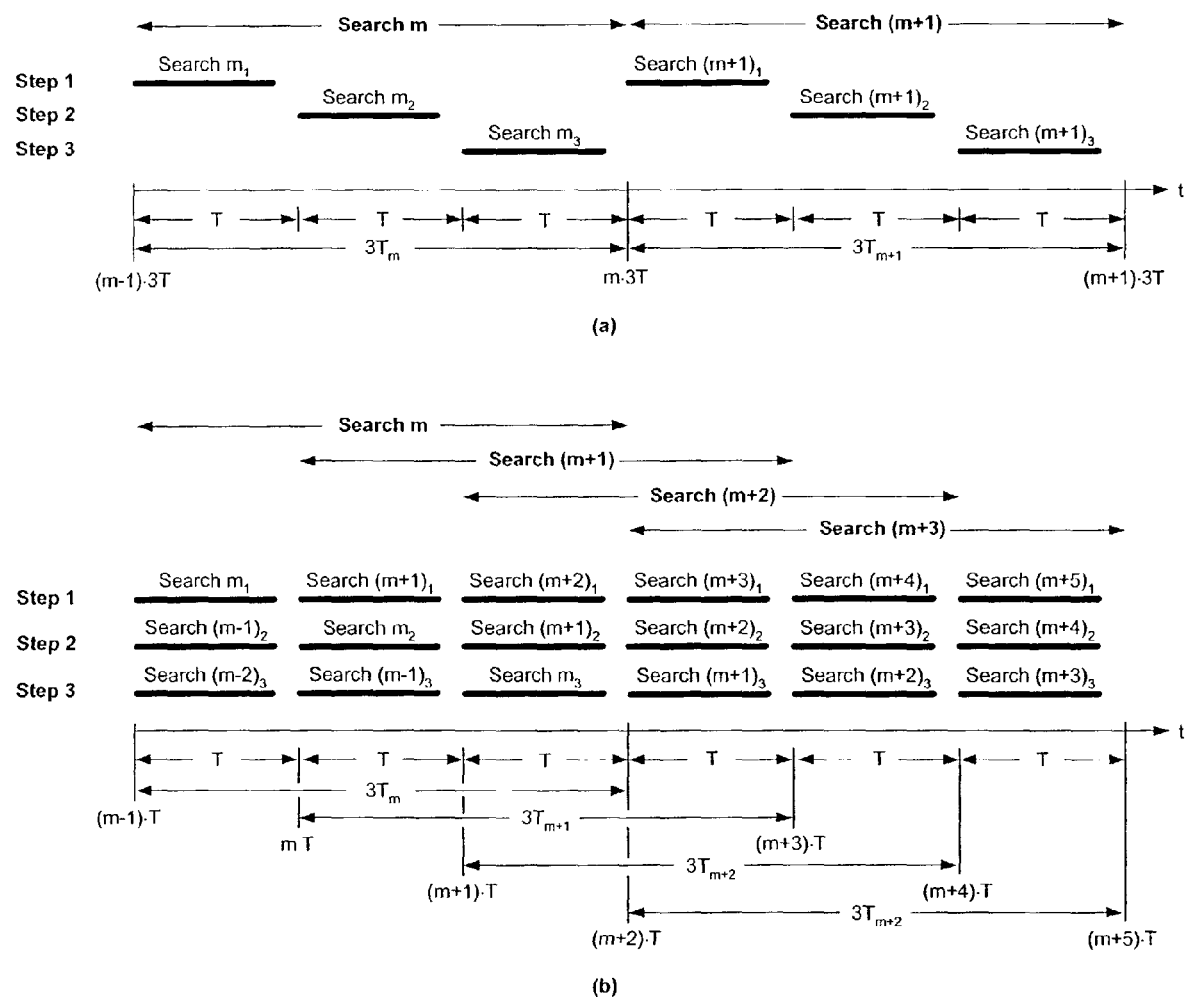
FIG. 27 a schematic timing diagram for (a) a three-step serial key search, and (b) for a corresponding pipelined key search.

The timing diagrams in FIG. 27 illustrate the difference between the three-step serial and pipelined search algorithms for the Multiple-RAM Single-Hierarchy Binary CAM or RCAM. In both modes, it is assumed that:

Each step of the three-step search cycle requires one RAM clock period for execution, denoted by T. Thus, each search cycle lasts 3T.

The Search operation starts with a search cycle for submitted Key 1, denoted as Search 1, which starts with a at t=0. Thus, step 1 of Search 1 (FC-RAM row identification) is completed at t=T, step 2 (FC-RAM key entry location in the identified row) at t=2T, and step 3 (key entry location in the identified row of RAM # g) at t=3T.

Search $m_1$, Search $m_2$ and Search $m_3$ represent steps 1, 2 and 3, respectively, of a generic Search m for submitted Key m.

In the serial three-step search algorithm, a new search cycle starts only after the search cycle for the previous key is completed; thus, it requires three clocks for execution and it is performed at one third of the clock rate. In this mode, since Step 1 (for Key 1) starts at t=0 and ends at t=3T, Search 2 (for Key 2) starts at t=3T and ends at t=6T; a generic Search m (for Key m) starts at t=(m−1)·3T and ends at t=m·3T. FIG. 27(a) shows the corresponding timing diagram.

In the pipelined search algorithm, a new search cycle starts after the first step of the previous search cycle is completed, i.e., just a clock period T after the start of the previous cycle; thus, it enables to perform search operations at full clock rate. In this mode, Search 2 (for Key 2) starts at t=T and ends at t=4T. A generic Search m (for Key m) starts at t=(m−1)·T and ends at t=(m+2)·2T. Step 1 of Search m takes place simultaneously with step 2 of the preceding Search m−1 and step 3 of Search m−2. Step 2 of Search m takes place with step $_1$ of the succeeding Search m+1 and step 3 of the preceding Search m−1. Step 3 of Search m takes place with step 1 of Search m+2 and step 2 of Search m+1. FIG. 27(*b*) shows the corresponding timing diagram.

3.2.1.1.3 First Column Register

The search algorithms mentioned above are based on the assumption that the access to the first column entries in the FC-RAM can be performed in one step (or in a single clock). Since the RAM structure enables the access to a single RAM word (or a single FC-RAM row) in a single clock cycle, a First Column Register is used to allow a simultaneous access to the FC-RAM first column keys in a single clock (in step 1 of the Serial Three-Step Search Algorithm). This register is identical for Binary CAMs and RCAMs. It incorporates the first column keys and is kept updated as shown in FIG. 10.

The loading of the First Column Register keys is performed during the Key Insert or Key Remove operations. During the Insert operation, the keys are loaded and serially shifted bottom-up from the $D_B$ input. During the Remove operation, the keys are loaded and serially shifted top-down from the $D_T$ input.

3.2.1.1.4 Search Row and Column Locators

The search algorithms also require a Row Locator for the FC-RAM row identification (in step 1 of the Serial Three-Step Search Algorithm), a Column Locator for the FC-RAM key entry location in the identified row (in step 2), and G Column Locators for the location of the key entry in each of the G RAMs (in step 3).

The Row Locator is identical for Binary CAMs and RCAMs.

The Column Locator is different for Binary CAMs and RCAMs. In Binary CAMs, the Column Locator it searches for a key entry that exactly matches the submitted key, whereas in RCAMs it searches for a key entry which represents the lower boundary of the range that contains the submitted key.

3.2.1.2 Keeping the Key List in Order—Insert and Remove Operations

The insertion or removal of keys demands constant updating of the G RAMs and the FC-RAM to maintain the order therein. The straightforward way to update the keys is by applying a serial and lengthy algorithm on G RAMs; this requires sequential readout and update of all the their entries.

3.2.1.2.1 Preliminary Search for the Insert and Remove Operations

Prior to the key insertion/removal, a Search procedure determines the position where the submitted Key $K_E$ is to be inserted or removed in one of the G RAMs, provided that these operations are allowed. Key insertion is allowed only if the key is not included in any G RAM, whereas key removal is possible only if the key is already included in one of the G RAMs. The preliminary Search procedure is identical for Binary CAMs and RCAMs; and resembles the Serial Three-Step Search procedure (Section 3.2.1.1.1) for determining the validity of the identified range and associated data in RCAMs. However, in this case, the preliminary Search procedure determines the index of the key to be inserted or removed, provided that these operations are allowed.

3.2.1.2.1.1 Locating the Position Index of the New Key for Insertion

Since all the inserted keys are different, the following cases may occur:

Case 1: $K_E < K_{0,0}$

In this case, the new key must be inserted right at the beginning of the list. All the other list entries have to be shifted one location forward.

Case 2: $K_E > K_{U,V}$

In this case, the new key is simply appended at the end of the list.

Case 3: $K_{GM-1,J-1} < K_E < K_{0,J}$

In this case, the key has to be inserted just in the beginning of the extended row J.

Case 4: $K_{0,J} < K_E < K_{GM-1,J}$

In this case, the key has to be inserted inside the extended row J.

The requirements for locating the row and column for key insertion are similar to those for locating the row and column during Range Key Search; thus, the Insert Row Locator is similar to the Search Row Locator shown in FIG. 11, and the Insert Column Locator is similar to the Range Search Column Locator shown in FIG. 13.

3.2.1.2.1.2 Locating the Position Index of the Key for Removal

The requirements for locating the row and column for key removal are similar to those for locating the row and column during Exact Key Search; therefore, the Remove Row Locator is similar to the Search Row Locator shown in FIG. 11, and the Remove Column Locator is similar to the Exact Search Column Locator shown in FIG. 12.

3.2.1.2.2 Insert and Remove Supporting Structures

The surrounding hardware that supports the Key insertion and removal is identical for Binary CAMs and RCAMs.

One implementation includes one First Column Register and G Inserter/Removers for all the RAMs of the G-RAM. Each Inserter/Remover consists of M b-bit registers $d_0, d_1, d_2, \ldots, d_{M-2}, d_{M-1}$. Only one leftmost register $d_E$ is required, which can be integrated in the leftmost Inserter/Remover as shown in FIG. 14. For description of the Insert and Remove supporting structures, refer to Section 2.2.2.2. The First Column Register can be used for updating the FC-RAM as the first columns of the RAMs in the G-RAM undergo changes.

In a second implementation, the First Column Register is not required, and a Read/Write Register without shifting capabilities is used to update the FC-RAM.

The implementation that omits all the key entries in the first columns of the multiple RAMs (already included in the FC-RAM) from these RAMs require G one-cell registers (one register for each column of in the FC-RAM), which operate in conjunction with the G Inserter/Removers for the RAMs during Insert and Remove operations. Each of these Inserter/Removers includes only M−1 (instead of M) cell registers.

3.2.1.2.3 Insert Operation

The Insert operation is identical for Binary CAMs and RCAMs. This operation is exemplified by the insertion of the key 56 in the second RAM of a G-RAM consisting of two 5×4 RAMs.

Figure 28:
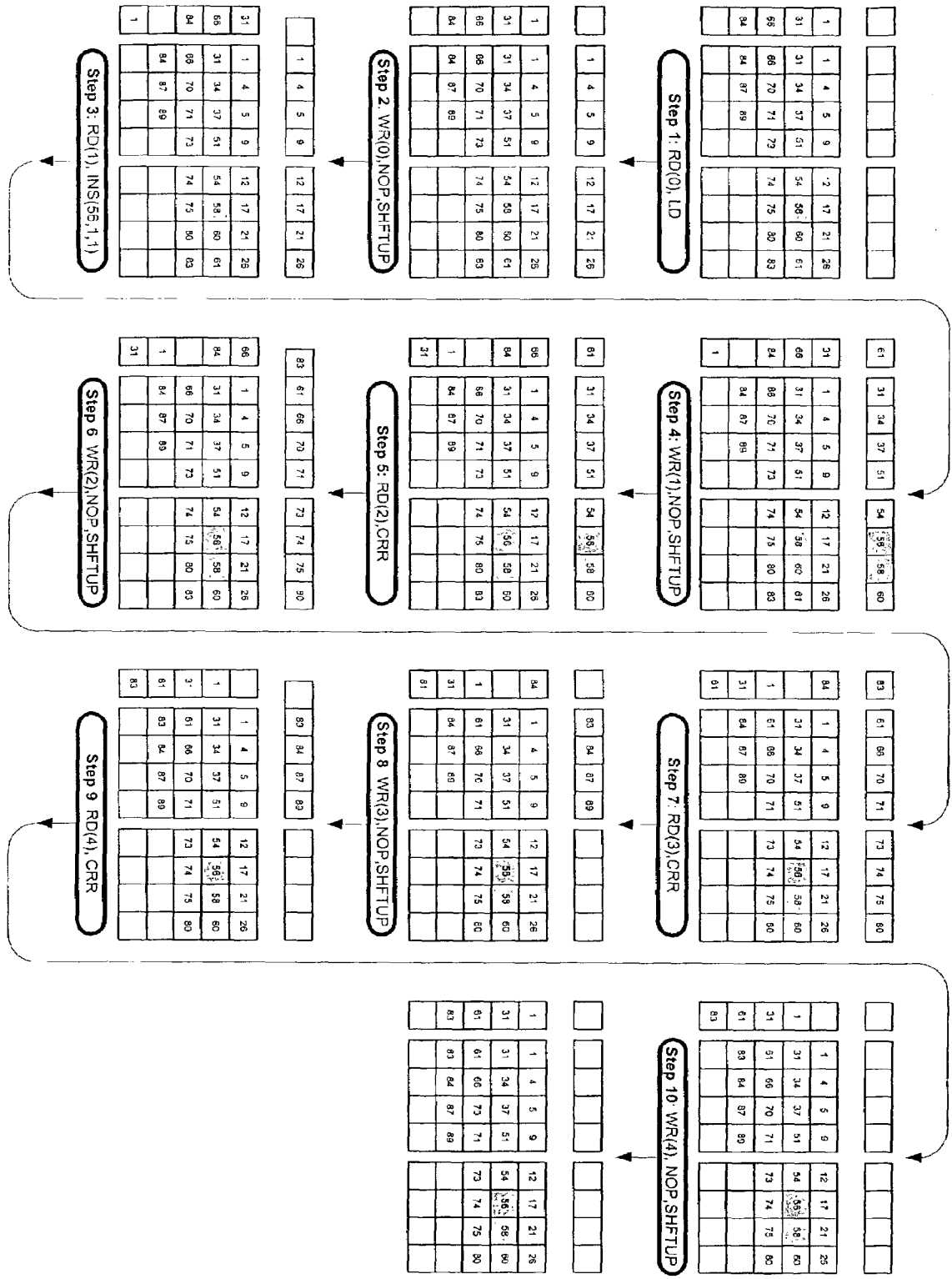
FIG. 28 is an exemplary, schematic illustration of a G-RAM having two 5×4 RAMs and a first column register, in which the number 56 is inserted into the second RAM, according to one embodiment of the present invention.

FIG. 28 shows one implementation of the Insert operation, with the G-RAM, one First Column Register and two Inserter/Removers after each step. The initial state of the G-RAM is depicted in the upper leftmost corner of FIG. 28. Each step consists of concurrent actions performed on a single G-RAM row in conjunction with the FC-RAM and the two Inserter/Removers. This Insert procedure is similar to the insertion of the key 56 in a 5×8 TDA described in Section 2.2.2.3 and shown in FIG. 17. The difference lies in the INS($K_E$,POS) (Insert) command, that becomes INS($K_E$, RAM#,POS), to include the number of the specific RAM in the G-RAM where $K_E$ is inserted. The FC-RAM (not shown) can be updated by means of the First Column Register.

Figure 29:
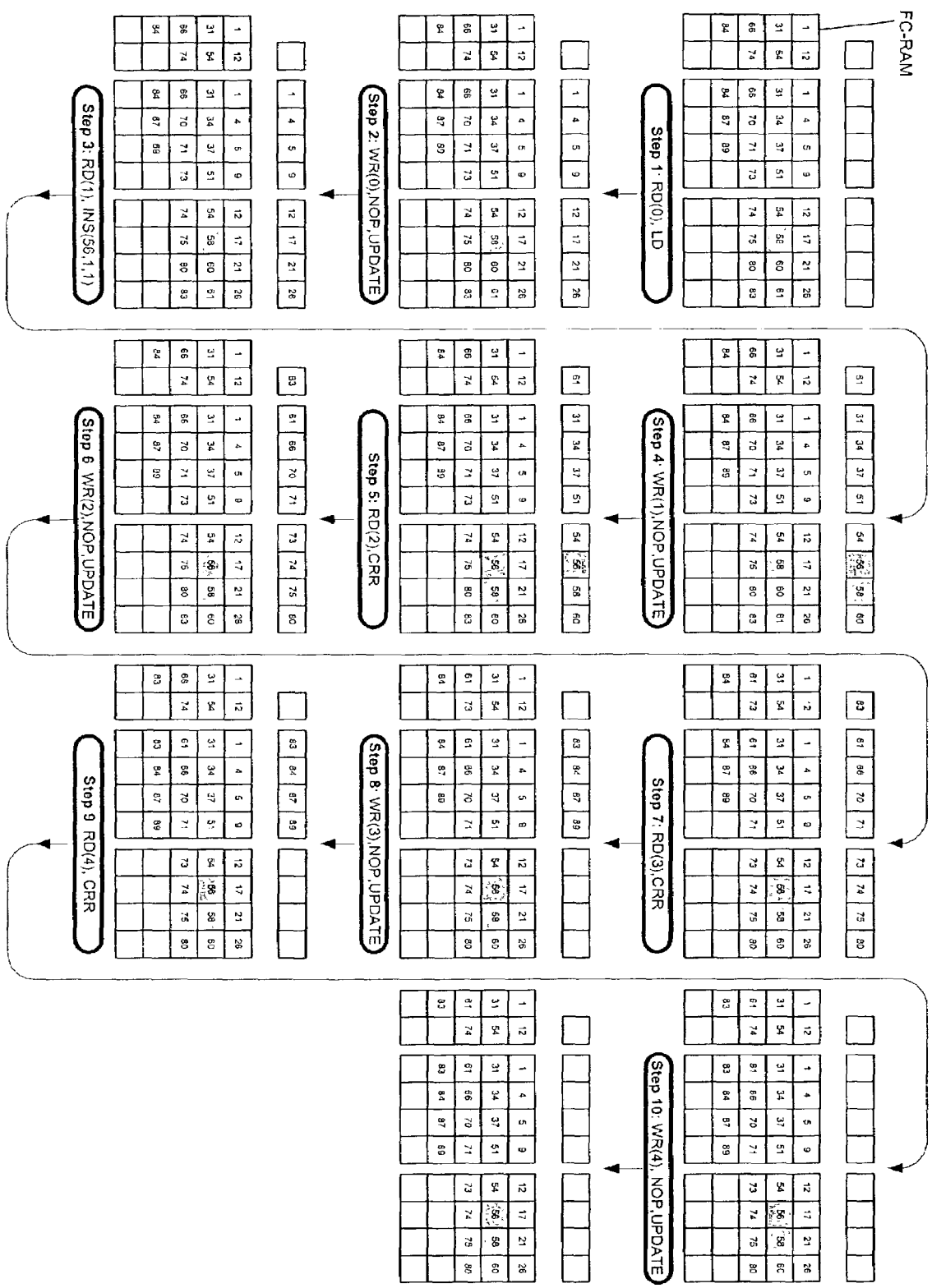
FIG. 29 is an exemplary, schematic illustration of a G-RAM having two 5×4 RAMs and an FC-RAM, in which the number 56 is inserted into the second RAM, according to another embodiment of the present invention.

The second implementation of the Insert procedure uses an FC-RAM instead of the First Column Register, as shown in FIG. 29. In this case, the SHFTUP (Shift-Up) command is not required, and UPDATE is used instead for updating the FC-RAM. The FC-RAM can be updated by means of a Read/Write Register (not shown).

3.2.1.2.4 Remove Operation

The Remove operation is identical for Binary CAMs and RCAMs. This operation is exemplified by the removal of the key 58 from the second RAM of a G-RAM consisting of two 5×4 RAMs.

Figure 30:
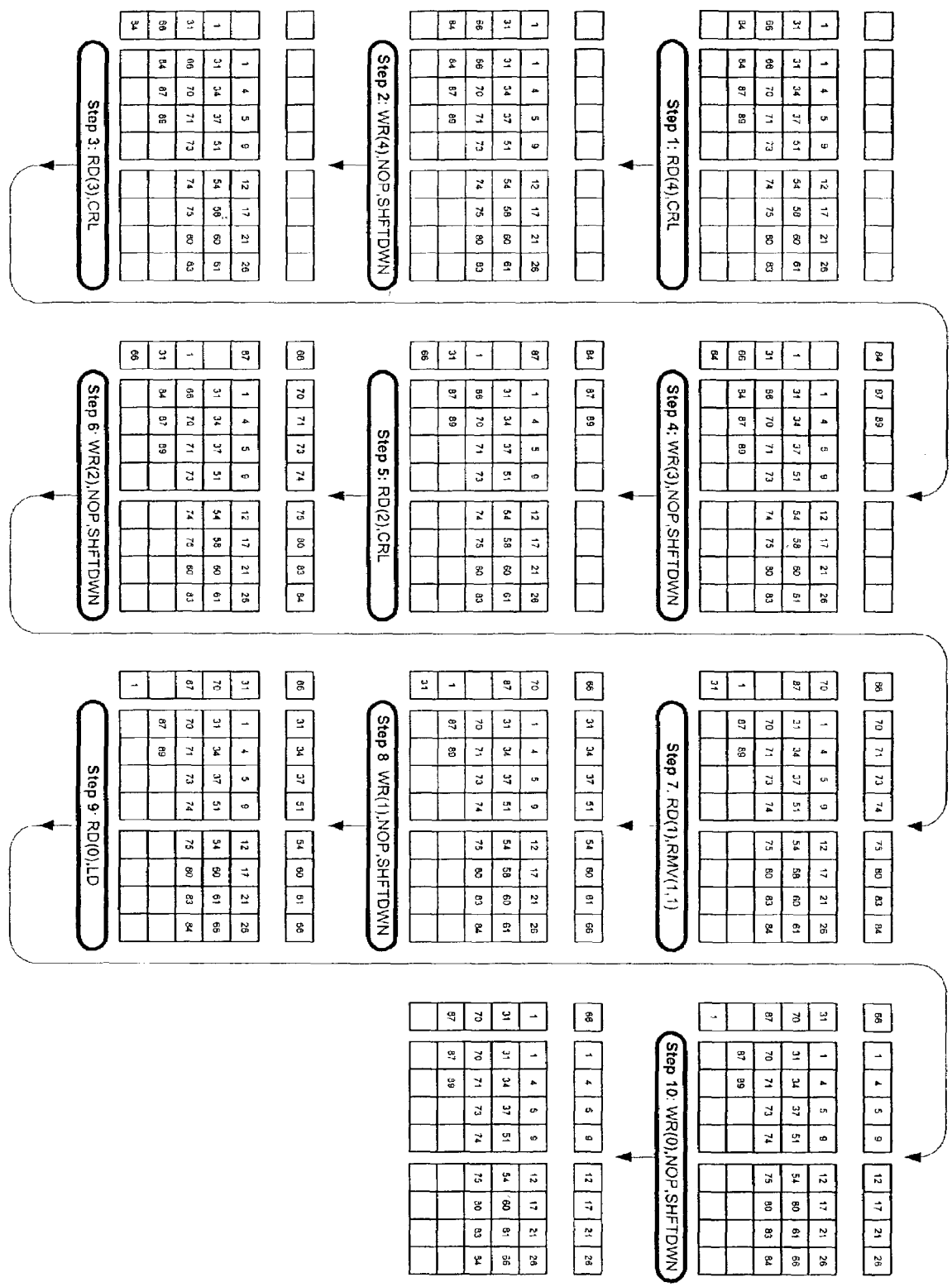
FIG. 30 is an exemplary, schematic illustration of a G-RAM having two 5×4 RAMs and a first column register, in which the number 58 is removed from the second RAM, according to one embodiment of the present invention.

FIG. 30 shows one implementation of the Remove operation, with the G-RAM, one First Column Register and two Inserter/Removers after each step. The initial state of the G-RAM is depicted in the upper leftmost corner of FIG. 30. Each step consists of concurrent actions performed on a single G-RAM row in conjunction with the FC-RAM and the two Inserter/Removers. This Remove procedure is similar to the removal of the key 58 from a 5×8 TDA described in Section 2.2.2.4 and shown in FIG. 18. The differences lie in the RMV(POS) (Remove) command, that becomes RMV (RAM#,POS), to include the number of the specific RAM in the G-RAM where the indicated key is removed. The FC-RAM (not shown) can be updated by means of the First Column Register.

Figure 31:
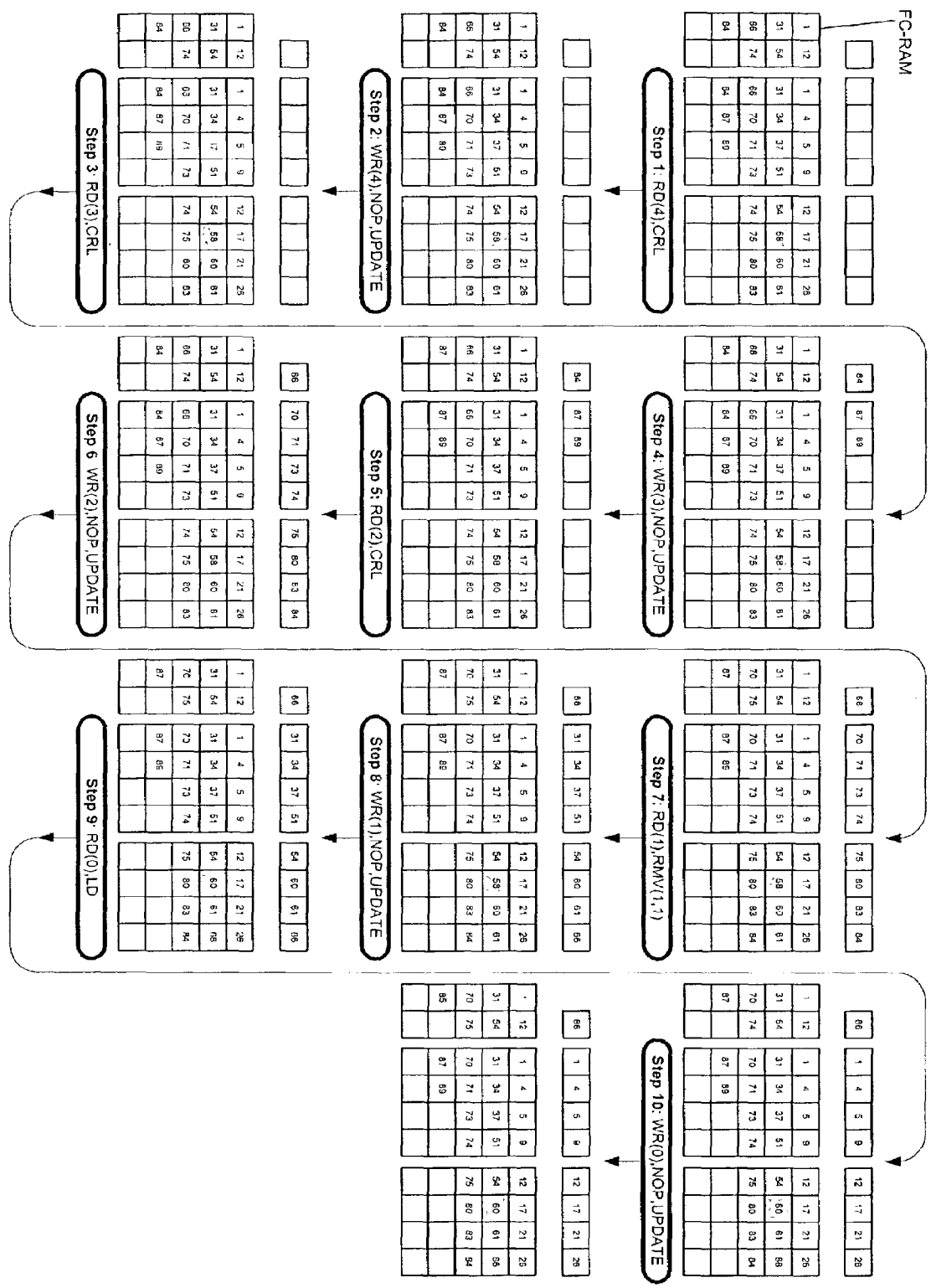
FIG. 31 is an exemplary, schematic illustration of a G-RAM having two 5×4 RAMs and an FC-RAM, in which the number 58 is removed from the second RAM, according to another embodiment of the present invention.

The second implementation of the Remove procedure uses an FC-RAM instead of the First Column Register, as shown in FIG. 31. In this case, the SHFTDWN (Shift-Down) command is not required, and UPDATE is used instead for updating the FC-RAM. The FC-RAM can be updated by means of a Read/Write Register (not shown).

3.2.1.2.5 Disruption of an Insert or Remove Operation to Perform a Search Operation An Insert or Remove operation in a G-RAM is disrupted to perform a Search operation in a similar process to that performed in a single RAM, described in Section 2.2.2.5.

When a key K is submitted for search (lookup) during an Insert or Remove operation, this operation stops in a specific "extended row" of the G-RAM in order to proceed with the search; this row is called "Extended Paused Row" and its key entries are denoted as $K_{i,P}$.

If the searched key K is located in a row that is not the Extended Paused Row (but a preceding or succeeding extended row), or it is equal to or smaller than the current last entry in the Extended Paused Row ($K \leq K_{G\ M-1,P}$), then the search proceeds within the relevant row in the usual fashion, as described in step 3 of the Three-Step Search Algorithm (Section 3.2.1.1.1).

However, if $K > K_{G\ M-1,P}$, then the searched key K can be either $K_{G\ M-1,P}$ or the value of the key stored in the leftmost register $d_E$, which can be integrated in the leftmost Inserter/Remover (see Section 2.2.2.2.1 and FIG. 14). This key is, in the case of an Insert operation, the value of the last entry in the Extended Paused Row previous to the key insertion (denoted as $K^*_{G\cdot M-1,P}$), or, in the case of a Remove operation, the value of the first entry in the Extended Paused Row successor previous to the key removal (denoted as $K^*_{0,P+1}$). The search of the submitted key K requires in either case a comparison of K with the key stored in the register $d_E$ ($K^*_{G\ M-1,P}$ for insertion or $K^*_{0,P+1}$ for removal) to determine the index of K. This can be implemented with a comparator similar to comparator 1101 in the Search Column Locator used for RCAMs, shown in FIG. 13. This comparator issues two signals: GT, which equals "1" when $In_2 > In_1$, otherwise GT equals "0"; and EQ, which is "1" when $In_2 = In_1$, otherwise EQ equals "0".

For a RAM-Based Binary CAM, the EQ signal is used. If $K = K^*_{G\ M-1,P}$ for insertion, or $K = K^*_{0,P+1}$ for removal, then $K^*_{G\ M-1,P}$ or $K^*_{0,P+1}$ exactly matches the searched key and its index is used to access the corresponding entry in the Associated Data List. The Associated Data entry is readout along with a Match signal M="1" that indicates entry validity.

For a RAM-Based RCAM, both the GT and EQ signals are used. If $K < K^*_{G\ M-1,P}$ for insertion, or $K < K^*_{0,P+1}$ for removal, then the searched key is $K_{G\ M-1,P}$. If $K \geq K^*_{G\cdot M-1,P}$ for insertion, or $K \geq K^*_{0,P+1}$ for removal, then the searched key is $K^*_{G\ M-1,P}$ or $K^*_{0,P+1}$, respectively. The index of $K_{M-1,P}$, $K^*_{M-1,P}$ or $K^*_{0,P+1}$, whichever is relevant, is used to access the corresponding entries in the Associated Data and Associated Boundary Type Lists. An Associated Boundary Type entry of "1", corresponds to a Closed Boundary and designates a valid range; an entry of "0" corresponds to an Open Boundary and indicates that the range is not valid.

When a key is submitted for search, the Insert or Remove operation in execution is disrupted only after the contents of the Inserter/Removers are -written to the Extended Paused Row. The Insert or Remove operation is subsequently resumed by reading the succeeding extended row (for insertion) or the preceding extended row (for removal). During this disruption, the FC-RAM update is simultaneously discontinued until the Search operation is completed and the Insert or Remove operation in the G-RAM is resumed.

Example of Disruption of an Insert Operation:

In this example, the insertion of the key 56 in the second RAM of a G-RAM consisting of two 5×4 RAMs (Section 3.2.1.2.3) is disrupted. FIG. 28 shows the G-RAM, Inserter/Removers and First Column Register after each step of the Insert procedure. FIG. 29 shows the FC-RAM instead of the First Column Register. Assume that the key K=65 is submitted for search.

If the key is submitted during any step of the Insert procedure that does not involve the extended row number 1 (i.e., the Extended Paused Row is not row number 1), or if $K \leq K_{M-1,1}$, the search proceeds as described in step 3 of the Three-Step Search Algorithm (Section 2.2.1.1). However, if the key is submitted during step 3 or 4 in FIG. 28 or FIG. 29, then the key insertion is disrupted after step 4. Since $K = 65 > K_{G\ M-1,P} = 60$, 65 is compared with the key stored in the register $d_E$, i.e., $K^*_{M-1,P} = 61$.

Since $K > K^*_{M-1,P}$, in the case of a RAM-Based Binary CAM, there is no key entry that exactly matches the searched key. A No-Match signal M="0" is issued, and no Associated Data entry is retrieved. In the case of a RAM- Based RCAM, $K^*_{M-1,P}=61$ is the range match for the searched key and is used to retrieve the Associated Data and Boundary Type entries.

Example of Disruption of a Remove Operation:

In this example, the removal of the key 58 from the second RAM of a G-RAM consisting of two 5×4 RAMs (Section 3.2.1.2.4) is disrupted. FIG. 30 shows the G-RAM, Inserter/Removers and First Column Register after each step of the Remove procedure. FIG. 31 shows the FC-RAM instead of the First Column Register. Assuming that the key K=65 is submitted for search:

If the key is submitted during any step of the Insert procedure that does not involve the extended row number 1 (i.e., the Extended Paused Row is not row number 1), or if $K \leq K_{M-1,1}$, the search proceeds as described in step 3 of the Three-Step Search Algorithm (Section 2.2.1.1). However, if the key is submitted during step 7 or 8 in FIG. 30 or FIG. 31, then the key insertion is disrupted after step 8. Since $K=65>K_{G M-1,P}=61$, 65 is compared with the key stored in the register $d_E$, i.e., $K^*_{0,P+1}=66$.

Since $K<K^*_{0,P+1}$, in the case of a RAM-Based Binary CAM, there is no key entry that exactly matches the searched key. A No-Match signal M="0" is issued, and no Associated Data entry is retrieved. In the case of a RAM-Based RCAM, $K_{G M-1,P}=61$ is the range match for the searched key and is used to retrieve the Associated Data and Boundary Type entries.

3.2.1.2.6 Insert and Remove Operations in the G-RAM for the Associated Data and Associated Boundary Type The indices of the G-RAM for the Associated Data entries and Associated Boundary Type entries (for RCAMs only) must remain in correspondence with the key entry index. The Insert and Remove operations in the G-RAM are accompanied by corresponding and simultaneous Insert and Remove operations in the Associated Data G-RAM for Binary CAMs and RCAMs. Additional Insert and Remove operations take place in the Associated Boundary Type G-RAM for RCAMs only. Similarly, the disruption in the insertion or removal of key entries for a search of submitted keys is accompanied by corresponding disruptions in the insertion or removal of Associated Data and Boundary Type entries.

3.2.1.2.7 Bit-Mapped Update Operation (for RCAMs Only)

The Bit-Mapped Update Operation changes the Associated Data and Associated Boundary Type entries corresponding to a specified group of sequential keys in the Key G-RAM, without changing the number of keys in this G-RAM. This operation is generally necessary when an overlapping range is inserted in or removed from the G-RAM (see Section 1.6); it is performed sequentially in each RAM of the G-RAM.

When, for example, the key 56 is inserted in the second RAM of a G-RAM consisting of two 5×4 RAMs (FIG. 28), the associated boundary type and associated data entries corresponding to the sequential keys 56 and 57 must change to $m_{56}$ and $d_{56}$, respectively, instead of $m_{54}$ and $d_{54}$ (corresponding to the keys 54), and all the other keys in the same row do not change. This integrated change in the second row (number 1) is performed by a 4-bit long Bit-Mapped Update command consisting of 1's for the keys 56 and 57 and 0's for all the other keys in this row. Similar Bit-Mapped Update commands are applied in all the other rows of the second RAM corresponding to the changes required in each row.

Similarly, when the key 58 is removed from the second RAM of a G-RAM consisting of two 5×4 RAMs (FIG. 30), the associated boundary type and associated data entries corresponding to the sequential keys 58 and 59 must change to $m_{54}$ and $d_{54}$ (corresponding to the keys 54), respectively, instead of $m_{58}$ and $d_{58}$, whereas all the other keys in the same row remain unchanged. This change in the second row (number 1) is performed by a 4-bit long Bit-Mapped Update command consisting of 1's for the keys 58 and 59 and 0's for all the other keys in this row. Similar Bit-Mapped Update commands are applied in all the other rows of the second RAM corresponding to the changes required in each row.

3.2.2 Multiple-Hierarchy Architecture 3.2.2.1 Key Search 3.2.2.1.1 Serial Five-Step Search Algorithm A sequential search of the submitted key (Key Search) in a G-RAM with three hierarchical blocks, $B^2$ Register, $B^1$ RAM and $B^0$ RAM can be completed in five steps. With the exception of Step 5, all steps are identical for Binary CAMs and RCAMs.

Step 1: Identification of the key entry in $B^2$ Register after which the submitted key may be located; this key entry points to a specific row in the $B^1$ RAM.

Step 2: Access to the $B^1$ RAM row identified in Step 1 and identification of the key entry after which the submitted key may be located; this key entry points to a specific row in the $B^0$ RAM.

Step 3: Access to the $B^0$ RAM row identified in Step 2 and identification of the key entry after which the submitted key may be located; this key entry points to a specific row in the FC-RAM.

Step 4: Access to the FC-RAM row identified in Step 3 and identification of the key entry after which the submitted key may be located; this key entry points to a specific row in RAM # g.

Step 5: Access to the specific row in RAM # g identified in Step 4 and lookup of the submitted key, to find an exact match (for a Binary CAM) or a range match (for an RCAM). This step is clearly different for Binary CAMs and RCAMs.

Prior to the Key Search in the FC-RAM (FIG. 22), the submitted key K is compared with the FC-RAM values in the first and last locations. If $K<K_{0,0}$, then the search is concluded, because the key is not included in the G-RAM. If $K>K_{GW,V}$ (for exact match only), then the key is not included in the FC-RAM, but the search must continue in the individual RAMs, because the key may be included in the G-RAM as long as $K \leq K_{U,V}$. If $K>K_{U,V}$ (for exact match only), then the key is not included in the G-RAM and the search is concluded.

If $K_{0,0} \leq K \leq K_{GW,V}$, the search procedure can start with Step 1:

Step 1: This step is performed to locate the key entry in the $B^2$ Register (FIG. 23) after which the submitted key may be located. The entire register is read out and all the key entries listed are compared with the searched key.

If $K_{0,J} \leq K < K_{0,J+1}$, then $K \geq K_{0,j}$ for $j \leq J$ $K < K_{0,j}$ for $J < j \leq A-1$ If the submitted key is larger than or equal to the key $K_{0,J}$ and is smaller than the next key $K_{0,J+1}$, then $K_{0,J}$ matches the searched range defined by $K_{0,J} \leq K < K_{0,J+1}$. If the submitted key is larger than all the key entries in the $B^2$ Register, then the last key entry in the register is the matching key.

Assuming that the submitted key is located after the key entry $K_{0,J}$ in the $B^2$ Register, then this register informs the $B^1$ RAM on the cell index of $K_{0,J}$, denoted as $J_2$, by means of an output signal, denoted by Add ($B^2$):

$$\text{Add}(B^2)=J_2$$

Add ($B^2$) points to the specific row in the $B^1$ RAM where $K_{0,J}$ may be located.

Step 2: This step is performed to locate the key entry in the $B^1$ RAM row (FIG. 23) after which he submitted key may be located; this row is specified by Add ($B^2$) determined in step 1. The entire row is read out and all the key entries listed are compared with the searched key.

If $K_{0,J} \leq K < K_{0,J+1}$, then $K \geq K_{0,j}$ for $j \leq J$ $K < K_{0,j}$ for $J < j \leq B-1$ Assuming that the submitted key is located after the key entry $K_{0,J}$ in the $B^1$ RAM, then this register informs the $B^0$ RAM on the column index of $K_{0,J}$, denoted as $J_1$, by means of an output signal, denoted by Add ($B^1$). This output signal depends on the column index $J_1$ of the submitted key in the $B^1$ RAM and also on the input signal arriving from the $B^2$ Register, which in turn depends on Add ($B^2$) as follows:

$$\text{Add}(B^1)=J_1+B\cdot\text{Add}(B^2)=J_1+B\cdot J_2$$

Add ($B^1$) points to the specific row in the $B^0$ RAM where $K_{0,J}$ may be located.

Step 3: This step is performed to locate the key entry in the $B^0$ RAM row (FIG. 23) after which the submitted key may be located; this row is specified by Add ($B^1$) determined in step 2. The entire row is read out and all the key entries listed are compared with the searched key.

If $K_{0,J} \leq K < K_{0,J+1}$, then $K \geq K_{0,j}$ for $j \leq J$ $K < K_{0,j}$ for $J < j \leq B-1$ Assuming that the submitted key is located after the key entry $K_{0,J}$ in the $B^0$ RAM, then this register informs the FC-RAM on the column index of $K_{0,J}$, denoted as $J_0$, by means of an output signal, denoted by Add ($B^0$). This output signal depends on the column index $J_2$ of the submitted key in the $B^0$ RAM and also on the input signal arriving from the $B^1$ Register, which in turn depends on Add ($B^1$) and Add ($B^2$). Since Add ($B^1$) and Add ($B^2$) depend of $J_1$ and $J_2$, then Add ($B^0$) can be finally written in terms of $J_0$, $J_1$ and $J_2$, as shown in the following formulas:

$$\text{Add}(B^0)=J_0+B\cdot\text{Add}(B^1)$$

$$\text{Add}(B^0)=J_0+B\cdot J_1+B^2\cdot\text{Add}(B^2)$$

$$\text{Add}(B^0)=J_0+B\cdot J_1+B^2\cdot J_2$$

Add ($B^0$) points to the specific row in the FC-RAM where $K_{0,J}$ may be located.

Step 4: This step is performed to locate the key entry in the FC-RAM row (FIG. 22) after which the submitted key may be located; this row is specified by Add ($B^0$) determined in step 3. This step is identical to Step 2 in the Serial Three-Step Search Algorithm for the Single-Hierarchy G-RAM described in Section 3.2.1.1.1.

Step 5: This step is performed to locate the column I in RAM # g that may contain the submitted key. This step is identical to Step 3 in the Serial Three-Step Search Algorithm for the Single-Hierarchy G-RAM (Section 3.2.1.1.1).

Example of Range Search Operation:

An example of a Five-Step Exact or Range Search of the submitted key in a G-RAM with three hierarchical blocks, $B^2$ Register, $B^1$ RAM and $B^0$ RAM, is shown below in reference to FIG. 26. It is assumed that the G-RAM is composed of four 100×100 RAMs, and that the submitted key K is equal to or larger than key entry $K_{44,72}$ and smaller than $K_{45,72}$ of the second RAM (g=1), or, equivalently, is equal to or larger than $K_{144,72}$ and smaller than $K_{145,72}$ of the G-RAM, because $$I=i+g\cdot M=44+1\cdot 100=144,$$

Thus, the submitted key K is equal to or larger than the key entry $K_{72}$ and smaller than $K_{73}$ of the FC-RAM first column (FIG. 26), i.e., $$K_{72} \leq K < K_{73}$$

Step 1: Identification of the key entry in the $B^2$ Register after which the submitted key may be located.

$$K_{50} \leq K < K_{75}$$

$K_{50}$ meets the search condition in the $B^2$ Register and is located after the key entry in cell 2.

$$\text{Add}(B^2)=J_2=2$$

Add ($B^2$) points to row 2 in the $B^1$ RAM.

Step 2: Identification of the key entry in row 2 in the $B^1$ RAM after which the submitted key may be located.

$$K_{70} \leq K < K_{85}$$

$K_{70}$ meets the search condition in the $B^1$ RAM row and is located after the key entry in cell 4.

$$J_1=4$$

$$\text{Add}(B^1)=J_1+B\cdot\text{Add}(B^2)=4+5\cdot 2=14$$

Add ($B^1$) points to row 14 in the $B^0$ RAM.

Step 3: Identification of the key entry in row 14 in the $B^0$ RAM row after which the submitted key may be located.

$$K_{72} \leq K < K_{73}$$

$K_{72}$ meets the search condition in the $B^0$ RAM row and is located after the key entry in cell 2.

$$J_0=2$$

$$\text{Add}(B^0)=J_0+B\cdot\text{Add}(B^1)=2+5\cdot 14=72$$

Add ($B^0$) points to row 72 in the FC-RAM.

Step 4: Identification of the key entry in row 72 of the FC-RAM after which the submitted key may be located.

$$K_{144,72} \leq K < K_{145,72}$$

The matching key points to row 72 in RAM if 1.

Step 5: Identification of the key entry in row 72 of RAM # 1 that may contain the submitted key.

In Binary CAMs, the submitted key is compared with the key entries listed in row 72 in RAM # 1 searching for an Exact Match. If $K=K_{44,72}$, then the key entry $K_{44,72}$ of RAM # 1 matches the searched key. In this case the index pair (44,72) is used to access the entry $D_{44,72}$ located in RAM # 1 of the Associated Data List under the same index; $D_{44,72}$ is read out along with a Match signal M="1" that indicates the validity of the retrieved associated data. If K>$K_{44,72}$, then there is No Match. In this case, the CAM issues a No-Match signal, M="0" to indicate the invalidity of the associated data.

In RCAMs, the submitted key is compared with the key entries in row 72 in RAM # 1 searching for a Range Match. If $K_{44,72} \leq K < K_{45,72}$, then the index pair (44,72) of the matching key is used to access the associated data entry $D_{44,72}$ corresponding to $K_{44,72}$ (and to the matching range) located in RAM # 1 of the Associated Data List, and the associated boundary type entry $M_{44,72}$ located in RAM # 1 of the Associated Boundary Type List.

$M_{44,72}$="1" corresponds to a Closed Boundary and designates a valid range, and $M_{44,72}$="0" corresponds to an Open Boundary and indicates that the range is not valid.

3.2.2.1.2 Pipelined Five-Step Search Algorithm

Figure 32:
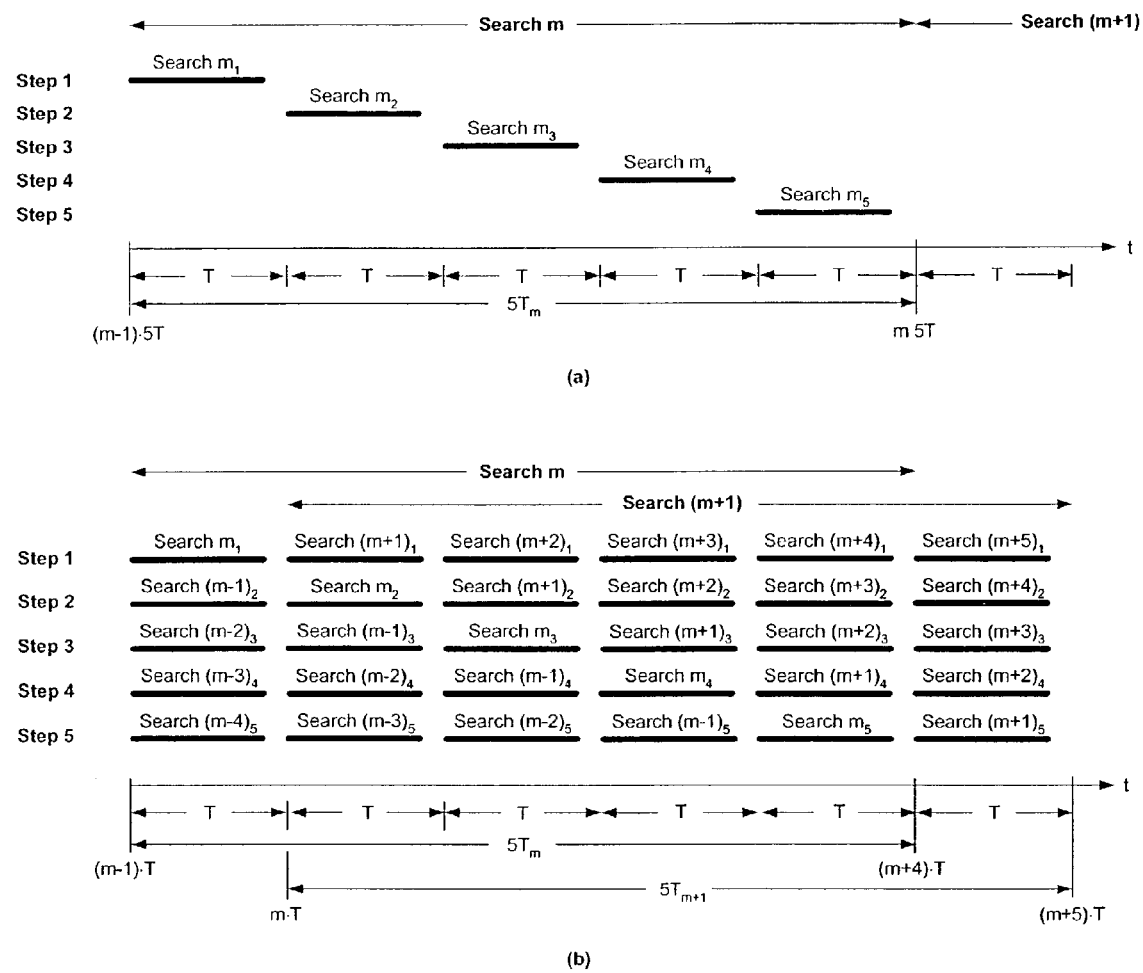
FIG. 32 an exemplary, schematic timing diagram for (a) a five-step serial key search, and (b) for a corresponding pipelined key search.

The timing diagrams in FIG. 32 illustrate the difference between the five-step serial and the pipelined search algorithms for the Multiple-RAM Multiple-Hierarchy Binary CAM or RCAM. In both modes, it is assumed that:

Each step of the five-step search cycle requires one RAM clock period for execution, denoted by T. Thus, each search cycle lasts 5T.

The Search operation starts with a search cycle for submitted Key 1, denoted as Search 1, which starts with a at t=0. Thus, step 1 of Search 1 (identification of the $B^2$ Register key entry and corresponding row in the $B^1$ RAM) is completed at t=T, step 2 (identification of the $B^1$ RAM key entry and the corresponding row in the $B^0$ RAM) at t=2T, step 3 (identification of the $B^0$ RAM key entry and the corresponding row in the FC-RAM) at t=3T, step 4 (location of the FC-RAM key entry in the identified row) at t=4T, and step 5 (location of the key entry in the identified row of RAM # g) at t=5T.

Search $m_1$, Search $m_2$, Search $m_3$, Search $M_4$ and Search $m_5$ represent steps 1, 2, 3, 4 and 5 respectively, of a generic Search m for submitted Key m.

In the serial five-step search algorithm, a new search cycle starts only after the search cycle for the previous key is completed; thus, it requires five clocks for execution and it is performed at one fifth of the clock rate. In this mode, since Step 1 (for Key 1) starts at t=0 and ends at t=5T, Search 2 (for Key 2) starts at t=5T and ends at t=10T; a generic Search m (for Key m) starts at t=(m−1)·5T and ends at t=m·5T. FIG. 32(*a*) shows the corresponding timing diagram.

In the pipelined search algorithm, a new search cycle starts after the first step of the previous search cycle is completed, i.e., just a clock period T after the start of the previous cycle; thus, it enables to perform search operations at full clock rate. In this mode, Search 2 (for Key 2) starts at t=T and ends at t=6T. A generic Search m (for Key m) starts at t=(m−1)·T and ends at t=(m+4)·2T. Step 1 of Search m takes place simultaneously with step 2 of the preceding Search m−1, step 3 of Search m−2, step 4 of Search m−3, and step 5 of Search m−4. Step 2 of Search m takes place with step 1 of the succeeding Search m+1, step 3 of Search m−2, step 4 of Search m−2, and step 5 of Search m−3. Step 3 of Search m takes place with step 1 of Search m+2, step 2 of Search m+1, step 4 of Search m−1, and step 5 of Search m−2. Step 4 of Search m takes place with step 1 of Search m+3, step 2 of Search m+2, step 3 Search m+1, and step 5 of Search m−1. Step 5 of Search m takes place with step 1 of Search m+4, step 2 of Search m+3, step 3 of Search m+2, and step 4 of Search m+1. FIG. 32(*b*) shows the corresponding timing diagram. It is noted that if the first column is partitioned in k hierarchical blocks, a $B^{k-1}$ Register and (k−1) RAMs, $B^{k-2}$ RAM to $B^0$ RAM, then the serial Search procedure consists of k+2 steps, and a (k+2)-step pipelined procedure is used to maintain a high throughput.

3.2.2.1.3 First Column Registers

The search algorithms mentioned above are based on the assumption that the access to the first rows entries in the $B^1$ RAM and $B^0$ RAM, and to the first column entries in the FC-RAM can be performed in one step (or in a single clock). Since the RAM structure enables the access to a single RAM word (or a single row) in a single clock cycle, a First Column Register is used to allow a simultaneous access to the FC-RAM first column keys in a single clock (in step 1 of the Serial Five-Step Search Algorithm). This register is identical for Binary CAMs and RCAMs. It incorporates the first column keys and is kept updated as shown in FIG. 10.

The loading of the First Column Register keys is performed during the Key Insert or Key Remove operations. During the Insert operation, the keys are loaded and serially shifted bottom-up from the $D_B$ input. During the Remove operation, the keys are loaded and serially shifted top-down from the $D_T$ input.

3.2.2.1.4 Search Column Locators

The search algorithms for Binary CAMs and RCAMs require three Column Locators, each with A comparators (refer to FIG. 23), for the location of the key entry in the $B^2$ Register (in step 1 of the Serial Five-Step Search Algorithm), and the location of the key entries in the identified rows in $B^1$ RAM (step 2) and $B^0$ RAM (step 3). They also require one Column Locator with G comparators (refer to FIG. 22) for the location of the key entry in the identified row in the FC-RAM (step 4), and G Column Locators, each with M comparators, for the location of the key entry in the identified row in each of the specific G RAMs.

The Column Locators for the $B^2$ Register, $B^1$ RAM, $B^0$ RAM and FC-RAM are identical for Binary CAMs and RCAMs. In both, they search for a key that is larger than or equal to the key $K_{0,j}$ and is smaller than the next key $K_{0,j+1}$. The Column Locators for the G RAMs are different for Binary CAMs and RCAMs. In Binary CAMs, the Column Locators search for a key entry that exactly matches the submitted key, whereas in RCAMs they search for a key entry which represents the lower boundary of the range that contains the submitted key.

3.2.2.2 Keeping the Key List in Order—Insert and Remove Operations

The insertion or removal of keys demands constant updating of the G RAMs, the FC-RAM and the hierarchical blocks $B^2$ Register, $B^1$ RAM and $B^0$ RAM, to keep them in order. The straightforward way to update the keys is by applying a serial and lengthy algorithm that requires sequential readout and update of all the entries of the G RAMs.

3.2.2.2.1 Preliminary Search for the Insert and Remove Operations

Prior to the key insertion/removal, a Search procedure determines the position where the submitted Key $K_E$ is to be inserted or removed in one of the G RAMs, provided that these operations are allowed. Key insertion is allowed only if the key is not included in any RAM, whereas key removal is possible only if it is already included in one of the G RAMs. The preliminary Search procedure is identical for Binary CAMs and RCAMs; it is similar to the Serial Five-Step Search procedure (Section 3.2.2.2.2), which determines the validity of the identified range and associated data in RCAMs, but in this case it determines the index of the key to be inserted or removed, provided that these operations are allowed. The methods for locating the position index of the key for insertion or removal are described hereinabove in Sections 2.2.2.1.1 and 2.2.2.1.2, respectively.

3.2.2.2.2 Insert and Remove Supporting Structures

The surrounding hardware that supports the Key insertion and removal is identical for Binary CAMs and RCAMs.

An implementation of the Multiple-Hierarchy Multiple-RAM CAMs includes the surrounding hardware used in the second implementation of the Single-Hierarchy Multiple-RAM CAMs (Section 3.2.1.2.2). This includes one FC-RAM and G Inserter/Removers for all the RAMs of the G-RAM. Each Inserter/Remover consists of M b-bit registers $d_0, d_1, d_2, \ldots, d_{M-2}, d_{M-1}$. Only one leftmost register $d_E$ is required, which can be integrated in the leftmost Inserter/Remover as shown in FIG. 14. A description of the Insert and Remove supporting structures is provided hereinabove in Section 2.2.2.2.

A Read/Write Register without shifting capabilities can be used for updating the FC-RAM as the first columns of the RAMs in the G-RAM undergo changes.

3.2.2.2.3 Insert Operation

The Insert operation for a Multiple-Hierarchy Multiple-RAM is identical for Binary CAMs and RCAMs. This Insert operation includes the insertion of the submitted key $K_E$ in one of the G RAMs and performance of the required changes in the FC-RAM as in the Single-Hierarchy Multiple-RAM (refer to the second implementation mentioned in Section 3.2.1.2.3). The Insert operation for a Multiple-Hierarchy Multiple-RAM then proceeds with the performance of the corresponding changes in the three hierarchical blocks, $B^2$ Register, $B^1$ RAM and $B^0$ RAM.

The Insert operation for the Single-Hierarchy Multiple-RAM is exemplified by the insertion of the key 56 in the second RAM of a G-RAM consisting of two 5×4 RAMs, described in Section 3.2.1.2.3 and shown in FIG. 29.

The FC-RAM and the three hierarchical blocks, $B^2$ Register, $B^1$ RAM and $B^0$ RAM, can be updated by means of Read/Write Registers (not shown) that do not require shifting capabilities. As shown in FIG. 29, the FC-RAM is updated after each Write from the Inserter/Removers into the RAMs of the G-RAM. The three hierarchical blocks can be updated simultaneously with the FC-RAM.

In general, if a key $K_E$ is inserted in the G-RAM, all the FC-RAM first column entries $K_{0,J}$ (with row indices J) that are larger than $K_E$ ($K_{0,J} > K_E$) will change as a result of the forward shift of all the G-RAM entries that are larger than $K_E$. Then, among the changing FC-RAM first column entries, all those with indices that are multiples of $B^2$ ($J = mB^2$, $0 \leq m \leq A-1$) will also change in the $B^2$ Register. Similarly all the changing entries with indices that are multiples of B (except the multiples of $B^2$ stored in the $B^2$ Register) ($J = nB$, $0 \leq n \leq AB-1$, $n \neq mB$) will also change in the $B^1$ RAM. All the changing entries that are not multiples of B will also change in the $B^0$ RAM. Table 2 indicates which of these blocks may change if the FC-RAM changes and must be updated (Yes or No) with the last FC-RAM update.

Figure 33:
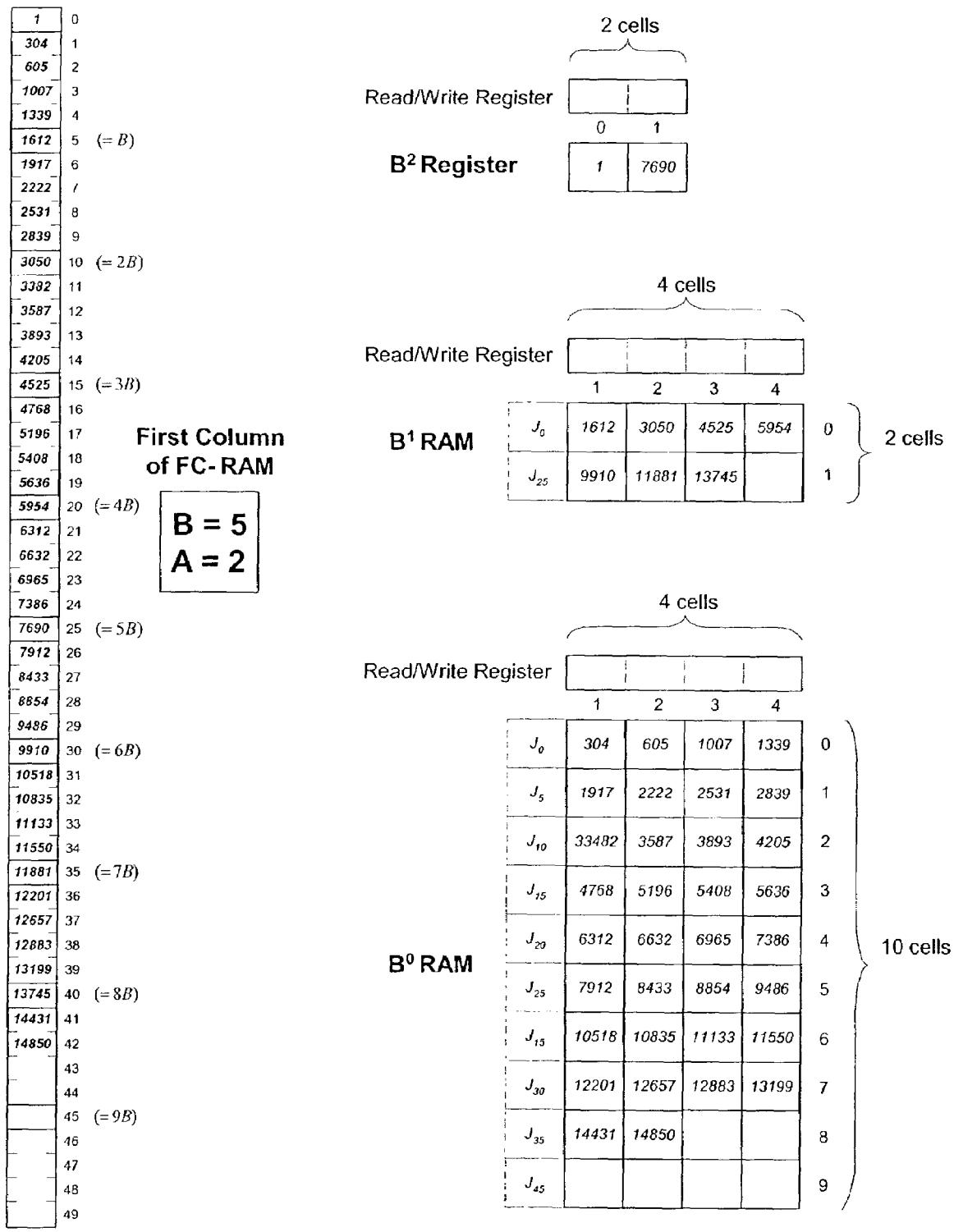
FIG. 33 is an exemplary schematic illustration of an FC-RAM having a 50-key first column partitioned in three hierarchical blocks, according to base 5.

Table 3 indicates which blocks must be updated with the first column of a specific FC-RAM shown as an example in FIG. 33.

If the number 5000 is inserted in the G-RAM (assuming that it is not already listed), then all the FC-RAM first column entries that are larger than 5000 (with index 16) will change. The entry with index 30 will also change in the $B^2$ Register. The entries with indices 20, 30, 35 and 40 will also change in the $B^1$ RAM. The entries with indices 17–19, 21–24, 26–29, 31–34, 36–39, 41–44, and 46–49, will also change in the $B^0$ RAM.

TABLE 2

Mapping of Potentially Required Key Changes in the Three Hierarchical Blocks

| Row Indices of the FC-RAM First Column Keys | Required Key Changes | | |
|---|---|---|---|
| | $B^2$ | $B^1$ | $B^0$ |
| All row indices of the form $J = mB^2$, $0 \leq m \leq A-1$ | Yes | No | No |
| All row indices of the form $J = nB$, $0 \leq n \leq AB-1$, for $n \neq mB$ | No | Yes | No |
| All row indices that are not multiples of B | No | No | Yes |

TABLE 3

List of Potentially Required Key Changes in the Three Hierarchical Blocks in a Specific Example

| Row Indices of the FC-RAM First Column Keys | Required Key Changes | | |
|---|---|---|---|
| | $B^2$ | $B^1$ | $B^0$ |
| 0 | Yes | No | No |
| 1–4 | No | No | Yes |
| 5 | No | Yes | No |
| 6–9 | No | No | Yes |
| 10 | No | Yes | No |
| 11–14 | No | No | Yes |
| 15 | No | Yes | No |
| 16–19 | No | No | Yes |
| 20 | No | Yes | No |
| 21–24 | No | No | Yes |
| 25 | Yes | No | No |
| 26–29 | No | No | Yes |
| 30 | No | Yes | No |
| 31–34 | No | No | Yes |
| 35 | No | Yes | No |
| 36–39 | No | No | Yes |
| 40 | No | Yes | No |
| 41–44 | No | No | Yes |
| 45 | No | Yes | No |
| 46–49 | No | No | Yes |

3.2.2.2.4 Remove Operation

The Remove operation for a Multiple-Hierarchy Multiple-RAM is identical for Binary CAMs and RCAMs. The Remove operation includes the removal of the submitted key from one of the G RAMs and performance of the required changes in the FC-RAM as in the Single-Hierarchy Multiple-RAM (refer to the second implementation mentioned in Section 3.2.1.2.4). The Remove operation then proceeds with the performance of the corresponding changes in the three hierarchical blocks, $B^2$ Register, $B^1$ RAM and $B^0$ RAM.

The Remove operation for the Single-Hierarchy Multiple-RAM is exemplified by the removal of the key 58 from the second RAM of a G-RAM consisting of two 5×4 RAMs, described in Section 3.2.1.2.4 and shown in FIG. 31.

The FC-RAM and the three hierarchical blocks, $B^2$ Register, $B^1$ RAM and $B^0$ RAM, can be updated by means of Read/Write Registers (not shown) that do not require shifting capabilities. As shown in FIG. 31, the FC-RAM is updated after each Write from the Inserter/Removers into the RAMs of the G-RAM. The three hierarchical blocks can be updated simultaneously with the FC-RAM.

Similarly to the Insert procedure, if a key $K_E$ is removed from the G-RAM, all the FC-RAM first column entries $K_{0,J}$ (with row indices J) that are larger than $K_E$ ($K_{0,J}>K_E$) will change as a result of the backward shift of all the G-RAM entries that are larger than $K_E$. Then, among the changing FC-RAM first column entries, all those with indices that are multiples of $B^2$ (J=mB, $0 \leq m \leq A-1$) will also change in the $B^2$ Register. Similarly, all the changing entries with indices that are multiples of B, except the multiples of $B^2$ stored in the $B^2$ Register (J=nB, $0 \leq n \leq AB-1$, n≠mB), will also change in the $B^1$ RAM. All the changing entries that are not multiples of B will also change in the $B^0$ RAM. Table 2 indicates which of these blocks may change if the FC-RAM changes and must be updated (Yes or No) with the last FC-RAM update.

Table 3 indicates which blocks must be updated with the first column of a specific FC-RAM shown as an example in FIG. 33. If the number 5000 is removed from the G-RAM (assuming that it is already listed), then all the FC-RAM first column entries that are larger than 5000 (with index 16) will change. The entry with index 30 will also change in the $B^2$ Register. The entries with indices 20, 30, 35 and 40 will also change in the $B^1$ RAM. The entries with indices 17–19, 21–24, 26–29, 31–34, 36–39, 41–44, and 46–49, will also change in the $B^0$ RAM.

3.2.2.2.5 Insert and Remove Operations in the G-RAM for the Associated Data and Associated Boundary Type The indices of the G-RAM for the Associated Data entries and Associated Boundary Type entries (for RCAMs only) must remain in correspondence with the key entry index. The Insert and Remove operations in the G-RAM are accompanied by corresponding and simultaneous Insert and Remove operations in the Associated Data G-RAM for Binary CAMs and RCAMs. Additional corresponding Insert and Remove operations take place in the Associated Boundary Type G-RAM for RCAMs only. Similarly, the disruption in the insertion or removal of key entries for a search of submitted keys is accompanied by corresponding disruptions in the insertion or removal of Associated Data and Boundary Type entries.

3.2.2.2.6 Disruption of an Insert or Remove Operation to Perform a Search Operation A disruption in the Insert or Remove operation in a G-RAM of a Multiple-Hierarchy Multiple-RAM to perform a Search operation is identical to that in the Single-Hierarchy Multiple-RAM, described in Section 3.2.1.2.5.

When a key is submitted for search, the Insert or Remove operation in-execution is disrupted only after the contents of the Inserter/Removers are written to the Extended Paused Row; then, is resumed by reading the succeeding extended row (for insertion) or the preceding extended row (for removal). During this disruption, the update of the FC-RAM and of the hierarchical blocks $B^2$ Register, $B^1$ RAM and $B^0$ RAM is simultaneously discontinued until the Search operation is completed and the Insert or Remove operation in the G-RAM is resumed.

4. Non-Contiguous Multiple-RAM Binary CAM and RCAM 4.1 Multiple-RAM Architecture 4.1.1 Single-Hierarchy Architecture The Non-Contiguous Multiple-RAM Binary CAM or RCAM, as the contiguous Multiple-RAM Binary CAM or RCAM covered in Section 3, includes an ordered group of RAMs, where g denotes the serial number of each particular RAM and G denotes the total number, such that $0 \leq g \leq G-1$. This group is regarded as an extended RAM and denoted as G-RAM.

Figure 34:
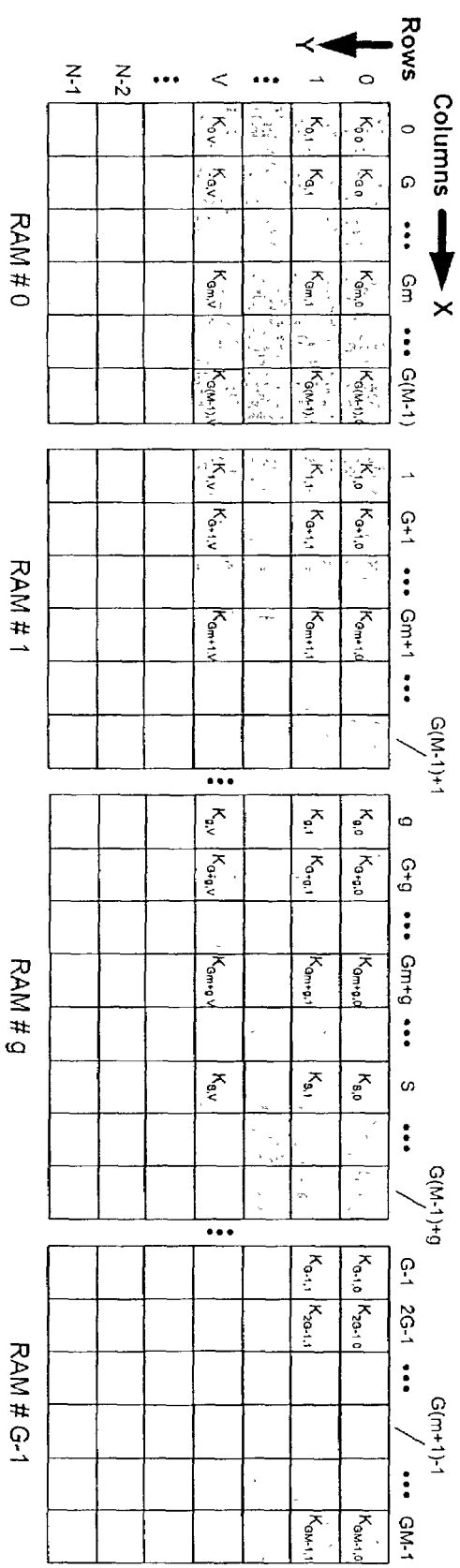
FIG. 34 is a schematic illustration of a G-RAM having RAMs with integrated key indexing, and having key entries stored in ascending order in non-contiguous cells, according to a preferred embodiment of the present invention.

The basic concept underlying the approach of the Non-Contiguous G-RAM is keeping the list of key entries of the G-RAM in an orderly fashion. The key entries are stored in such a way that:

The RAMs composing the G-RAM may be lined in a row along the X-axis, as shown in FIG. 34, where the key entries are arranged in a G-RAM with N rows and G·M columns. The key entries may be located in ascending or descending order in non-contiguous RAM cells, in the G·M key entries of the extended rows. The key entries fill up each extended row before starting with the next. In each extended row, the key entries are stored one per RAM, in groups of G key entries in G corresponding cells of the G RAMs. The occupied key entry locations are shadowed with light gray. The empty locations are blank.

In a similar way, the RAMs composing the G-RAM may be lined in a column along the Y-axis. In this case, the key entries will be arranged in a G-RAM with G·N rows and M columns. The key entries may be located in ascending or descending order in non-contiguous RAM cells in the G·N key entries of the "extended columns".

The block of occupied locations may either start at the first extended memory address or end in the last extended memory array address.

The empty locations in the extended memory array are contiguous, and may either follow or precede the occupied locations, with a uniquely defined transition point between the last occupied location and the first empty location, or vice versa.

Although the Non-Contiguous Multiple-RAM Binary CAM or RCAM may be implemented using any of the alternatives described above, we shall limit our discussion to the following cases:

The RAMs composing the G-RAM are lined in a row along the X-axis. The key entries are stored in ascending order in non-contiguous RAM cells along the extended rows of a G-RAM.

The key list starts at the lowest extended memory array address.

The empty locations block follows the key list.

FIG. 34 depicts the extended RAM or G-RAM composed of G·M columns by N rows with integrated key indexing. The extended rows are sequenced from top to bottom and indexed with an integer J, where $0 \leq J \leq N-1$. The cell columns are sequenced from left to right and indexed with an integer I, where $0 \leq I \leq G \cdot M-1$. The G-RAM cells, denoted as $C_{I,J}$ (not shown in the figure), are indexed (I,J) and ordered according to their location in the G-RAM. The key entries, denoted as $K_{L,J}$, are indexed (L,J) according to their values, are stored in ascending order from left to right but in non-contiguous cells, so there is no direct correspondence between the key entry value and its location in the G-RAM; the column index L of a key entry $K_{L,J}$, determined by the key value, is different than the column index I of the array cell $C_{I,J}$ determined by the cell location.

The key entries $K_{L,J}$ are stored as follows: The first key entry (lowest value) $K_{0,0}$ is stored in the first cell (0,0) of the first RAM (RAM # 0), the second key $K_{1,0}$ entry is stored in the first cell (0,0) of the second RAM (RAM # 1), up to the G-th key entry $K_{G-1,0}$, which is stored in the first cell (0,0)

of the last RAM (RAM # G−1). The next G key entries are stored in the second cells (1,0) of the first rows of the G RAMs. This process continues until the last cells (M−1,0) of the first rows of the RAMs are filled. Then, this process is repeated for the other rows of the RAMs until all the key entries are stored in the G-RAM.

The key entries can be seen as grouped in sets of G key entries stored in fixed steps of M cells, each key entry in a different RAM. The first set (labeled 0) is stored in the cells indexed (0,0) of the G RAMs, the second set (labeled 1) of G key entries are stored in the cells indexed (1,0), up to the M-th set (labeled M−1) stored in the cells indexed (M−1,0), to fill the first row. A generic set i (0≦i≦M−1) is stored in the cells indexed (i,0) of the first row.

In terms of extended rows of the G-RAM, the first set of G key entries is stored in cells (g·M,0) of the first extended row, where 0≦g≦G−1. Then, after a shift back of [(G−1)·M−1] cells, the second set is stored in cells (g·M+1,0), and the last G key entries are stored in cells (g·M+M−1,0). After the first extended row is filled, the storing process continues in the next extended row, until all the key entries are stored.

The index pair (I,J) of a cell $C_{I,J}$ arranged in contiguous ascending order in the G-RAM, is related to the corresponding cell index pair (i,j) of a generic RAM # g (0≦i≦M−1, 0≦j≦N−1) as follows:

$$I=i+g \cdot M (0 \leq g \leq G-1)$$

$$J=j$$

The index pair (L,J) of a key entry $K_{L,J}$ stored in the G-RAM according to its ascending value in non-contiguous cells is related to the column index i of a generic RAM # g as follows:

$$L=g+i \cdot G (0 \leq g \leq G-1)$$

$$J=j$$

The highest key value $K_{S,V}$ resides in row V and column S. If this key is located in the cell (u,v) of RAM # W, then:

$$S=W+u \cdot G$$

$$V=v$$

The formulas above for I and L in terms of i can be manipulated to show that a key entry with column index L is stored in a cell with column index I given by:

$$I=\text{Int}\{[L+g \cdot (G \cdot M-1)]/G\}$$

where 0≦g≦G−1

The Multiple-RAM Binary CAM contains two extended RAMs or G-RAMs, Key G-RAM and Associated Data G-RAM. Each key entry $K_{L,J}$ of the Key G-RAM has a corresponding Associated Data entry $D_{L,J}$ in the Associated Data G-RAM. Since the Binary CAM stores a list of single integer keys, a key search in results in an exact match and a straightforward access to the corresponding associated data.

The Multiple-RAM RCAM includes additionally an Associated Boundary Type G-RAM, where each Associated Boundary Type entry $M_{L,J}$ corresponds to the key entry $K_{L,J}$. The RCAM stores a list of key entries that represent range boundaries, so that a key search results in a matching range, and the retrieval of the associated data and boundary type that corresponds uniquely to this range. The associated boundary type determines the validity of the matching range and the associated data.

The entries of the Key G-RAM, Associated Data G-RAM and Associated Boundary Type G-RAM (for an RCAM) are always kept in a compact and sequential form, and perfect correspondence, by means of consistent Insert and Remove algorithms.

A key search in the G-RAM starts with a search in RAM # 0, using one Search Row Locator and one Column Locator, to locate the largest key entry that is smaller than (or equal to) the submitted key; this points to a specific key entry in RAM # 0. Then, the submitted key is sequentially searched in this specific key entry of each RAM in the G-RAM, to find an exact match (for a Binary CAM) or a range match (for an RCAM); this requires an additional set of G−1 Search Column Locators for the other individual RAMs.

A key insertion or removal in the G-RAM starts with a search in RAM # 0, to locate the largest key entry that is smaller than (or equal to) the submitted key; this points to a specific key entry in RAM # 0. Then, the submitted key is sequentially searched in this specific key entry of each RAM in the G-RAM, to determine whether the key exactly matches a key entry. In the case of an exact match, the submitted key can be removed but not inserted; otherwise, the submitted key can be inserted after the largest key entry that is smaller than this key. A key insertion or removal requires a set of G Inserter/Removers for the G individual RAMs; each of these devices consists of only M b-bit wide registers, because it does not require a leftmost register $d_E$. Only one such register is required, and can be integrated with the Inserter/Remover for RAM # 0, which then has M+1 registers.

4.1.2 Multiple-Hierarchy Architecture

In the Non-Contiguous Multiple-Hierarchy design, the first column of RAM # 0 is partitioned in hierarchical blocks according to a numerical system of base B, similarly to the partition of the FC-RAM first column in the contiguous Multiple-Hierarchy design shown in FIG. 24. Section 3.1.2 describes the partition of the FC-RAM and the resulting hierarchical blocks, $B^2$ Register, $B^1$ RAM and $B^0$ RAM, which can be similarly performed for RAM # 0. When the Non-Contiguous Multiple-Hierarchy design is implemented, the first column of RAM # 0 can be partitioned into three hierarchical blocks; this partition is similar to that of the first column of the FC-RAM for a generic base B, as shown in FIG. 24. It is noted that the entries shown in the $B^2$ Register, $B^1$ RAM and $B^0$ RAM in FIG. 23 and FIG. 24 are the row indices (J) of the first column entries of the FC-RAM (or of RAM # 0) and not their values $K_{0,J}$.

Similarly, the partition of the first column of RAM # 0 into the three hierarchical blocks for a specific base B=5 resembles the partition of the first column of the FC-RAM shown in FIG. 25. A more specific partition of the first column of RAM # 0 having 100 entries into the three hierarchical blocks for B=5 requires that A≧4, so A=4 is selected; this partition resembles that of the first column of the FC-RAM shown in FIG. 26.

In the Multiple-Hierarchy architecture shown in FIG. 24, the first column entries of the FC-RAM (or of RAM # 0) are stored in three hierarchical blocks, $B^2$ Register, $B^1$ RAM and $B^0$ RAM. In general, when the first column is larger, more hierarchies can be used. If the first column is partitioned into k hierarchical blocks: a $B^{k-1}$ Register and (k−1) RAMs, $B^{k-2}$ RAM to $B^0$ RAM, are used.

A key search in the G-RAM starts with a search in the hierarchical blocks, specifically in the highest-hierarchy $B^2$ Register, to locate the largest key entry that is smaller than (or equal to) the submitted key; this key entry points to a specific row in the $B^1$ RAM. Then, the submitted key is searched in the specific row of this RAM using a Column Locator, to locate the largest key entry that is smaller than (or equal to) the submitted key; this points to a specific row in the $B^0$ RAM. A similar search procedure is then performed in the $B^0$ RAM. The matching key entry in this RAM points to a specific row in the RAM # 0.

The search procedure in the specific row of RAM # 0 is identical to that described for the Non-Contiguous Single-Hierarchy architecture, where the matching key entry leads to a specific key entry in RAM # 0; then, the submitted key is sequentially searched in this specific key entry of each RAM in the G-RAM, to find an exact match (for a Binary CAM) or a range match (for an RCAM).

A key insertion or removal in the G-RAM starts with a search in the in the hierarchical blocks, following an identical procedure to that used for lookups, described above. This search points to a specific row in RAM # 0. The search in this row leads to a specific key entry in RAM # 0. Then, the search proceeds sequentially in this specific key entry of each RAM in the G-RAM, to determine whether the key exactly matches a key entry. In the case of an exact match, the submitted key can be removed but not inserted; otherwise, the submitted key can be inserted after the largest key entry that is smaller than this key.

A key insertion or removal in a Multiple-Hierarchy architecture requires, in addition to a set of G Inserter/Removers for the G individual RAMs (including RAM# 0) used in the Single-Hierarchy design, three Inserter/Removers for the three hierarchical blocks ($B^2$ Register, $B^1$ RAM and $B^0$ RAM). These Inserter/Removers do not require shifting capabilities.

4.2 Principles of Operation 4.2.1 Single-Hierarchy Architecture 4.2.1.1 Key Search 4.2.1.1.1 Serial Three-Step Search Algorithm A sequential search of the submitted key (Key Search) in a G-RAM can be completed in three steps:

Step 1: Identification of the row in RAM # 0 (FIG. 35) where the submitted key may be located. This step is identical for Binary CAMs and RCAMs.

Step 2: Access to the row in RAM # 0 identified in Step 1 and identification of the key entry after which the submitted key may be located; this points to a specific key entry in RAM # 0. This step is identical for Binary CAMs and RCAMs.

Step 3: Sequential access to the specific key entry of each RAM in the G-RAM corresponding to the specific key entry of RAM # 0 (identified in Step 2), and lookup of the submitted key to find an exact match (for a Binary CAM) or a range match (for an RCAM). This step is clearly different for Binary CAMs and RCAMs.

Prior to the Key Search in RAM # 0, the submitted key K is compared with the values in the first and last locations of this RAM. If $K<K_{0,0}$, then the search is over because the key is not included in the G-RAM. If $K>K_{Gu,V}$ (for exact match only), then the key is not included in RAM # 0, but the search must continue in the other individual RAMs, because the key may be included in the G-RAM as long as $K \leq K_{U,V}$. If $K>K_{U,V}$ (for exact match only), then the key is not included in the G-RAM and the search is over.

If $K_{0,0} \leq K \leq K_{Gu,V}$, then search procedure can start with Step 1:

Step 1: This step is performed to locate the row J in RAM # 0 (FIG. 35) that may contain the submitted key by searching through the first column key entries. If the submitted key is contained in this RAM, it must be located between two keys in the first column, one smaller or equal and the other larger than the searched key; that is:

$K_{0,J} \leq K < K_{0,J+1}$ for $J<G \cdot u$ or $K_{0,J} \leq K \leq K_{Gu,V}$ for $J=G \cdot u$ Step 2: This step is performed to locate the key entry in row J in RAM # 0 (determined in step 1) that may match the submitted key. The entire J-th row is read out and all the key entries listed in the row are compared with the searched key.

If $K_{I,J} \leq K < K_{I+1,J}$, then $K \geq K_{i,J}$ for $i \leq I$ $K<K_{i,J}$ for $I<i \leq M-1$ if $J<G \cdot u$ and for $I<i \leq G \cdot u$ if $J=G \cdot u$ If the submitted key is larger than or equals the key $K_{I,J}$, and is smaller than the next key $K_{I+1,J}$, then $K_{I,J}$ listed in row J and column I matches the searched range defined by $K_{I,J} \leq K < K_{I+1,J}$.

If the submitted key is larger than all the row entries in RAM # 0, then the last key entry in the row is the matching key; this points to a specific key entry in RAM # 0.

Step 3: This step is performed to locate the specific key entry of a particular RAM # g corresponding to the specific key entry of RAM # 0 (identified in Step 2) that may match the submitted key. The submitted key is sequentially compared with this specific key entry of each RAM in the G-RAM to find an exact match (for a Binary CAM) or a range match (for an RCAM).

In Binary CAMs, the submitted key is sequentially compared with the specific key entry of each RAM # g corresponding to the specific key entry $K_{I,J}$ of RAM # 0 (identified in Step 2) in search for an Exact Match (identical values). The specific key entries $K_{L,J}$ of all the RAMs are compared with the submitted key K. If there is a specific key entry $K_{L,J}$ such that, $K=K_{L,J}$ where $L=g+I \cdot G$ $(0 \leq g \leq G-1)$, then this key entry matches the searched key. In this case, the specific index pair (L,J) is used to access the entry $D_{L,J}$ located in RAM # g of the Associated Data under the same index; $D_{L,J}$ is readout along with a Match signal M="1" that indicates the validity of the retrieved associated data.

If $K \neq K_{L,J}$ $(L=g+1 \cdot G)$ for $0 \leq g \leq G-1$, then there is No Match. In this case, the CAM issues a No-Match signal M="0" to indicate the invalidity of the associated data issued on the Data Bus.

In RCAMs, the submitted key is sequentially compared with the specific key entry of each RAM # g corresponding to the specific key entry $K_{I,J}$ of RAM # 0 (identified in Step 2) in search for a Range Match (inclusion within the range). The submitted key K is compared with the specific key entries $K_{L,J}$ and the subsequent key entries $K_{L+1,J}$ of all the RAMs. If there is a specific key entry $K_{L,J}$ such that, $$K_{L,J} \leq K_{L+1,J}$$

where $L=g+I \cdot G (0 \leq g \leq G-1)$, then the specific key entry $K_{L,J}$ of the particular RAM # g matches the searched range. If the submitted key is larger than all the key entries in a given row of the particular RAM # g, then the last valid key entry in this row is defined as the matching key. The index pair (L,J) of the matching key is used to access the associated data entry $D_{L,J}$ corresponding to $K_{L,J}$ (and to the matching range) located in RAM # g of the Associated Data List. The index pair (L,J) is also used to access the associated boundary type entry $M_{L,J}$ located in RAM # g of the Associated Boundary Type List; $M_{L,J}$ is a 1-bit number that determines the validity of the range:

$M_{L,J}$="1" corresponds to a Closed Boundary and designates a valid range, and $M_{L,J}$="0" corresponds to an Open Boundary and indicates that the range is not valid.

Example of Range Search Operation:

An example of a Three-Step Exact or Range Search of the submitted key 120 in a G- with four 4×4 RAMs, is shown below in reference to FIG. 36. The figure shows the indexed key entries of the G-RAM and their values. The occupied key entry locations are shadowed with light gray. The empty locations are blank.

Step 1: Identification of the row in RAM # 0 (FIG. 36) that may contain the submitted key 120.

$$81 \leq 120 < 125$$

$$K_{0,2} \leq K < K_{0,3}$$

The comparison of the submitted key with the key entries in the first column of RAM # 0 points to row 2.

Step 2: Identification of the key entry in row 2 of RAM # 0 (determined in step 1) that may match the submitted key 120.

$$115 \leq 120$$

$$K_{12,2} \leq K$$

The comparison the submitted key with the key entries in the first column of RAM # 0 points to the key entry $K_{12,2}$.

Step 3: Identification of the specific key entry of the particular RAM # g corresponding to the specific key entry $K_{12,2}$ of RAM # 0 (identified in Step 2) that may match the submitted key 120.

If the G-RAM is part of a Binary CAM, the submitted key is compared with the key entries $K_{13,2}$ in RAM # 1, $K_{13,2}$ in RAM # 2 and $K_{12,2}$ in RAM # 2 searching for an Exact Match. Since $$119 < 120 < 123,$$

there is no Exact Match. In this case, the CAM issues a No-Match signal M="0" to indicate the invalidity of the associated data.

If the G-RAM is part of an RCAM, the submitted key is compared with the same key entries as in a Binary CAM, but in this case, a search is made for a Range Match. Since $119 \leq 120 < 123$, i.e., $$K_{14,2} \leq K < K_{15,2},$$

the range matching key is $K_{14,2}$=119.

The index pair (14,2) of the matching key is used to access the associated data entry $D_{14,2}$ that corresponds to $K_{14,2}$ (and to the matching range) located in RAM # 2 of the Associated Data List, and to the associated boundary type entry $M_{14,2}$ located in RAM # 2 of the Associated Boundary Type List.

In this case, $M_{14,2}$="1" corresponds to a Closed Boundary and designates a valid range.

4.2.1.1.2 Pipelined Three-Step Search Algorithm

The timing diagrams in FIG. 27 illustrate the difference between the three-step serial and pipelined search algorithms for the Non-Contiguous Multiple-RAM Single-Hierarchy Binary CAM or RCAM. In both modes, it is assumed that:

Each step of the three-step search cycle requires one RAM clock period for execution, denoted by T. Thus, each search cycle lasts 3T.

The Search operation starts with a search cycle for submitted Key 1, denoted as Search 1, which starts with a at t=0. Thus, step 1 of Search 1 (row identification in RAM # 0) is completed at t=T, step 2 (location of specific key entry in the identified row in RAM # 0) at t=2T, and step 3 (sequential search of the key entry of each RAM # g corresponding to the located key entry of RAM # 0 that may match the submitted key) and at t=3T.

Search $m_1$, Search $m_2$ and Search $m_3$ represent steps 1, 2 and 3, respectively, of a generic Search m for submitted Key m.

The timing diagrams shown in FIG. 27 are identical for the Contiguous and Non-Contiguous Multiple-RAM Single-Hierarchy Binary CAM or RCAM, even though the individual steps of the search algorithms are different.

4.2.1.1.3 First Column Register

The search algorithms mentioned above are based on the assumption that the access to the first column entries in RAM # 0 can be performed in one step (or in a single clock). Since the RAM structure enables the access to a single RAM word (or a single RAM row) in a single clock cycle, a First Column Register is used to allow a simultaneous access to the RAM first column keys in a single clock (in step 1 of the Serial Three-Step Search Algorithm). This register is identical for Binary CAMs and RCAMs. It incorporates the first column keys and is kept updated as shown in FIG. 10.

The loading of the First Column Register keys is performed during the Key Insert or Key Remove operations. During the Insert operation, the keys are loaded and serially shifted bottom-up from the $D_B$ input. During the Remove operation, the keys are loaded and serially shifted top-down from the $D_T$ input.

The search algorithms also require a Row Locator for the row identification in RAM # 0 (in step 1 of the Serial Three-Step Search Algorithm), a Column Locator for the location of the specific key entry in the identified row (in step 2), and additional G−1 Column Locators for the location of the specific key entries of the other RAMs (# 1 to # G−1) corresponding to the specific key entry of RAM # 0 (in step 3).

The Row Locator is identical for Binary CAMs and RCAMs.

The Column Locator is different for Binary CAMs and RCAMs. In Binary CAMs, the Column Locator it searches for a key entry that exactly matches the submitted key, whereas in RCAMs it searches for a key entry which represents the lower boundary of the range that contains the submitted key.

4.2.1.2 Keeping the Key List in Order—Insert and Remove Operations

The insertion or removal of keys demands constant updating of the G RAMs to keep them in order. The straightforward way to update the keys is by applying a serial and lengthy algorithm on the G RAMs; this requires sequential readout and update of all the their entries.

4.2.1.2.1 Preliminary Search for the Insert and Remove Operations

Prior to the key insertion/removal, a Search procedure determines the position where the submitted Key $K_E$ is to be inserted or removed in one of the G RAMs, provided that these operations are allowed. Key insertion is allowed only if the key is not included in any RAM, whereas key removal is possible only if it is already included in one of the G RAMs. The preliminary Search procedure is identical for Binary CAMs and RCAMs; it is similar to the Serial Three-Step Search procedure (Section 4.2.1.1.1) that determines the validity of the identified range and associated data in RCAMs, but in this case it determines the index of the key to be inserted or removed (provided that these operations are allowed). The Search algorithm used to locate the position where the submitted key has to be inserted or removed in a TDA is described in co-pending, unpublished PCT Patent Application Serial No. IL01/01025. This algorithm is similar to the Search algorithm that determines the validity of the identified range and associated data in RCAMs, but in this case it determines the index of the key to be inserted or removed, provided that these operations are allowed.

4.2.1.2.1.1 Locating the Position Index of the New Key for Insertion

Since all the inserted keys are different, the following cases may occur:

Case 1: $K_E < K_{0,0}$

In this case, the new key is inserted right at the beginning of the list. All the other list entries are shifted one location forward.

Case 2: $K_E > K_{S,V}$

In this case, the new key is simply appended at the end of the list.

Case 3: $K_{GM-1,J-1} < K_E < K_{0,J}$

In this case, the new key is inserted just in the beginning of the extended row J.

Case 4: $K_{0,J} < K_E < K_{GM-1,J}$

In this case, the key is inserted in the extended row J.

The requirements for locating the row and column for key insertion are similar to those for locating the row and column during Range Key Search; therefore, the Insert Row Locator is similar to the Search Row Locator shown in FIG. 11 and the Insert Column Locator is similar to the Range Search Column Locator shown in FIG. 13.

4.2.1.2.1.2 Locating the Position Index of the Key for Removal

The requirements for locating the row and column for key removal are similar to those for locating the row and column during Exact Key Search; thus, the Remove Row Locator is similar to the Search Row Locator shown in FIG. 11, and the Remove Column Locator is similar to the Exact Search Column Locator shown in FIG. 12.

4.2.1.2.2 Insert and Remove Supporting Structures

The surrounding hardware that supports the Key insertion and removal is identical for Binary CAMs and RCAMs. It includes one First Column Register and G Inserter/Removers for all the RAMs of the G-RAM. Each Inserter/Remover consists of M b-bit registers $d_0, d_1, d_2, \ldots, d_{M-2}, d_{M-1}$. Only one leftmost register $d_E$ is required, which can be integrated in the leftmost Inserter/Remover (corresponding to RAM # 0) as shown in FIG. 14. Descriptions of the Insert and Remove supporting structures are provided in Section 2.2.2.2.

4.2.1.2.3 Insert Operation

The Insert operation is identical for Binary CAMs and RCAMs. This operation is exemplified by the insertion of the key 56 in the second RAM of a G-RAM consisting of two 5×4 RAMs.

Figure 37:
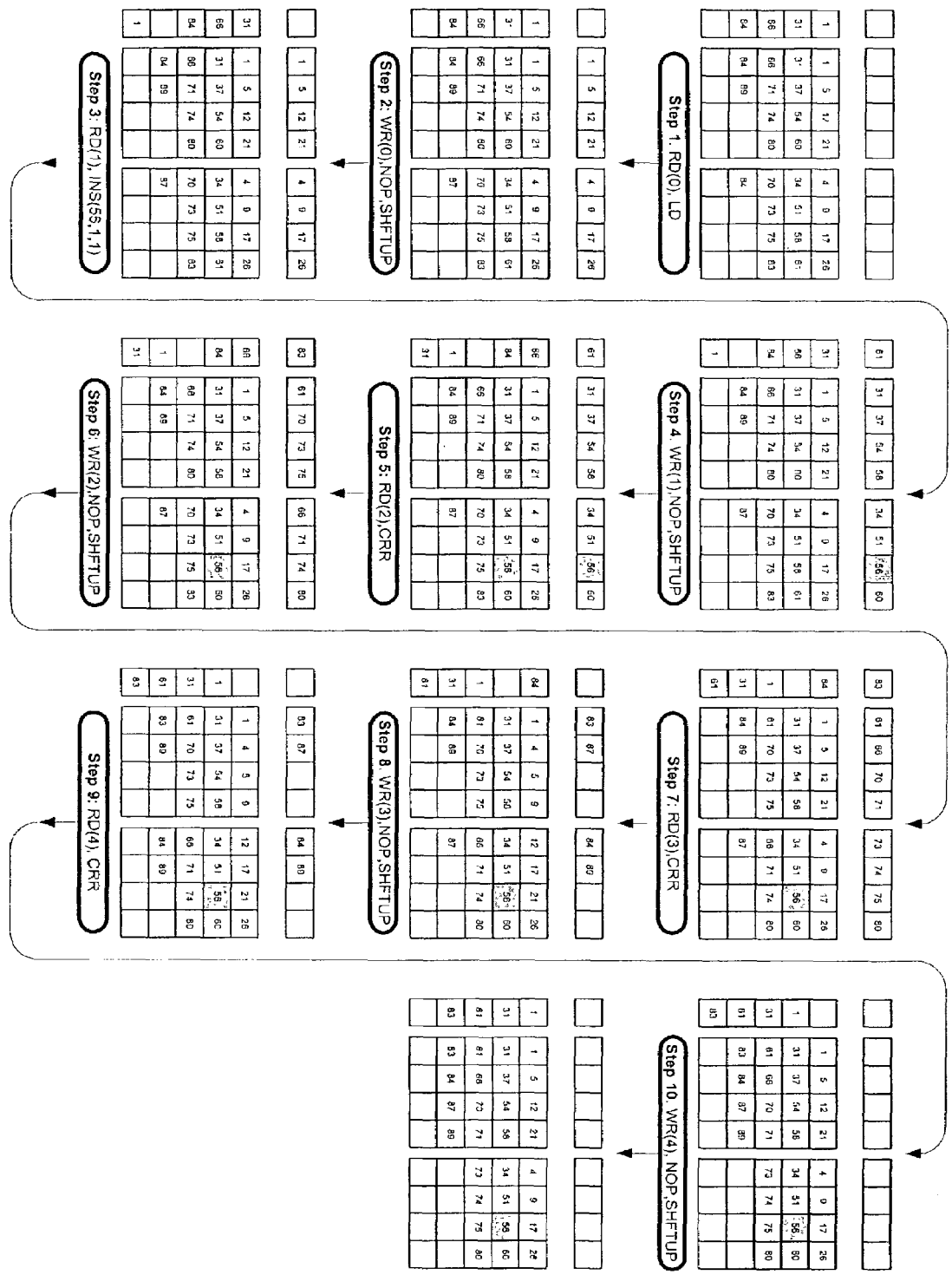
FIG. 37 is an exemplary, schematic illustration of a G-RAM having two 5×4 RAMs and a first column register, in which the number 56 is inserted into the second RAM, according to another embodiment of the present invention.

FIG. 37 shows one implementation of the Insert operation, with the G-RAM, one First Column Register and two Inserter/Removers after each step. The initial state of the G-RAM is depicted in the upper leftmost corner of FIG. 37. Each step consists of concurrent actions performed on a single G-RAM row in conjunction with the two Inserter/Removers. This Insert procedure is similar to the insertion of the key 56 in a contiguous G-RAM with two 5×4 RAMs described in Section 3.2.1.2.3 and shown in FIG. 28. The difference lies in the INS($K_E$,RAM#,POS) (Insert) and CRR (Circulate to the Right) operations that involve a circular shift forward in the positions of all the keys in the row. Right-shifting is performed in fixed steps of M cells, each key entry being shifted to a different RAM. After a key entry is shifted to the last RAM (RAM # G−1), the next key entry (except the entry in the last column) is shifted back (to the left) in [(G−1)·M−1] cells to the next row in the first RAM (RAM # 0), to start a new chain of right shifts in steps of M cells. This right-shifting process is performed according to the following formula for the cell column index I in terms of the column index L of the key entry:

$$I = \text{Int}\{[L + g \cdot (G \cdot M - 1)]/G\}, \text{ where } 0 \leq g \leq G-1$$

Following the shift of a key entry to the last column in the last RAM (RAM # G−1), the next key entry is shifted back in G·M−1 cells to the beginning of the next row in the first RAM (RAM # 0), as in the contiguous G-RAM, to start a new chain of right shifts in steps of M cells.

4.2.1.2.4 Remove Operation

The Remove operation is identical for Binary CAMs and RCAMs. This operation is exemplified by the removal of the key 58 from the second RAM of a G-RAM consisting of two 5×4 RAMs.

Figure 38:
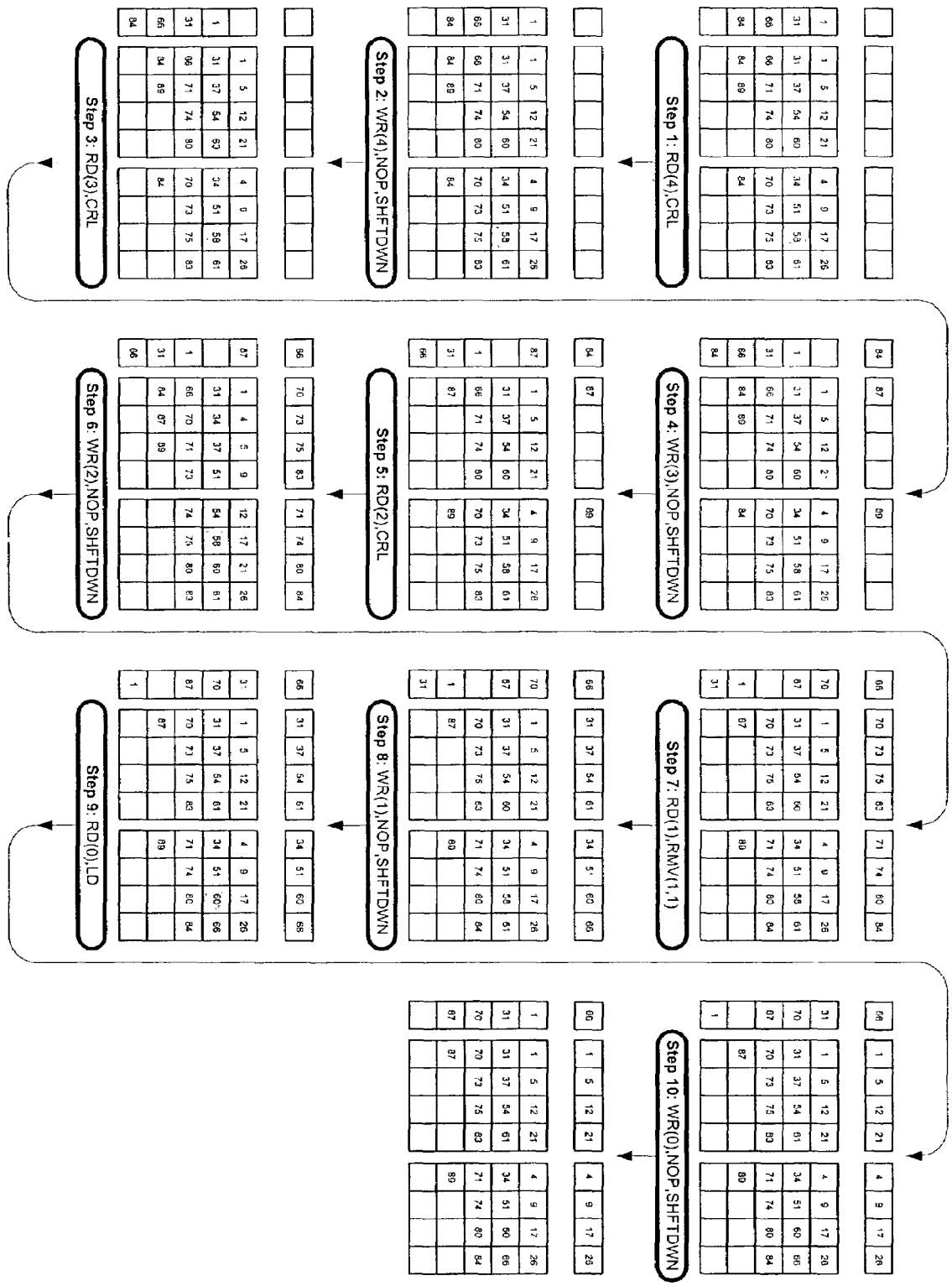
FIG. 38 is an exemplary, schematic illustration of a G-RAM having two 5×4 RAMs and a first column register, in which the number 58 is removed from the second RAM, according to another embodiment of the present invention.

FIG. 38 shows one implementation of the Remove operation, with the G-RAM, one First Column Register and two Inserter/Removers after each step. The initial state of the G-RAM is depicted in the upper leftmost corner of FIG. 38. Each step consists of concurrent actions performed on a single G-RAM row in conjunction with the two Inserter/Removers. This Remove procedure is similar to the removal of the key 58 from a contiguous G-RAM with two 5×4 RAMs described in Section 3.2.1.2.4. The difference lies in the RMV(RAM#,POS) (Remove) and CRL (Circulate to the Left) operations that involve a circular shift backward in the positions of all the keys in the row. Left-shifting is performed in fixed steps of M cells, each key entry being shifted to a different RAM. After a key entry is shifted to the first RAM (RAM # 0), the next key entry (except the entry in the first column) is shifted to the right in [(G−1)·M−1] cells to the to the preceding row in last RAM (RAM # G−1), to start a new chain of left shifts in steps of M cells. This left-shifting process is performed according to the same formula used for insertion (Section 4.2.1.2.3) for the cell column index I in terms of the column index L of the key entry. Following the shift of a key entry to the first column in the first RAM (RAM # 0), the next key entry is shifted to the right in G·M−1 cells to the end of the preceding row in the last RAM (RAM # G−1), as in the contiguous G-RAM, to start a new chain of left shifts in steps of M cells.

4.2.1.2.5 Disruption of an Insert or Remove Operation to Perform a Search Operation An Insert or Remove operation in a G-RAM is disrupted to perform a Search operation in a similar process to that performed in a contiguous G-RAM, described in Section 3.2.1.2.5. The main difference lies in the different Three-Step Search Algorithm (Section 4.2.1.1.1) used for the non-contiguous G-RAM.

4.2.1.2.6 Insert and Remove Operations in the G-RAM for the Associated Data and Associated Boundary Type The indices of the G-RAM for the Associated Data entries and Associated Boundary Type entries (for RCAMs only) must remain in correspondence with the key entry index. The Insert and Remove operations in the G-RAM are accompanied by corresponding and simultaneous Insert and Remove operations in the Associated Data G-RAM for Binary CAMs and RCAMs. Additional Insert and Remove operations take place in the Associated Boundary Type G-RAM for RCAMs only. Similarly, the disruption in the insertion or removal of key entries for a search of submitted keys is accompanied by corresponding disruptions in the insertion or removal of Associated Data and Boundary Type entries.

4.2.1.2.7 Bit-Mapped Update Operation (for RCAMs Only)

The Bit-Mapped Update Operation changes the Associated Data and Associated Boundary Type entries corresponding to a specified group of sequential keys in the Key G-RAM, without changing the number of keys in this G-RAM. This operation is generally necessary when an overlapping range is inserted in or removed from the G-RAM (see Section 1.6); it is performed sequentially in each RAM of the G-RAM.

When, for example, the key 56 is inserted in the second RAM of a G-RAM consisting of two 5×4 RAMs (FIG. 37), the associated boundary type and associated data entries corresponding to the sequential keys 56 and 57 must change to $m_{56}$ and $d_{56}$, respectively, instead of $m_{54}$ and $d_{54}$ (corresponding to the keys 54), and all the other keys in the same row do not change. This integrated change in the second row (number 1) is performed by a 4-bit long Bit-Mapped Update command consisting of 1's for the keys 56 and 57 and 0's for all the other keys in this row. Similar Bit-Mapped Update commands are applied in all the other rows of the second RAM corresponding to the changes required in each row.

Similarly, when the key 58 is removed from the second RAM of a G-RAM consisting of two 5×4 RAMs (FIG. 38), the associated boundary type and associated data entries corresponding to the sequential keys 58 and 59 must change to $m_{54}$ and $d_{54}$ (corresponding to the keys 54), respectively, instead of $m_{58}$ and $d_{58}$, whereas all the other keys in the same row remain unchanged. This change in the second row (number 1) is performed by a 4-bit long Bit-Mapped Update command consisting of 1's for the keys 58 and 59 and 0's for all the other keys in this row. Similar Bit-Mapped Update commands are applied in all the other rows of the second RAM corresponding to the changes required in each row.

4.2.2 Multiple-Hierarchy Architecture

4.2.2.1 Key Search

4.2.2.1.1 Serial Five-Step Search Algorithm

A sequential search of the submitted key (Key Search) in a G-RAM with three hierarchical blocks, $B^2$ Register, $B^1$ RAM and $B^0$ RAM can be completed in five steps; all these steps, except the last one, are identical for Binary CAMs and RCAMs.

Step 1: Identification of the key entry in $B^2$ Register after which the submitted key may be located; this key entry points to a specific row in the $B^1$ RAM.

Step 2: Access to the $B^1$ RAM row identified in Step 1 and identification of the key entry after which the submitted key may be located; this key entry points to a specific row in the $B^0$ RAM.

Step 3: Access to the $B^0$ RAM row identified in Step 2 and identification of the key entry after which the submitted key may be located; this key entry points to a specific row in the RAM # 0.

Step 4: Access to the row in RAM # 0 identified in Step 3 and identification of the specific key entry after which the submitted key may be located.

Step 5: Access to the specific key entry of each RAM in the G-RAM corresponding to the specific key entry of RAM # 0 identified in Step 4, and lookup of the submitted key to find an exact match (for a Binary CAM) or a range match (for an RCAM). This step is clearly different for Binary CAMs and RCAMs.

Prior to the Key Search in RAM # 0 (FIG. 35), the submitted key K is compared with the values in the first and last locations of this RAM. If $K<K_{0,0}$, then the search is over because the key is not included in the G-RAM. If $K>K_{Gu,V}$ (for exact match only), then the key is not included in RAM # 0, but the search must continue in the other individual RAMs, because the key may be included in the G-RAM as long as $K \leq K_{U,V}$. If $K>K_{U,V}$ (for exact match only), then the key is not included in the G-RAM and the search is over.

If $K_{0,0} \leq K \leq K_{Gu,V}$, then search procedure can start with Step 1.

Steps 1, 2, 3 of the Serial Five-Step Search Algorithm are performed in the three hierarchical blocks, $B^2$ Register, $B^1$ RAM and $B^0$ RAM (FIG. 24) in the same way as in the contiguous G-RAM (see Section 3.2.2.1.1). The result of step 3 points to the specific row of RAM # 0 where the submitted key may be located.

Step 4 is performed to locate the specific key entry in the row of RAM # 0 (FIG. 35), determined in step 3, after which the submitted key may be located. This step is identical to Step 2 in the Serial Three-Step Search Algorithm for the Single-Hierarchy G-RAM described in Section 4.2.1.1.1.

Step 5 is performed to locate the specific key entry of each RAM in the G-RAM corresponding to the specific key entry of RAM # 0 identified in Step 4 and lookup of the submitted key to find an exact match (for a Binary CAM) or a range match (for an RCAM). This step is identical to Step 3 in the Serial Three-Step Search Algorithm for the Single-Hierarchy G-RAM (Section 4.2.1.1.1).

Example of Range Search Operation:

An example of a Five-Step Exact or Range Search of the submitted key in a G-RAM with three hierarchical blocks, $B^2$ Register, $B^1$ RAM and $B^0$ RAM, is shown below in reference to FIG. 26, but applied to the first column of RAM # 0 (instead of the FC-RAM). It is assumed that the G-RAM is composed of four 100×100 RAMs, and that the submitted key K is equal to or larger than key entry $K_{44,72}$ and smaller than $K_{45,72}$ of the second RAM (g=1), or, equivalently, is equal to or larger than $K_{89,72}$ and smaller than $K_{90,72}$ of the G-RAM, because $$L=g+i \cdot G=1+44.2=89$$

Thus, the submitted key K is equal to or larger than the key entry $K_{72}$ and smaller than $K_{73}$ of the first column of RAM # 0 (FIG. 26), i.e., $$K_{72} \leq K < K_{73}$$

Steps 1, 2, 3 are performed in the three hierarchical blocks, $B^2$ Register, $B^1$ RAM and $B^0$ RAM (FIG. 26) in the same way as in the contiguous G-RAM (see Section 3.2.2.1.1).

The result of step 3 points to row 72 in RAM # 0.

Step 4: Identification of the key entry in row 72 in RAM # 0 (FIG. 22) after which the submitted key may be located.

$$K_{89,72} \leq K < K_{90,72}$$

The matching key points to row 72 in RAM # 1.

Step 5: Identification of the key entry in row 72 of RAM # 1 that may contain the submitted key.

In Binary CAMs, the submitted key is compared with the key entries listed in row 72 in RAM # 1 searching for an Exact Match.

If $K=K_{44,72}$, then the key entry $K_{44,72}$ of RAM # 1 matches the searched key. In this case, index pair (44,72) is used to access the entry $D_{44,72}$ located in RAM # 1 of the Associated Data List under the same index; $D_{44,72}$ is read out along with a Match signal M="1" that indicates the validity of the retrieved associated data.

If $K>K_{44,72}$, then there is No Match. In this case, the CAM issues a No-Match signal M="0" to indicate the invalidity of the associated data.

In RCAMs, the submitted key is compared with the key entries in row 72 in RAM # 1 searching for a Range Match:

If $K_{44,72} \leq K < K_{45,72}$, the index pair (44,72) of the matching key is used to access the associated data entry $D_{44,72}$ corresponding to $K_{44,72}$ (and to the matching range) located in RAM # 1 of the Associated Data List, and the associated boundary type entry $M_{44,72}$ located in RAM # 1 of the Associated Boundary Type List.

$M_{44,72}$="1" corresponds to a Closed Boundary and designates a valid range, and $M_{44,72}$="0" corresponds to an Open Boundary and indicates that the range is not valid.

4.2.2.1.2 Pipelined Five-Step Search Algorithm

The timing diagrams in FIG. 32 illustrate the difference between the five-step serial and the pipelined search algorithms for the Multiple-RAM Multiple-Hierarchy Binary CAM or RCAM. In both modes, it is assumed that:

Each step of the five-step search cycle requires one RAM clock period for execution, denoted by T. Thus, each search cycle lasts 5T.

The Search operation starts with a search cycle for submitted Key 1, denoted as Search 1, which starts with a at t=0. Thus, step 1 of Search 1 (identification of the $B^2$ Register key entry and corresponding row in the $B^1$ RAM) is completed at t=T, step 2 (identification of the $B^1$ RAM key entry and the corresponding row in the $B^0$ RAM) at t=2T, step 3 (identification of the $B^0$ RAM key entry and the corresponding row in RAM # 0) at t=3T, step 4 (location of the specific key entry in the identified row of RAM # 0) at t=4T, and step 5 (location of the specific key entry in a particular RAM in the G-RAM corresponding to the specific key entry of RAM # 0) at t=5T.

Search $m_1$, Search $m_2$, Search $m_3$, Search $m_4$ and Search $m_5$ represent steps 1, 2, 3, 4 and 5 respectively, of a generic Search m for submitted Key m.

The timing diagrams shown in FIG. 32 are identical for the Contiguous and Non-Contiguous Multiple-RAM Single-Hierarchy Binary CAM or RCAM, even though the individual steps of the search algorithms are different.

4.2.2.1.3 First Column Registers

The search algorithms mentioned above are based on the assumption that the access to the first rows entries in the $B^1$ RAM and $B^0$ RAM, and to the first column entries in RAM # 0 can be performed in one step (or in a single clock). Since the RAM structure enables the access to a single RAM word (or a single row) in a single clock cycle, a First Column Register is used to allow a simultaneous access to the first column keys of RAM # 0 in a single clock (in step 1 of the Serial Five-Step Search Algorithm). This register is identical for Binary CAMs and RCAMs. It incorporates the first column keys and is kept updated as shown in FIG. 10.

The loading of the First Column Register keys is performed during the Key Insert or Key Remove operations. During the Insert operation, the keys are loaded and serially shifted bottom-up from the $D_B$ input. During the Remove operation, the keys are loaded and serially shifted top-down from the $D_T$ input.

4.2.2.1.4 Search Column Locators

The search algorithms for Binary CAMs and RCAMs require three Column Locators, each with A comparators (refer to FIG. 24), for the location of the key entry in the $B^2$ Register (in step 1 of the Serial Five-Step Search Algorithm), and the location of the key entries in the identified rows in $B^1$ RAM (step 2) and $B^0$ RAM (step 3). They also require one Column Locator with G comparators (FIG. 22) for the location of the specific key entry in the identified row in RAM # 0 (step 4), and additional G−1 Column Locators, each with M comparators, for the location of the specific key entry in a particular RAM in the G-RAM corresponding to the specific key entry of RAM # 0.

The Column Locators for the $B^2$ Register, $B^1$ RAM, $B^0$ RAM and RAM # 0 are identical for Binary CAMs and RCAMs. In both, they search for a key that is larger than or equal to the key $K_{0,J}$ and is smaller than the next key $K_{0,J+1}$, The Column Locators for the G RAMs are different for Binary CAMs and RCAMs. In Binary CAMs, the Column Locators search for a key entry that exactly matches the submitted key, whereas in RCAMs they search for a key entry which represents the lower boundary of the range that contains the submitted key.

4.2.2.2 Keeping the Key List in Order—Insert and Remove Operations

The insertion or removal of keys demands constant updating of the G RAMs and the hierarchical blocks $B^2$ Register, $B^1$ RAM and $B^0$ RAM, to keep them in order. The straightforward way to update the keys is by applying a serial and lengthy algorithm that requires sequential readout and update of all the entries of the G RAMs.

4.2.2.2.1 Preliminary Search for the Insert and Remove Operations

Prior to the key insertion/removal, a Search procedure determines the position where the submitted Key $K_E$ is to be inserted or removed in one of the G RAMs, provided that these operations are allowed. Key insertion is allowed only if the key is not included in any G RAM, whereas key removal is possible only if it is already included in one of the G RAMs. The preliminary Search procedure is identical for Binary CAMs and RCAMs; it is similar to the Serial Five-Step Search procedure for determining the validity of the identified range and associated data in RCAMs, but in this case, the preliminary Search procedure determines the index of the key to be inserted or removed, provided that these operations are allowed.

4.2.2.2.2 Insert and Remove Supporting Structures

The surrounding hardware that supports the Key insertion and removal is identical for Binary CAMs and RCAMs.

An implementation of the Multiple-Hierarchy Multiple-RAM CAMs includes the surrounding hardware used in the implementation of the Single-Hierarchy Multiple-RAM CAMs (Section 4.2.1.2.2). This includes one First Column Register and G Inserter/Removers for all the RAMs of the G-RAM. Each Inserter/Remover consists of M b-bit registers $d_0$, $d_1$, $d_2$, . . . , $d_{M-2}$, $d_{M-1}$. Only one leftmost register $d_E$ is required, which can be integrated in the leftmost Inserter/Remover as shown in FIG. 14.

4.2.2.2.3 Insert Operation

The Insert operation for a Multiple-Hierarchy Multiple-RAM is identical for Binary CAMs and RCAMs. It includes the insertion of the submitted key $K_E$ in one of the G RAMs and then proceeds with the performance of the required changes in the three hierarchical blocks, $B^2$ Register, $B^1$ RAM and $B^0$ RAM.

The Insert operation for the Single-Hierarchy Multiple-RAM is exemplified by the insertion of the key 56 in the second RAM of a G-RAM consisting of two 5×4 RAMs, described in Section 4.2.1.2.3 and shown in FIG. 37.

The three hierarchical blocks, $B^2$ Register, $B^1$ RAM and $B^0$ RAM, can be updated simultaneously with the G-RAM by means of Read/Write Registers (not shown) that do not require shifting capabilities.

In general, if a key $K_E$ is inserted in the G-RAM, all the first column entries $K_{0,J}$ of RAM # 0 that are larger than $K_E$ ($K_{0,J} > K_E$) will change as a result of the forward shift of all the G-RAM entries that are larger than $K_E$. Then, among the changing first column entries of RAM # 0, all those with indices that are multiples of $B^2$ (J=$mB^2$, $0 \leq m \leq A-1$) will also change in the $B^2$ Register. Similarly all the changing entries with indices that are multiples of B (except the multiples of $B^2$ stored in the $B^2$ Register) (J=nB, $0 \leq n \leq AB-1$, n≠mB) will also change in the $B^1$ RAM. All the changing entries that are not multiples of B will also change in the $B^0$ RAM. Table 2 indicates which of these blocks may change if RAM # 0 changes and must be updated (Yes or No) with the last update of RAM # 0.

4.2.2.2.4 Remove Operation

The Remove operation for a Multiple-Hierarchy Multiple-RAM is identical for Binary CAMs and RCAMs. It includes the removal of the submitted key from one of the G RAMs and then proceeds with the performance of the corresponding changes in the three hierarchical blocks, $B^2$ Register, $B^1$ RAM and $B^0$ RAM.

The Remove operation for the Single-Hierarchy Multiple-RAM is exemplified by the removal of the key 58 from the second RAM of a G-RAM consisting of two 5×4 RAMs, described in Section 4.2.1.2.4 and shown in FIG. 38.

The three hierarchical blocks, $B^2$ Register, $B^1$ RAM and $B^0$ RAM, can be updated simultaneously with the G-RAM by means of Read/Write Registers (not shown) that do not require shifting capabilities.

Similarly to the Insert procedure, if a key $K_E$ is removed from the G-RAM, all the first column entries $K_{0,J}$ of RAM # 0 (with row indices J) that are larger than $K_E$ ($K_{0,J} > K_E$) will change as a result of the backward shift of all the entries of RAM # 0 that are larger than $K_E$. Then, among the changing first column entries of RAM # , all those with indices that are multiples of $B^2$ (J=$mB^2$, $0 \leq m \leq A-1$) will also change in the $B^2$ Register. Similarly all the changing entries with indices that are multiples of B (except the multiples of $B^2$ stored in the $B^2$ Register) (J=nB, $0 \leq n \leq AB-1$, n≠mB) will also change in the $B^1$ RAM. All the changing entries that are not multiples of B will also change in the $B^0$ RAM. Table 2 indicates which of these blocks may change if RAM # 0 changes and must be updated (Yes or No).

Table 3 indicates which blocks must be updated with the first column of a specific RAM # 0 shown as an example in FIG. 33. If the number 5000 is removed from the G-RAM (assuming that it is already listed), then all the first column entries of RAM # 0 that are larger than 5000 (with index 16) will change. The entry with index 30 will also change in the $B^2$ Register. The entries with indices 20, 30, 35 and 40 will also change in the $B^1$ RAM. The entries with indices 17–19, 21–24, 26–29, 31–34, 36–39, 41–44, and 46–49, will also change in the $B^0$ RAM.

4.2.2.2.5 Insert and Remove Operations in the G-RAM for the Associated Data and Associated Boundary Type The indices of the G-RAM for the Associated Data entries and Associated Boundary Type entries (for RCAMs only) must remain in correspondence with the key entry index. The Insert and Remove operations in the G-RAM are accompanied by corresponding and simultaneous Insert and Remove operations in the Associated Data G-RAM for Binary CAMs and RCAMs. Additional corresponding Insert and Remove operations take place in the Associated Boundary Type G-RAM for RCAMs only. Similarly, the disruption in the insertion or removal of key entries for a search of submitted keys is accompanied by corresponding disruptions in the insertion or removal of Associated Data and Boundary Type entries.

4.2.2.2.6 Disruption of an Insert or Remove Operation to Perform a Search Operation A disruption in the Insert or Remove operation in a G-RAM of a Multiple-Hierarchy Multiple-RAM to perform a Search operation is identical to that in the Single-Hierarchy Multiple-RAM, described in Section 3.2.1.2.5.

When a key is submitted for search, the Insert or Remove operation in-execution is disrupted only after the contents of the Inserter/Removers are written to the Extended Paused Row; then, is resumed by reading the succeeding extended row (for insertion) or the preceding extended row (for removal). During this disruption, the update of RAM # 0 and of the hierarchical blocks $B^2$ Register, $B^1$ RAM and $B^0$ RAM is simultaneously discontinued until the Search operation is completed and the Insert or Remove operation in the G-RAM is resumed.

5. Multiple Modules of Multiple-RAM Devices 5.1 Multiple-Module Architecture

Binary CAMs and RCAMs with large memories require large number of RAMs result in a large single Multiple-RAM device and in an unconventionally large FC-RAM (if used). One practical solution is splitting the Multiple-RAM device in separate modules, each composed of a conveniently specified number of Multiple-RAMs. This results in multiple modules of Multiple-RAMs, based on the concept of the Multiple-Modules of single RAMs introduced in co-pending application, U.S. patent application Ser. No. 09/779,941. The Multiple-Modules can be implemented with the Contiguous Multiple-RAMs covered in Section 3 as well as with the Non-Contiguous Multiple-RAMs described in Section 4.

This implementation requires on a method of interconnecting the multiple modules into one Binary CAM or RCAM device. Each Multiple-RAM module operates internally like a single Multiple-RAM device with its Key Multiple-RAM, Associated Data Multiple-RAM and Associated Boundary Type Multiple-RAM (for RCAMs).

The principles for key Search, Insert and Remove operations must be preserved when the Binary CAM and the RCAM are implemented using multiple modules; that is, a key listed with a certain index in any RAM within any module, must have a corresponding associated data entry (and also an associated boundary type entry for an RCAM) listed with the same index in the same RAM within the same module.

Multiple-module deployment while preserving these principles implies:

Ability to transfer keys and their associated data (plus associated boundary type entries for RCAMs) in the boundary locations of each module to an adjacent module:

During Insert operation, when a key is inserted in a certain location in any module, all the larger keys must be shifted one location forward. If the module is fully occupied, its highest-index key and the corresponding associated data (plus the boundary type entry for an RCAM) are shifted one location forward, which is the first location in the succeeding module.

During Remove operation, when a key is removed from a certain location in any module, all the larger keys must be shifted one location backward. If the module is fully occupied, then its highest-index key and the corresponding associated data (plus the boundary type entry for an RCAM) are replaced by a key and its associated data (plus the boundary type entry) that originate in the first location in the succeeding module.

The operations in any module depend on the condition of the adjacent modules. Therefore, each module must be continuously informed whether the adjacent modules are fully occupied or entirely empty.

The Binary CAM or RCAM is composed of sets of Key Multiple-RAMs, Associated Data Multiple-RAMs and Associated Boundary Type Multiple-RAMs (for RCAMs). Assume in this section that each of these three sets includes a total number of P·G RAMs. Thus, the Binary CAM or RCAM is split in P Modules, each implemented with the three sets of G RAMs. These modules are designated Key Modules, Associated Data Modules and Associated Boundary Type Modules. The Binary CAM (or RCAM) is thus broken down into the two types of modules (or three for the RCAM) defined above. The modules of the same type are integrated to form the Key List, Associated Data List and Associated Boundary Type List (for the RCAM).

The modules of each type are arranged in sequence, so that, in reference to any module labeled $\varsigma$, the preceding module ($\varsigma-1$) carries smaller keys keys, whereas the succeeding module ($\varsigma+1$) holds larger keys.

The essential components added to the $\mathfrak{R}$-th Key Module in a possible implementation are:

$$K_{0,0}^{\varsigma}$$

Register: This register holds $$K_{0,0}^{\varsigma},$$

the first key in the module, as a separate, readily accessible value. The $$K_{0,0}^{\varsigma}$$

value is available as register output signal and is labeled $$K_{min}^{\varsigma}$$

because it is the minimum key value stored in the $\varsigma$-th module.

$$K_{min}^{\varsigma}$$

is used when performing a Remove operation in a preceding module (that holds smaller keys) and is loaded to the highest location in this module. The register value is updated during an Insert or Remove operation via the $K_m\varsigma$ line when the first row in the module is updated.

$$K_{U,V}^{\varsigma}$$

Register: This register holds $$K_{U,V}^{\varsigma},$$

the last key in the module, as a separate, readily accessible value. The $$K_{U,V}^{\varsigma}$$

value is available as register output and labeled $$K_{max}^{\varsigma}$$

because it is the maximum key value stored in the $\varsigma$-th module.

$K_{max}^\varsigma$ is used when performing an Insert operation in this module, and is loaded to the first position of the succeeding module (that holds larger keys) whenever the $\varsigma$-th module is full. The register value is updated during an Insert or Remove operation via the $K_m\varsigma$ line when the V-th row in the module is updated.

Up/Down Counter: This counter holds the location index of the current highest key in the module. After Reset, this counter holds an "All Ones" value. The first Insert operation actively performed in the module results in the counter wrap-around and in "All Zeros" state, pointing to row 0 and column 0 (U=0 and V=0).

The Up/Down Counter is incremented by 1 when the Insert signal Ins$\varsigma$ is "1" and is decremented by 1 when the Remove signal Rmv$\varsigma$ is "1".

The Set signal is generated when the module is reset and the Up/Down counter is emptied. This happens when the Up/Down Counter is "All Zeros" and then Rmv$\varsigma$ becomes "1".

Em (Empty Flag) Flip-Flop: This flip-flop indicates that the module is empty (Em$\varsigma$="1") when it is set to "1"; this takes place when the Set signal is "1". The flip-flop is reset to "0" when the first active Insert signal Ins$\varsigma$ becomes "1".

U and V Comparators: These pair of comparators compare the index of the module largest key (U,V) with the index of the module last position (M−1, N−1). If U=M−1 and V=N−1, the comparators indicate that the module is full.

Fl (Full) Gate: This AND gate indicates that the module is full (Fl$\varsigma$="1") when the comparators show that the module is full and the Em flip-flop indicates that the module is not empty (Em$\varsigma$="0"). This last signal is necessary to rule out an Fl$\varsigma$="1" indication when the Up/Down Counter holds an "All Ones" value (after Reset) and yet the module is empty.

The input signals applied to the Key Module are:

The Ins$\varsigma$ signal is "1" whenever there is an Insert operation and the new key is inserted in this module or in any of the succeeding modules (that hold larger keys).

The Rmv$\varsigma$ signal is "1" whenever there is a Remove operation and the key is removed from this module or from any of the succeeding modules (that hold larger keys).

The $K_m\varsigma$ signal is applied to the $K_{0,0}^\varsigma$ register during an Insert or Remove operation when the first row in the module is updated and to the $K_{U,V}^\varsigma$ register when the last row value is updated.

Since the operations performed in each $\varsigma$-th Associated Data Module (and each $\varsigma$-th Associated Boundary Type List Module) correspond to those performed in the Key Module, it is synchronized and controlled by the same control signals as the Key Module. When the Key List inserts and deletes keys, the Associated Data List simultaneously inserts and deletes the corresponding associated data entries. Module chaining requires that the boundary values to be readily available. These values are kept in two registers:

$D_{0,0}^\varsigma$

Register: This register holds the first key entry $D_{0,0}^\varsigma$ in the Associated Data Module, as a separate, readily accessible value. The $D_{0,0}^\varsigma$ value is available on the register output and is labeled $\Delta_{min}^\varsigma$ because it is the minimum key value stored in the $\varsigma$-th module.

$\Delta_{min}^\varsigma$ is used when performing a Remove operation in a preceding module (that holds smaller keys) and is loaded to the highest location of this module. The register value is updated during an Insert or Remove operation via the $D_m\varsigma$ line when the first row is updated.

$D_{U,V}^\varsigma$

Register: This register holds the highest key entry $D_{U,V}^\varsigma$ in the module, as a separate, readily accessible value. The $D_{U,V}^\varsigma$ value is available on the register output and is labeled $\Delta_{max}^\varsigma$ because it is the maximum key value stored in the $\varsigma$-th module.

$\Delta_{\max}^{\varsigma}$ is used when performing an Insert operation in this module, and is loaded to the first position of the succeeding module (that holds larger keys) whenever the $\varsigma$-th module is full (U=M−1 and V=N−1). The register value is updated during an Insert or Remove operation via the $D_m\varsigma$ line when the V-th row in the module is updated.

Each module $\varsigma$ in the Key List (excluding the first module) receives as inputs the maximum value stored in the preceding module ($\varsigma-1$), $K_{\max}^{S-1}$, and the signal $Fl_\varsigma^{-1}$ that indicates whether this module is full. Each module $\varsigma$ (excluding the last module) also receives the minimum key value stored in the succeeding module ($\varsigma+1$), $K_{\max}^{S-1}$, and the signal $Em_\varsigma^{+1}$ that indicates whether this module is empty.

The $Fl^{P-1}$ signal of the last module (which holds the largest keys) also indicates whether the last module is full. If it is, then all the CAM entries are occupied and the entire CAM is full.

$Full_{CAM} = Fl^{P-1}$

The $Em^0$ signal of the first module (which holds the smallest keys) indicates whether this module is empty. If it is, then the entire CAM is empty.

$Empty_{CAM} = Em^0$

Each module $\varsigma$ in the Associated Data List (excluding the first module) receives the last value stored in the preceding module ($\varsigma-1$), $D_{\max}^{S-1}$.

Each module $\varsigma$ (excluding the last module) also receives the minimum associated data value stored in the succeeding module ($\varsigma+1$), $D_{\min}^{S+1}$.

If the Associated Boundary Type entries in an RCAM are arranged separately from the Range Key and Associated Data entries, then separate Associated Boundary Type Modules are needed. Alternatively, the Associated Boundary Type entries may be integrated with the Associated Boundary Type entries in the Associated Data Modules, or with the Range Key entries in the Range Key Modules.

In an RCAM, each module $\varsigma$ in the Associated Boundary Type List (except for the first module) receives the last value stored in the preceding module ($\varsigma-1$), $M_{\max}^{S-1}$, Each module $\varsigma$ (excluding the last module) also receives the minimum boundary type value stored in the succeeding module ($\varsigma+1$), $M_{\min}^{S+1}$.

Whenever a submitted key is searched in the entire Binary CAM or RCAM, each module in the Key List performs its Search operation independently and concurrently with the other modules. If the searched key is listed in the Binary CAM or is contained in a range in the RCAM, it will only be found in one module, say the i-th module, and only this module will issue a match signal $M^i=$"1" ($0 \leq i \leq P-1$) and the location index of the searched key.

The location index is used to fetch the respective associated data from the i-th module in the Associated Data List. This data is sent to the corresponding Tristate Buffer $TB_1$. The $TB_1$ buffer output is enabled by the respective match signal $M^i$. Since the match signal of only one module is active, only one Tristate buffer output is enabled on the data bus and issues the respective associated data. (If there is no match, none of the modules will issue a match signal).

The Binary CAM (or RCAM) provides the associated data that corresponds to the searched key according to the following formula:

$$Data = \bigcup_{i=0}^{P-1} M^i \cdot AD_i$$

In a Binary CAM, the match signal is given by the following formula:

$$Match_{CAM} = \bigcup_{i=0}^{P-1} M^i$$

In an RCAM, the boundary type entry is obtained in a procedure similar to that used for getting the associated data. The location index issued by the i-th module where the searched key is found is used to fetch the boundary type from the i-th module in the Associated Data List. The respective Tristate Buffer TBi, enabled by the match signal $M^i$, issues the corresponding boundary type entry.

The RCAM match signal provides the boundary type that corresponds to the searched key according to the following formula:

$$Match_{RCAM} = \bigcup_{i=0}^{P-1} M^i \cdot AB_i$$

Thus, the RCAM match signal depends on the boundary type, which determines the validity of the range that contains the searched key.

If $\text{Match}_{CAM}$="0" or $\text{Match}_{RCAM}$="0" (no match), the associated data of the Binary CAM or RCAM has no meaning. In this case, the data output is tristated.

5.2 Principles of Operation 5.2.1 Search Operation

The Search operation is performed concurrently in all the P modules of the Binary CAM or RCAM.

Each i-th Key Module is first checked for emptiness. If it is empty ($\text{Em}^1$="1"), the search is terminated except for handling the output of the match signal Mi and the associated data. If the module is not empty, a search is performed as described in Section 0 for the Binary CAM. If the Search operation is successful, it results in a match, $M^1$="1", which indicates a meaningful associated data value $AD_1$ in the Associated Data Module. For the RCAM, a successful search, also described in Section 2.2.1.1, yields a meaningful boundary type value $AB_i$. The Search operation in the i-th module is completed with the output of the $M^i$, $AD_i$ and $AB_i$ values.

The Data and Match signals for the entire Binary CAM or RCAM correspond to those of the individual modules that contain the searched key. They are obtained by summing-up the results of the Search operation performed in all the modules according to the following formulas:

$$\text{Data} = \bigcup_{i=0}^{P-1} M^i \cdot AD_i$$

$$\text{Match}_{CAM} = \bigcup_{i=0}^{P-1} M^i$$

$$\text{Match}_{RCAM} = \bigcup_{i=0}^{P-1} M^i \cdot AB_i$$

5.2.2 Keeping the Key List in Order—Insert and Remove Operations 5.2.2.1 Preliminary Search for the Insert and Remove Operations Prior to the key insertion/removal, a Search procedure determines the position index of the submitted key to be inserted or removed, provided that these operations are allowed. Key insertion is allowed only if the key is not included in the i-th Key Module ($M_{Exact}$="0"), whereas key removal is possible only if it is already included in the module ($M_{Exact}$="1").

The search procedure is performed concurrently in all the P modules of the Binary CAM or RCAM. The search procedure starts in a single i-th Key Module and is not performed independently but as a part of the Insert or Remove operation.

If the Search operation precedes an Insert operation and is successful, it provides the position index for the key insertion, and issues the signal $M_{Exact}$="0", which indicates that the submitted key was not previously included in the i-th module. If the Search operation preceding a Remove operation is successful, it provides the position index for the key removal, and issues the signal $M_{Exact}$="1", which indicates that the submitted key was already included in the i-th module.

The overall Match signal is obtained by summing-up the results of the Search operation performed in all the modules according to the following formulas:

$$\text{Match} = \bigcup_{i=0}^{P-1} M^i_{Exact}$$

A successful Insert operation can only take place for Match="0", meaning that the submitted key was not previously included in the entire Binary CAM or RCAM. On the other hand, a successful Remove operation requires Match="1", which indicates that the submitted key is already included.

5.2.2.2 Insert and Remove Operations

An Insert operation can take place only if the Search operation results in $\text{Match}_{CAM}$="0", meaning that the key to be inserted is not included in the Key List. If the Search operation results in $\text{Match}_{CAM}$="1", then the key is already included in the Key List, the insertion attempt is considered an error and the Insert operation is not executed.

A Remove operation can take place only if the Search operation results in $\text{Match}_{CAM}$="1", meaning that the key to be removed is included in the Key List. If the Search operation results in $\text{Match}_{CAM}$="0", then the key is not included in the Key List, the removal attempt is considered an error and the Remove operation is not executed.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for storing arranged data in a memory, the system comprising:
   (a) a plurality of random access memories, each random access memory (RAM) of said plurality including:
      (i) a first array of cells, said first array having at least two dimensions and having rows and columns, said first array designed and configured to contain a plurality of key entries, each of said cells having a unique address including a row index and a column index, each of said key entries for matching with an input key, and
   (b) a processor designed and configured to search said plurality of key entries for a match, in response to said input key, said plurality of RAMs designed and configured such that:
      (i) at least one row in a second of said RAMs has a row index that is identical to a row index in a first of said RAMs, and
      (ii) said key entries are arranged within each of said plurality of RAMs in monotonic order,
   and wherein said plurality of RAMs is further designed and configured such that a particular row of key entries in said second of said RAMs is in mixed order with respect to said particular row of key entries in said first of said RAMs.

2. The system of claim 1, wherein each row in said second of said RAMs has a unique row index, each said unique row index corresponding to a respective row index in a first of said RAMs.

3. The system of claim 1, each of said RAMs having at least one row having a row index that is identical to said row index in said first of said RAMs.

4. The system of claim 1, each of said RAMs further including:
   (ii) a second array of cells, said second array having at least two dimensions and having rows and columns, said second array having a plurality of data entries, each of said data entries being associated with a particular one of said key entries.

5. The system of claim 4, wherein said processor is designed and configured to search, in response to said input key, said plurality of key entries, so as to identify a match.

6. The system of claim 1, wherein said plurality of key entries includes at least one range type key entry, each said range type key entry corresponding to a particular range and being associated with a particular one of said data entries.

7. The system of claim 6, wherein said range type key entry contains a single range-boundary value.

8. The system of claim 1, wherein said plurality of key entries includes at least one exact type key entry, each said exact type key entry being associated with a particular one of said data entries.

9. The system of claim 1, wherein each of said RAMs include end-column key entries, the system further comprising:
   (c) an end-column RAM, operatively connected to said plurality of RAMs, said end-column RAM including an array of cells having at least two dimensions, said array designed and configured to contain said end-column key entries of said RAMs.

10. The system of claim 9, wherein said end-column RAM contains first-column key entries of said RAMs.

11. The system of claim 9, wherein said processor is designed and configured to search said end-column RAM, in response to said input key, to identify a row of said plurality of RAMs containing a potential match.

12. The system of claim 11, wherein said processor is further designed and configured to identify a RAM of said plurality of RAMs, containing a potential match.

13. The system of claim 11, wherein said processor is further designed and configured to identify a matching key entry in said row of said RAM, said key entry matching said input key.

14. The system of claim 9, further including at least one array for storing key entries of an end column of said end-column RAM in k hierarchical levels, and wherein $k \geq 2$.

15. The system of claim 14, wherein said key entries of said end column of said end-column RAM are stored within said hierarchical levels according to a base B, wherein one level of said levels contains particular key entries of said end column, said particular key entries taken from said end column at a key entry interval of $B^{k-1}$.

16. The system of claim 15, wherein a next-highest level of said levels contains particular key entries of said end column, said particular key entries taken from said end column at a key entry interval of $B^{k-2}$.

17. The system of claim 16, wherein a subsequent next-highest level of said levels contains particular key entries of said end column, said particular key entries taken from said end column at a key entry interval of $B^{k-3}$, wherein $k \geq 3$.

18. The system of claim 16, wherein each of said key entries of said end column is stored in a single one of said hierarchical levels, thereby saving space in said at least one array.

19. The system of claim 1, wherein said at least one row in a second of said RAMs is a plurality of rows.

20. The system of claim 19, wherein each RAM of said plurality of RAMs has a number of said columns for containing said plurality of key entries, and wherein said number is identical for each said RAM.

21. The system of claim 1, wherein said plurality of RAMs includes corresponding cells for containing said plurality of key entries, and wherein a portion of corresponding cells within said second of said RAMs contain key entries that are greater than key entries in corresponding cells within said first of said RAMs.

22. The system of claim 1, wherein said plurality of RAMs includes corresponding cells for containing said plurality of key entries, and wherein the system is configured such that all corresponding cells within said second of said RAMs contain key entries that are greater than key entries in corresponding cells within said first of said RAMs.

23. The system of claim 1, the system further comprising:
   (c) a second plurality of RAMs, each RAM in said second plurality of RAMs including an associated array of cells, each said associated array having at least two dimensions, rows and columns, and a plurality of data entries, each said associated array for pairing with a particular one of said first array having said plurality of RAMs, such that each of said data entries is associated with a particular one of said key entries.

24. A computer-implemented method for storing arranged data in a memory, the method comprising the steps of:
   (a) providing a system including:
      (i) a plurality of random access memories, each random access memory (RAM) of said plurality including a first array of cells having a plurality of key entries, said first array having at least two dimensions and having rows and columns;
      (ii) a processor for searching said plurality of key entries; and
      (iii) an end-column RAM, operatively connected to said plurality of RAMs, said end-column RAM including an array of cells for containing end-column key entries of said RAMs;
   (b) configuring said plurality of RAMs such that at least one row in a second of said RAMs has a row index that is identical to a row index in a first of said RAMs;
   (c) arranging said key entries within each of said plurality of RAMs in monotonic order.

25. The method of claim 24, wherein each row in said second of said RAMs has a unique row index, each said unique row index corresponding to a respective row index in said first of said RAMs.

26. The method of claim 24, each of said RAMs further including a second array of cells, said second array having at least two dimensions and having rows and columns, said second array having a plurality of associated data entries, each of said data entries being associated with a particular one of said key entries.

27. The method of claim 26, wherein said plurality of key entries represent range boundary information, each range boundary information corresponding to a particular range, the method further comprising the step of:
   (d) performing a change in said plurality of key entries in said first array.

28. The method of claim 27, further comprising the step of:
(e) updating said plurality of associated data entries, in accordance with said change.

29. The method of claim 28, wherein said updating includes:
(i) identifying at least one particular associated data entry of said plurality of associated data entries that requires updating.

30. The method of claim 29, wherein said updating further includes:
(ii) assigning a fixed-length bit-map to a group of said key entries whose associated data entries require updating.

31. The method of claim 30, wherein said updating includes:
(iii) writing, in said second array, said associated data entries that require updating.

32. The method of claim 28, wherein said updating further includes:
(i) reassigning said at least one particular associated data entry of said plurality of associated data entries to a different one of said key entries.

33. The method of claim 28, wherein said updating includes:
(i) identifying at least one particular associated data entry of said plurality of associated data entries that requires updating, and
(ii) reassigning said at least one particular associated data entry to a different one of said key entries.

34. The method of claim 28, wherein said change in said plurality of key entries includes an Insert operation.

35. The method of claim 28, wherein said change in said plurality of key entries includes a Remove operation.

36. The method of claim 28, further comprising the step of:
(f) providing range validity data for each of said plurality of key entries.

37. The method of claim 26, wherein said plurality of key entries represent range boundary information, each range boundary information corresponding to a particular range, the method further comprising the steps of:
(d) performing a change operation in said plurality of key entries in said first array, and, in response to a particular input key,
(e) pausing said change operation, and
(f) searching said plurality of said key entries to identify a key entry that potentially matches said particular input key.

38. The method of claim 37, further comprising the step of:
(g) resuming said change operation.

39. The method of claim 37, further comprising the step of:
(g) storing any of said plurality of key entries in a second array of cells during said change operation.

40. The method of claim 39, wherein said pausing occurs in a paused row of said rows, and wherein if said particular input key is greater than said key entries in a row preceding said paused row, and less than said key entries in a row succeeding said paused row, and if said particular input key is greater than all key entries within said paused row, the method further comprises the step of:
(h) searching said second array of cells to identify a key entry that potentially matches said particular input key.

41. The method of claim 39, wherein said pausing occurs in a paused row of said rows, and wherein if said particular input key is greater than said key entries in a row preceding said paused row, and less than said key entries in a row succeeding said paused row, and if said particular input key is less than all key entries within said paused row, the method further comprises the step of:
(h) searching said second array of cells to identify a key entry that potentially matches said particular input key.

42. The method of claim 39, wherein said pausing occurs in a paused row of said rows, and wherein if a searched key entry of said key entries corresponding to said particular input key is outside of said paused row, the method further comprises the step of:
(h) solely searching said plurality of said key entries within said first array to identify a key entry that potentially matches said particular input key.

43. The method of claim 39, wherein said pausing occurs in a paused row of said rows, and wherein if a searched key entry of said key entries corresponding to said particular input key is within said paused row, and if said particular input key satisfies a condition $$K_0 \leq K \leq K_{M-1}$$

where:
$K^0$ is a lowest key entry in the paused row;
$K_{M-1}$ is a highest key entry in the paused row, and
K is the particular input key,
then only key entries within said first array are searched to identify a key entry that potentially matches said particular input key.

44. The method of claim 39, wherein said change in said plurality of key entries includes an Insert operation.

45. The method of claim 39, wherein said change in said plurality of key entries includes a Remove operation.

46. The method of claim 24, further comprising the step of:
(d) searching, in response to said input key, said plurality of key entries, so as to identify a match.

47. The method of claim 24, further comprising the step of:
(d) searching said end-column RAM, in response to said input key, to identify a row containing a potential match.

48. The method of claim 47, further comprising the step of:
(e) identifying, in response to said input key, a RAM of said RAMs containing a potential match.

49. The method of claim 24, further comprising the step of:
(d) storing key entries of an end column of said end-column RAM in k hierarchical levels, wherein $k \geq 2$.

50. The method of claim 49, wherein said storing within said hierarchical levels is according to a base B, wherein a first hierarchical level of said levels contains particular key entries of said end column, said particular key entries taken from said end column at a key entry interval of $B^{k-1}$.

51. The method of claim 50, wherein a next-highest hierarchical level of said levels contains particular key entries of said end column, said particular key entries taken from said end column at a key entry interval of $B^{k-2}$.

52. The method of claim 51, wherein $k \geq 3$, and wherein a subsequent level succeeding said next-highest level contains particular key entries of said end column, said particular key entries taken from said end column at a key entry interval of $B^{k-3}$.

53. The method of claim 50, wherein said first level is a highest hierarchical level of said hierarchical levels.

54. The system of claim 50, wherein each of said key entries is stored in a single one of said hierarchical levels, thereby saving space in said at least one array.

55. The method of claim 50, wherein said searching of said hierarchical structure includes:
   (i) searching said particular key entries in said first level to locate a pointing key entry for said input key, said pointing key entry pointing to a row in a next-highest level of said levels.

56. The method of claim 55, wherein said next-highest level contains particular key entries of said end column, said particular key entries taken from said end column at a key entry interval of $B^{k-2}$, and wherein said searching of said hierarchical structure includes:
   (ii) searching said particular key entries in said next-highest level to locate a second pointing key entry for said input key, said second pointing key entry pointing to a row in a subsequent level succeeding said next-highest level.

57. The method of claim 56, wherein said subsequent level contains particular key entries of said end column, said particular key entries taken from said end column at a key entry interval of $B^{k-3}$, and wherein said searching of said hierarchical structure includes:
   (ii) searching said row in said subsequent level to locate a match for said input key.

58. The method of claim 55, wherein said next-highest level contains particular key entries of said end column, said particular key entries taken from said end column at a key entry interval of $B^{k-2}$, and wherein said searching of said hierarchical structure includes:
   (ii) searching said row in said next-highest level to locate a match for said input key.

59. The method of claim 24, wherein said arranging is performed such that said key entries form a single monotonic order within said plurality of RAMs.

60. The method of claim 24, wherein said arranging is performed such that said key entries are contained, within said plurality of RAMs, in a number of said columns, said number being identical for at least said first and said second of said RAMs.

61. The method of claim 60, further comprising the step of:
   (d) searching said plurality of RAMs for a potential match for said input key.

62. The method of claim 61, wherein said searching includes:
   (i) locating a relevant key entry of said key entries within one RAM of said RAMs, and
   (ii) comparing said relevant key entry with said input key.

63. The method of claim 62, wherein said searching further includes:
   (iii) comparing said input key with a relevant key entry in at least one corresponding cells within said RAMs, until a match is identified.

64. The method of claim 63, further comprising the step of:
   (e) retrieving a data entry associated with said relevant key entry.

65. The method of claim 64, wherein said RAMs include a plurality of data entries, each of said data entries being associated with a particular one of said key entries.

66. The method of claim 24, wherein said arranging is performed such that a particular row of key entries in said second of said RAMs is in mixed order with respect to said particular row of key entries in said first of said RAMs.

67. The method of claim 66, further comprising the step of:
   (d) partitioning, into hierarchical levels, a column of said columns in one of said RAMs.

68. The method of claim 24, wherein said plurality of RAMs includes corresponding cells for containing said plurality of key entries, and wherein said arranging is performed such that said key entries contained in corresponding cells within said second of said RAMs are greater than said key entries in corresponding cells within said first of said RAMs.

69. The method of claim 24, wherein said plurality of RAMs includes corresponding cells for containing said plurality of key entries, and wherein said arranging is performed by:
   (i) inserting a lowest key entry of said key entries into a first cell within said first array of said first of said RAMs, and
   (ii) inserting a next lowest key entry of said key entries into a corresponding cell within said first array of said second of said RAMs.

70. The method of claim 69, wherein successive next lowest key entries of said key entries are inserted into corresponding cells of successive RAMs of said plurality of RAMs, until all cells corresponding to said first cell within said first of said RAMs are filled.

71. The method of claim 70, wherein said arranging farther includes:
   (iii) inserting a successive next lowest key entry into a next cell within said first array of said first of said RAMs;
   (iv) inserting successive next lowest key entries into cells corresponding to said next cell, until all cells corresponding to said next cell are filled, and
   (v) repeating (iii) and (iv) until all said key entries are contained within said plurality of RAMs.

72. A computer-implemented method for storing arranged data in a memory, the method comprising the steps of:
   (a) providing a system including:
      (i) a plurality of random access memories, each random access memory (RAM) of said plurality including a first array of cells having a plurality of key entries, said first array having at least two dimensions and having rows and columns, and
      (ii) a processor for searching said plurality of key entries;
   (b) configuring said plurality of RAMs such that at least one row in a second of said RAMs has a row index that is identical to a row index in a first of said RAMs, and
   (c) arranging said key entries within each of said plurality of RAMs in monotonic order,
wherein said arranging is performed such that said second of said RAMs is in mixed order with respect to said first of said RAMs.

73. A computer-implemented method for storing arranged data in a memory, the method comprising the steps of:
   (a) providing a system including:
      (i) a plurality of random access memories, each random access memory (RAM) of said plurality including a first array of cells having a plurality of key entries, said first array having at least two dimensions and having rows and columns, and (ii) a processor for searching said plurality of key entries; and (b) configuring said plurality of RAMs such that at least one row in a second of said RAMs has a row index that is identical to a row index in a first of said RAMs;

(c) arranging said key entries within each of said plurality of RAMs in monotonic order, and (d) performing a change in said plurality of key entries in said first array, wherein each of said RAMs further includes a second array of cells, said second array having at least two dimensions and having rows and columns, said second array having a plurality of associated data entries, each of said data entries being associated with a particular one of said key entries, and wherein said plurality of key entries represent range boundary information, each range boundary information corresponding to a particular range, and wherein, in response to a particular input key, the method further comprises the steps of:

(e) pausing said change operation, and (f) searching said plurality of said key entries to identify a key entry that potentially matches said particular input key.

* * * * *